US012668666B2

(12) United States Patent
Koebel et al.

(10) Patent No.: US 12,668,666 B2

(45) Date of Patent: Jun. 30, 2026

(54) FUNCTIONALIZED Q-T-SILOXANE-BASED POLYMERIC MATERIALS WITH LOW SILOXANE RING CONTENT AND METHOD FOR PREPARING SAME

(71) Applicant: EMPA EIDGENOSSISCHE MATERIALPRUFUNGSUND FORSCHUNGSANSTALT, Dubendorf (CH)

(72) Inventors: Matthias Koebel, Bruttisellen (CH); Wim Malfait, Zurich (CH); Marek Nemec, Poprad (SK); Stefanie Hauser, Nafels (CH)

(73) Assignee: EMPA EIDGENOSSISCHE MATERIALPRUFUNGSUND FORSCHUNGSANSTALT, Dubendorf (CH)

(*) Notice: Subject to any disclaimer, the term of this patent is extended or adjusted under 35 U.S.C. 154(b) by 952 days.

(21) Appl. No.: 17/784,590

(22) PCT Filed: Dec. 10, 2020

(86) PCT No.: PCT/EP2020/085619

§ 371 (c)(1),
(2) Date: Jun. 10, 2022

(87) PCT Pub. No.: WO2021/116334

PCT Pub. Date: Jun. 17, 2021

(65) Prior Publication Data

US 2023/0037620 A1 Feb. 9, 2023

(30) Foreign Application Priority Data

Dec. 11, 2019 (EP) .................................... 19215244
Sep. 16, 2020 (WO) ................. PCT/EP2020/075890

(51) Int. Cl.
*C08G 77/18* (2006.01)
*C08G 77/00* (2006.01)
(Continued)

(52) U.S. Cl.
CPC ............. *C08G 77/18* (2013.01); *C08G 77/08* (2013.01); *C08G 77/26* (2013.01); *C08G 77/28* (2013.01);
(Continued)

(58) Field of Classification Search
CPC ................................ C08G 77/70; C08G 77/18
(Continued)

(56) References Cited

U.S. PATENT DOCUMENTS 5,733,644 A 3/1998 Tanaka et al.
10,208,164 B2 2/2019 Dogen et al.
(Continued)

FOREIGN PATENT DOCUMENTS

CN 104327269 A 2/2015
CN 110606990 A 12/2019
(Continued)

OTHER PUBLICATIONS

Chruscie, JJ., et al., Synthesis, Characterization and Microstructure of New Liquid Poly(methylhydrosiloxanes) Containing Branching Units SiO 4/2, Polymers 2018, 10, 484, Apr. 28, 2018.
(Continued)

*Primary Examiner* — Margaret G Moore

(74) *Attorney, Agent, or Firm* — Bryan D. Zerhusen, Esq.; Nicholas R. Herrel, Esq.; CANTOR COLBURN LLP

(57) ABSTRACT

The present invention pertains to a functionalized polymeric liquid polysiloxane material comprising non-organofunctional Q-type siloxane moieties and mono-organofunctional T-type siloxane moieties, as well as optionally tri-organo-
(Continued)

functional M-type siloxane moieties and/or di-organofunctional D-type siloxane moieties characterized in that the polysiloxane material has a specified degree of polymerization, comprises a limited low amount of four-membered Q2-type and/or Q3-type siloxane ring species relative to the total Q-type siloxane species, and is functionalized at specific moieties. The present invention further pertains to methods for producing the polymeric liquid polysiloxane material as well as associated uses of the material.

21 Claims, 19 Drawing Sheets

(51) Int. Cl.

| | |
|---|---|
| ***C08G 77/08*** | (2006.01) |
| ***C08G 77/26*** | (2006.01) |
| ***C08G 77/28*** | (2006.01) |
| ***C08G 77/30*** | (2006.01) |
| ***C08G 77/388*** | (2006.01) |
| ***C08G 77/392*** | (2006.01) |
| ***C08G 83/00*** | (2006.01) |
| ***C08L 63/00*** | (2006.01) |
| ***C08L 83/04*** | (2006.01) |
| ***C08L 83/06*** | (2006.01) |
| ***C08L 83/08*** | (2006.01) |
| ***C09D 183/06*** | (2006.01) |
| ***C09D 183/08*** | (2006.01) |
| ***C09J 183/06*** | (2006.01) |
| ***C09J 183/08*** | (2006.01) |

(52) U.S. Cl.
CPC ........... *C08G 77/30* (2013.01); *C08G 77/388* (2013.01); *C08G 77/392* (2013.01); *C08G 77/70* (2013.01); *C08G 83/005* (2013.01); *C08L 63/00* (2013.01); *C08L 83/04* (2013.01); *C08L 83/06* (2013.01); *C08L 83/08* (2013.01); *C09D 183/06* (2013.01); *C09D 183/08* (2013.01); *C09J 183/06* (2013.01); *C09J 183/08* (2013.01)

(58) Field of Classification Search
USPC ............................................................. 528/39
See application file for complete search history.

(56) References Cited

U.S. PATENT DOCUMENTS

| | | | | |
|---|---|---|---|---|
| 11,965,063 | B2 * | 4/2024 | Koebel | C08G 77/24 |
| 2006/0154069 | A1 * | 7/2006 | Lin | A61P 17/16 428/407 |
| 2008/0290472 | A1 * | 11/2008 | Yagihashi | C08K 3/36 524/588 |
| 2016/0075918 | A1 * | 3/2016 | Bögershausen | C09D 183/06 524/588 |
| 2017/0313726 | A1 * | 11/2017 | Wolter | C07F 7/04 |
| 2019/0153169 | A1 * | 5/2019 | Huang | C08G 77/34 |
| 2019/0292320 | A1 * | 9/2019 | Watanabe | C08G 77/18 |
| 2020/0010725 | A1 * | 1/2020 | Kotake | C09D 7/70 |
| 2023/0037620 | A1 * | 2/2023 | Koebel | C08G 77/30 |
| 2023/0047845 | A1 | 2/2023 | Fu et al. | |
| 2023/0348285 | A1 * | 11/2023 | Numrich | C01B 33/152 |

FOREIGN PATENT DOCUMENTS

| | | | |
|---|---|---|---|
| CN | 112625244 | A | 4/2021 |
| EP | 0728793 | A1 | 8/1996 |
| EP | 0518057 | B1 | 7/1998 |
| EP | 1510520 | A1 | 3/2005 |
| EP | 1978055 | A1 | 10/2008 |
| EP | 3498671 | A1 | 6/2019 |
| EP | 3578591 | A1 | 12/2019 |
| JP | H0718221 | A | 1/1995 |
| JP | 2003012803 | A | 1/2003 |
| JP | 2003049113 | A | 2/2003 |
| JP | 2005306338 | A | 8/2010 |
| JP | 2012184297 | A | 9/2012 |
| JP | 2017132879 | A | 8/2017 |
| WO | WO 2000/040640 | A1 | 7/2000 |
| WO | WO 2004/058859 | A1 | 7/2004 |
| WO | 20122077770 | A1 | 5/2014 |
| WO | 2014187972 | A1 | 11/2014 |
| WO | WO 2019/234062 | A1 | 12/2019 |
| WO | WO2021115646 | | 6/2021 |
| WO | 2022058059 | A1 | 3/2022 |

OTHER PUBLICATIONS

International Search Report and Written Opinion for PCT/EP2020/085619, dated Mar. 11, 2021.

Xiaomin Zhu, et al., One-pot synthesis of hyperbranched polyethoxysiloxanes, Macromolecules, vol. 39, Feb. 11, 2006 (Feb. 11, 2006), pp. 1701-1708, XP002798999.

Lei, X., et al., Hyperbranched polysiloxane (HBPSi)-based polyimide films with ultralow dielectric permittivity, desirable mechanical and thermal properties, J. Mater. Chem. C, 2016, 4, 2134-2146, Jan. 11, 2016.

Bradley, DC, et al, Niobium and tantalum mixed alkoxides, (J. Chem. Soc., 1958, 99-101, Jan. 1958.

Schärtl, W., Current directions in core-shell nanoparticle design, Nanoscale, 2010, 2, 829-843, Mar. 29, 2010.

Banerjee, M., et al., Enhanced antibacterial activity of bimetallic gold-silver core-shell nanoparticles at low silver concentration, Nanoscale, 2011, 3, 5120-5125, Sep. 10, 2011.

Jaumann, M., et al., Macromol. Chem. Phys. 2003, 204(7), 1014-1026, or Have Hyperbranched Polyalkoxysiloxanes via AB3-Type Monomers Feb. 26, 2003.

* cited by examiner c)

c)

c)

a)

FUNCTIONALIZED Q-T-SILOXANE-BASED POLYMERIC MATERIALS WITH LOW SILOXANE RING CONTENT AND METHOD FOR PREPARING SAME

CROSS-REFERENCE TO RELATED APPLICATIONS

The present application is a National Stage Entry of PCT/EP2020/085619, filed 10 Dec. 2020, published as WO 2021/116334 A1, which claims the benefit of and priority to EP Application 19215244.5, filed 11 Dec. 2019, and International Application PCT/EP2020/075890, filed 16 Sep. 2020, published as WO 2021/115646 A1, each of which is incorporated herein by reference in its entirety.

FIELD OF THE INVENTION

The present invention pertains to a functionalized polymeric liquid polysiloxane material comprising non-organofunctional Q-type siloxane moieties and mono-organofunctional T-type siloxane moieties, as well as optionally tri-organofunctional M-type siloxane moieties and/or di-organofunctional D-type siloxane moieties characterized in that the polysiloxane material has a specified degree of polymerization, comprises a limited low amount of four-membered $Q^2$-type and/or $Q^3$-type siloxane ring species relative to the total Q-type siloxane species, and is functionalized at specific moieties. The present invention further pertains to methods for producing the polymeric liquid polysiloxane material as well as associated uses of the material.

BACKGROUND OF THE INVENTION

In nanotechnology, organic/inorganic hybrid materials can be obtained through a rich variety of preparative techniques. Sol-gel based techniques for example operate in liquid solution, starting from a colloidal suspension of molecular or oligomeric precursors resulting in the spontaneous formation of nanoparticle building blocks. Sols are either prepared in situ from olation and condensation reactions of oligomeric polyhydroxymetallates or by hydrolysis of alkoxysilanes in water-alcohol mixtures. When a low degree of condensation is desired, only small amounts of water reactant are used which leads to branched siloxane compounds with low molecular weight. An example of such a preparation technique employing acid catalyzed hydrolysis in a neat system (solvent free) is described in EP 1 510 520 A1. Generally, hydrolysis with such low amounts of water of monomeric alkoxysilane yields oligomers. Many of the single component compounds are commercial, for example, for the case of Q-type Tetraethoxysilane (TEOS) there exist ethylsilicate commercial oligomer mixtures with a silicate content of 40 or even up to 50%, commonly referred to as ethylsilicate 40, ethylsilicate 50 or also know by their brand names e.g. Dynasylan 40 or Dynasylan Silbond 50 (Evonik Industries).

Hyperbranched polyethoxysiloxanes (PEGS) are small molecular building blocks with typical molecular weights ranging from 500 to 50'000 Dalton, spanning a size range from several Angströms to single digit nanometers. The word hyperbranched also means that those compounds feature a significant fraction of linear species, although they also contain siloxane rings to different extents. Preferred synthetic routes are water-free or "non-hydrolytic" reaction conditions. This is why in general, the preparation of hyperbranched siloxane polymers is far more versatile and offers better control over the final reaction products than the above-mentioned hydrolytic routes because the condensation reactions can be controlled by stoichiometric addition of the reactants. Furthermore, the synthesis can be carried out "neat", that means in absence of additional cosolvents such as alcohols. As a result of their highly dendritic structure, with a higher degree of polymerization in the center and a lower degree of the linear chain arms at their perimeter, PEOSs exhibit lower melt viscosities and a much greater solubility in themselves but also in other organic solvents than their linear chain siloxane analogues.

Hyperbranched PEGS can be an intriguing class of molecular precursor for all sorts of hybrid molecular building blocks, readily accessible by "non-hydrolytic" methods such as:

1) Condensation of metal hydroxides obtained by reaction of a metal alkoxide with an alkali hydroxide (silanol route);

2) Condensation of metal chlorides with metal alkoxides (chloride route);

3) Condensation of a single metal alkoxide with itself by ether elimination;

4) Condensation of a mixed acetoxy-alkoxy-metallate with itself by elimination of the corresponding acetic acid ester (acetoxy route); or 5) Condensation of metal alkoxides by reaction with acetic anhydride in presence of a suitable catalyst by acetic acid ester elimination (anhydride route).

Method 2) is described in EP0728793A1, where the preparation of hyperbranched polysiloxanes proceeds through heterocondensation of chloro- and alkoxysilanes through alkyl halide elimination. The reaction is catalyzed by Ti-, V- and Zr-containing organometallic compounds.

Method 3) is not well studied but postulated to enable condensation of various transition metal oxides following the pioneering works of Bradley et al. on alkoxy rearrangement mechanisms (J. Chem. Soc., 1958, 99-101].

Method 4) generally uses rather costly acetoxysilanes. WO 00/40640 A1 describes the preparation of lightly branched organosilicon compounds through acetoxy derivatization starting from dimethylsiloxane prepolymers which are crosslinked using trifunctional silanes. WO 00/40640 A1 describes the usefulness of the classic acetoxy route when only a few condensation bonds need to be made i.e. when connecting monomeric with oligomeric/polymeric building blocks to create larger macromolecules. This can be done for example by refluxing silanol terminated prepolymers with alkoxy terminated crosslinkers in the presence of acetic acid under refluxing at elevated temperature or directly with acetoxy-terminated crosslinkers (e.g. triacetoxysilanes).

Method 5) was published by Moeller et al. (e.g. Macromolecules 2006, 39, 1701-1708) and is a more advanced technique for polyalkylmetallate (PAM) preparation in terms of scalability, process safety and ease of implementation compared to methods 1) through 4). WO 2004/058859 A1 describes the preparation of single component PAMs using the anhydride route.

WO 2019/234062 A1 discloses a process for manufacturing a core-shell PEOS-core with an organofunctional silane shell material. WO 2019/234062 A1 describes the preparation of a hyperbranched ethylsilicate "core" by means of non-hydrolytic acetic anhydride condensation chemistry and then the grafting of a shell, made preferentially from a selection of organofunctional T-type trialkoxysilanes in a second temporally separated step to create a hybrid organofunctional core-shell molecular building block. Both steps are preferably carried out in the presence of a tetraalkoxytitanate rearrangement catalyst.

PCT/EP2020/075890 describes hyperbranched polyalkoxysiloxane materials comprising Q- and M-, D- and/or T-type functionality within the same macromolecule.

It is the objective of the present invention to provide improved and functionalized organofunctional hyperbranched polyalkoxysiloxane materials comprising Q- and T- and optionally M- and D-type functionality within the same macromolecule, methods for producing the same and various applications thereof.

SUMMARY OF THE INVENTION

In a first aspect, the present invention is directed to a polymeric liquid polysiloxane material comprising or consisting of:

(i) non-organofunctional Q-type siloxane moieties selected from the group consisting of:

$Q^1$

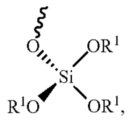

$Q^2$

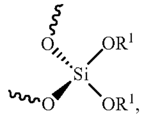

$Q^3$

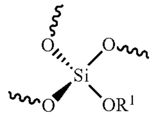

and $Q^4$

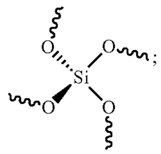

(ii) optionally tri-organofunctional $M^1$-type siloxane moieties selected from the group consisting of:

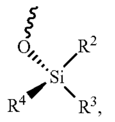

(iii) optionally di-organofunctional D-type siloxane moieties selected from the group consisting of:

$D^1$

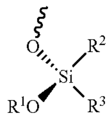

and

-continued $D^2$

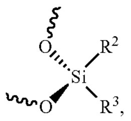

and (iv) mono-organofunctional T-type siloxane moieties selected from the group consisting of:

$T^1$

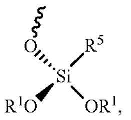

$T^2$

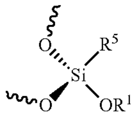

and $T^3$

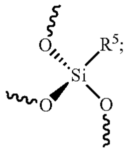

wherein

⌇ indicates a covalent siloxane bond to a silicon atom of another Q-, M-, D- and/or T-type moiety as defined in (i), (ii), (iii) and/or (iv);

$R^1$ is selected from the group consisting of methyl, ethyl, propyl, —P(=O)(OR$^{1'}$)(OH), —P(OR$^{1'}$)$_2$, —P(=O)(OH)$_2$, optionally methyl and ethyl;

$R^{1'}$ is selected from methyl, ethyl, propyl and butyl;

$R^2$, $R^3$ and $R^4$ are each independently selected from the group consisting of methyl, ethyl, phenyl, cyclohexyl, vinyl and cyclopentadienyl;

$R^5$ is selected from the group consisting of $R^{5U}$ and $R^{5S}$, wherein $R^{5U}$ is selected from the group consisting of methyl, ethyl, n-propyl, isopropyl, n-butyl, t-butyl, linear, branched or cyclic $C_{5-16}$ alkyl residues, optionally linear or branched hexyl, octyl, dodecyl, hexadecyl, (3,3,3-trifluoro)propyl, (1H,1H,2H,2H-perfluoro)octyl, (1H,1H,2H,2H-perfluoro)dodecyl, (1H,1H,2H,2H-perfluoro)hexadecyl, vinyl, phenyl, cyclohexyl, cyclopentadienyl, cyclopentyl,

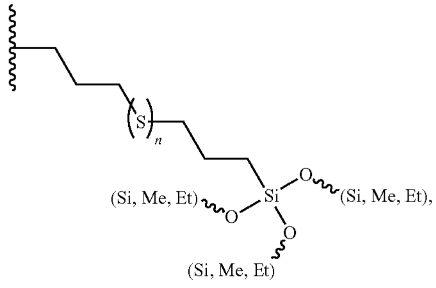

-continued

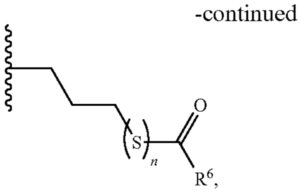

and -L-Z, wherein $R^6$ is selected from the group consisting of methyl, ethyl, n-butyl, linear or branched $C_{5-14}$ alkyl residues, optionally $—(CH_2)_5CH_3$, $—(CH_2)_6CH_3$, $—(CH_2)_7CH_3$, $—(CH_2)_8CH_3$, $—(CH_2)_9CH_3$, $—(CH_2)_{11}CH_3$ and $—(CH_2)_{13}CH_3$;

n is an integer selected from the group consisting of 1, 2, 3, 4 and 5;

L is an aliphatic linker selected from the group consisting of $—CH_2—$, $—CH_2CH_2—$, $—CH_2CH_2CH_2—$, $—C_6H_4—$, $—C_6H_4—CH_2—$, and $—CH_2—CH_2—C_6H_4—CH_2—$; and Z is a moiety selected from the group consisting of Cl, Br, I, —OH, —SH,

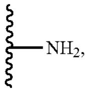
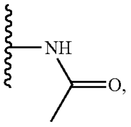
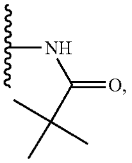
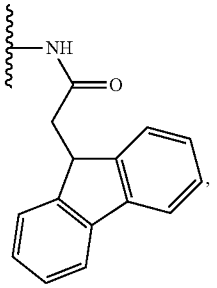
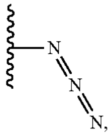
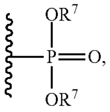
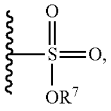
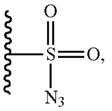
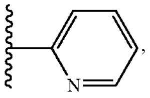
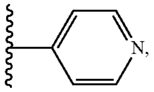
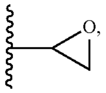
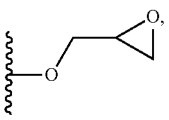
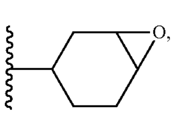
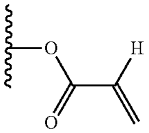
and
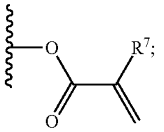

wherein IV is independently selected from the group consisting of methyl, ethyl and n-butyl;

$R^{5S'}$ is selected from the group consisting of

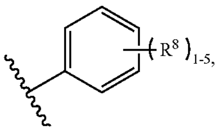
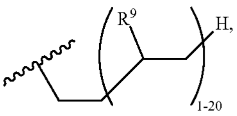
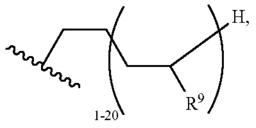
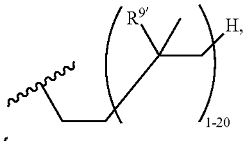
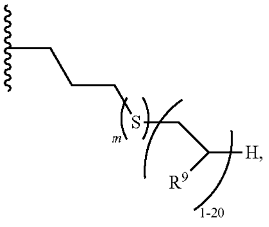
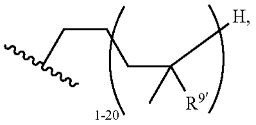
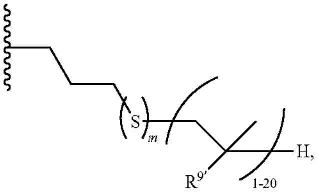
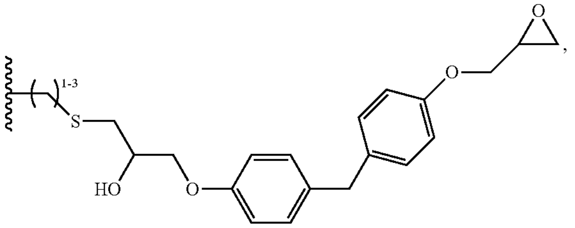
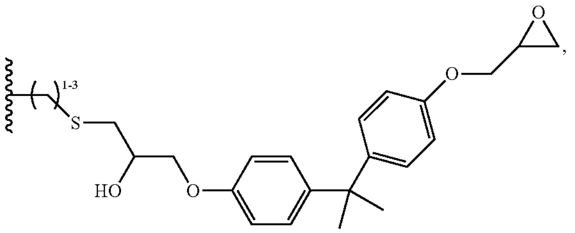
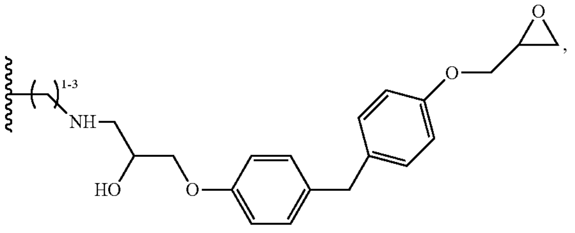
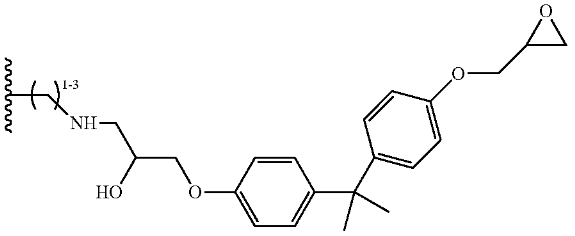

and -L'-Y, wherein m is an integer selected from the group consisting of 1, 2, 3 and 4;

$R^8$ is selected from the group consisting of —Cl, —Br, —I, —F, —CN, —SCN, —$N_3$, —$NO_2$, —OH, —$SO_2OR^{1'}$, and —O—C(=O)$R^{12}$;

$R^9$ is selected from the group consisting of —Cl, —Br, —I, —F, —CN, —COOH, —$COOR^{1'}$, phenyl, o-, m-, and p-vinylphenyl;

$R^{9'}$ is selected from the group consisting of —COOH and —$COOR^{1'}$;

L' is an aliphatic linker selected from the group consisting of —$CH_2$—, —$CH_2CH_2$—, and —$CH_2CH_2CH_2$—; and Y is a moiety selected from the group consisting of

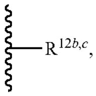,
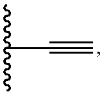,
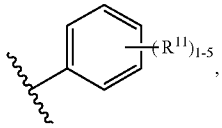,
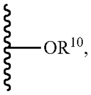,
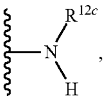,
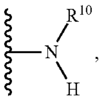,
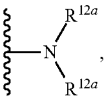,
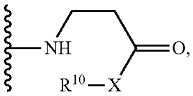,
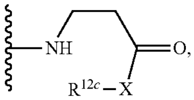,
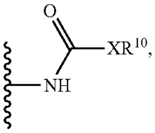,
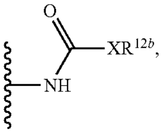,
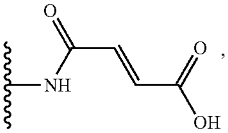,
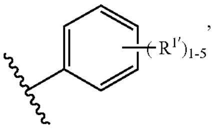,
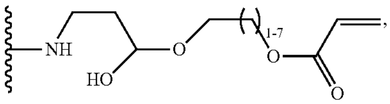,
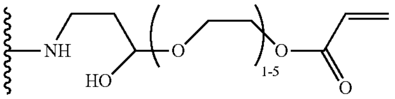,
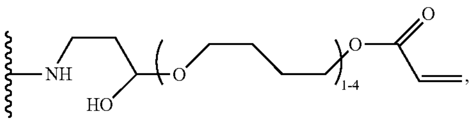,
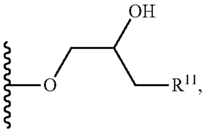,
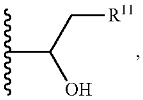,
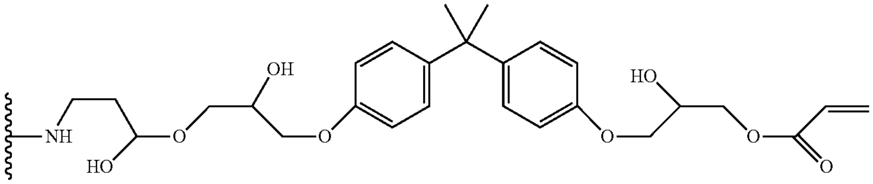,
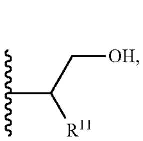,
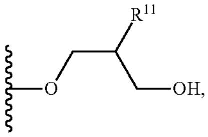,
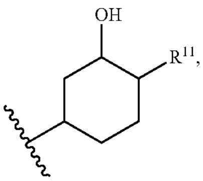,
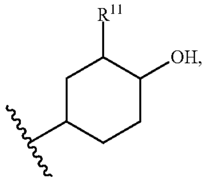,
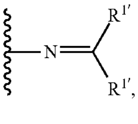,
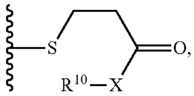,
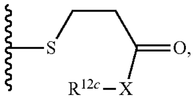,
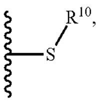,
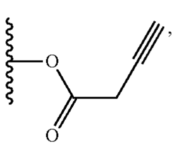,
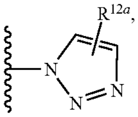,
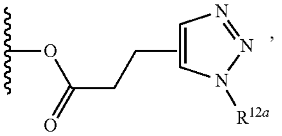,
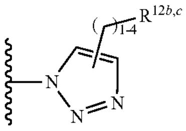
and
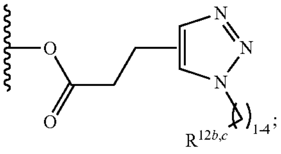;

wherein

X is absent, —(NH)— or —O—;

$R^{10}$ is selected from the group consisting of

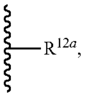,
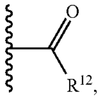,
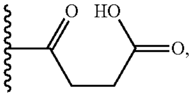,

-continued

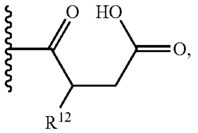

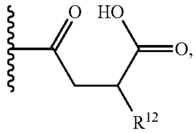

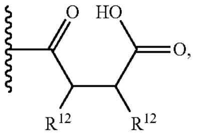

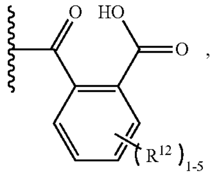

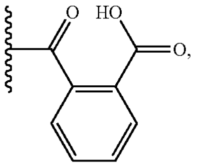

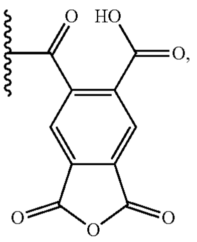

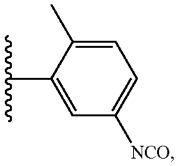

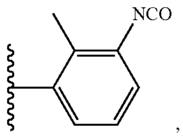

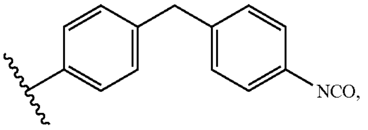

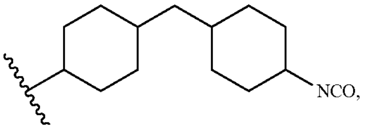

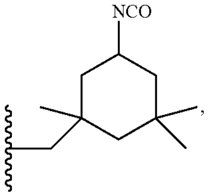

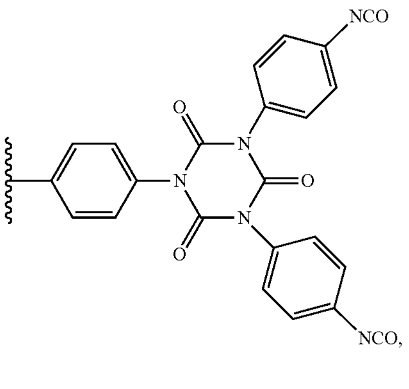

-continued

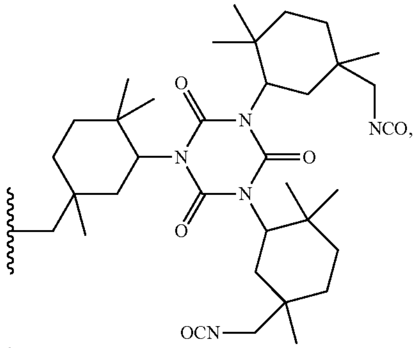

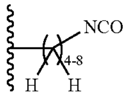

and

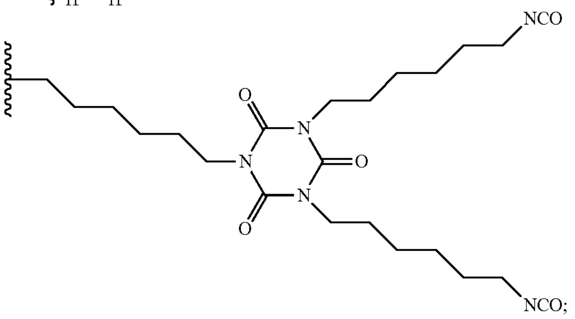

$R^{11}$ is selected from the group consisting of $R^8$, —X—$R^{1'}$ and $R^{12c}$;

$R^{12}$ is selected from the group consisting of $R^{12a}$, $R^{12b}$ and $R^{12c}$, wherein $R^{12a}$ is selected from the group consisting of linear or branched, substituted or non-substituted $C_{1-18}$ alkyl, $C_{2-18}$ alkenyl and $C_{2-18}$ alkynyl;

$R^{12b}$ is selected from the group consisting of linear or branched, substituted or non-substituted alkyl ether, alkenyl ether, alkynyl ether up to a molecular weight of 5000 g/mol, optionally substituted or unsubstituted poly(ethylene oxide), poly(propylene oxide) and polytetrahydrofuran;

unsubstituted polydimethylsiloxane and polydivinylsiloxane; and poly- and oligosaccharides up to a molecular weight of 5000 g/mol, optionally poly D-glucose, Oligo-D-glucose, chitosan, deacetylated oligo-chitin, oligo-beta-D-galactopyranuronic acid, poly alginic acid, oligo-alginic acid, poly amylose, oligo amylose, poly-galactose, and oligo-galactose with a molecular weight up to 5000 g/mol; and $R^{12c}$ is selected from the group consisting of amino acids, oligo- and poly-peptides up to a molecular weight of 5000 g/mol; optionally oligo- and poly-peptides made of naturally occurring amino acids up to a molecular weight of 5000 g/mol; and $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids, optionally epoxidized castor oil, soybean oil, sunflower oil, optionally ring opened epoxidized fatty acid based polyols, optionally natural oil based polyols (NOPs), optionally castor oil, soybean oil, or sunflower oil triglycerides.

with the proviso that $R^{5S}$ is not

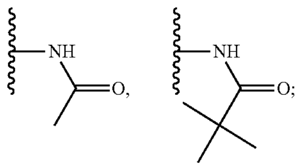

wherein the degree of polymerization of the Q-type alkoxy-terminated moieties $DP_{Q\text{-}type}$ is in the range of 1.3 to 2.7;

the degree of polymerization of the D-type alkoxy-terminated siloxane moieties $DP_{D\text{-}type}$ is in the range of 1.0 to 1.9;

the degree of polymerization of the T-type alkoxy-terminated siloxane moieties $DP_{T\text{-}type}$ is in the range of 1.1 to 2.7;

the total content of tri-organofunctional M-type siloxane moieties (iii) in the polysiloxane material does not exceed 15 mol-%, optionally 10 mol-%, optionally does not exceed 5 mol-%;

the total content of di-organofunctional D-type siloxane moieties (iii) in the polysiloxane material does not exceed 5, 10, 20, 30, 35 or 50 mol-%;

the material has a viscosity in the range of 10 to 100'000 cP, optionally about 25 bis 50'000 cP, optionally 10 to 1'000 cP;

the material comprises less than 5, 2.5, 2, 1.5, 1 or 0.5 mol-% silanol groups (Si—OH);

the atomic ratio of T- to Q-species in the material is in the range of 0.01:1 to 1:1;

at least 1 mol-%, optionally at least 3 mol-%, optionally at least 5 mol-% optionally at least 7 mol-% of all $R^5$ moieties in the material are $R^{5S}$ moieties;

characterized in that the polysiloxane material comprises less than 45, optionally less than 37, optionally less than 30 or less than 25 mol-% four-membered combined $Q^{2r}$-type and $Q^{3s}$, $Q^{3s,d}$-type siloxane ring species relative to the total Q-type siloxane species; and/or the polysiloxane material comprises less than 70, optionally less than 63, optionally less than 56 or less than 50 mol-% four-membered combined $Q^{3s,3d}$-type siloxane ring species relative to all $Q^3$-type siloxane species; and/or the polysiloxane material comprises less than 4.5, optionally less than 4.0, optionally less than 3.5 or less than 3.0 mol-% double four-membered $Q^{3d}$-type siloxane ring species relative to the total Q-type siloxane species; and/or the polysiloxane material comprises less than 25, optionally less than 20, optionally less than 17 or less than 14 mol-% double four-membered $Q^{3d}$-type siloxane ring species relative to all $Q^3$-type siloxane species.

The terminology of a double four membered siloxane ring species and $Q^{2r}$, $Q^{3s}$, as well as $Q^{3d}$ is explained further below.

For example, the polymeric liquid polysiloxane material described herein for all aspects can be of a core-shell structure, wherein the core is composed of a majority of Q-type moieties and has a different composition than the shell, which is composed primarily of T-type moieties, and optionally further comprises M- and D-type moieties. Herein, the core is also referred to as the "precursor (material)". Alternatively, the polymeric liquid material can also comprise a "core-only" material, meaning that there is no shell and that Q- and T-type moieties are essentially randomly distributed within said core. The term "core-shell", as used herein, is commonly understood in the art (see, e.g., Nanoscale, 2010, 2, 829-843 or Nanoscale, 2011, 3, 5120-5125). Concerning core-shell products, the interface between core and shell must be understood as a diffuse shell rather than a sharp boundary at which composition changes abruptly. This diffuse shell layer architecture, where the concentration of the functional shell species varies over a few bond lengths or Angstroms, is a direct result of the condensation chemistry, that is, the grafting of a functional silane shell onto a preformed polysiloxane core. Because the outer arms of the dendritic polysiloxane core are highly permeable to smaller silane monomers and oligomers, it is clear that the extent of grafting of the shell is highest on the periphery but there is no sharp cutoff. Nevertheless, the term core-shell still applies as grafting in the center of the core is highly hindered for both, steric reasons and reduced availability of reactive alkoxy groups, because the average connectivity (number of bridging oxygen linkages (Si—O—Si bonds) per silicon center) in the center of the core is higher than at the core perimeter. Consequently, the term core-shell will be used in the context of polymeric liquid materials in the sense of a polysiloxane core with a diffuse shell as described herein.

If $R^5$ comprises silane moieties, the resulting moieties are referred to as "bipodal silanes".

The polysiloxane materials described herein are highly dendritic linear and liquid species due to the low number of four-membered $Q^{2r}$-type and/or $Q^{3s,3d}$-type siloxane ring species.

For example, a typical material according to the present invention may also comprise Q-, T-, D- and/or M-type silane monomers ($Q^0$, $T^0$, $D^0$, $M^0$), e.g. in smaller molar quantities compared to the $Q^n$, $T^n$, $D^n$ and $M^n$, with n≥1, moieties, in other words, the total molar siloxane content must be higher than the total molar silane monomer content, excluding HMDSO which may be present in any amounts, also as a monomer, e.g. also as a solvent or co-solvent. Similarly, the material may optionally contain substantial fractions of smaller oligomers, for example a mixture of oligomers that spans a range from, e.g. dimer to pentamer polysiloxanes, optionally also featuring mixed Q-T and optionally Q-D bonding modes.

The material of the present invention comprises less than 5, 2.5, 2, 1.5, 1 or 0.5 mol-% silanol groups (Si—OH), this means that the $OR^1$ moieties of Q-, T- or D-type silanes are —OH groups to this extent.

It was surprisingly found that the material described herein can be prepared, e.g. by using a rearrangement catalyst as described herein, without the need for any active condensation reagents such as acetic anhydride. The M-, D- and/or T-type silanes react with the Q-type precursor or core material in a nucleophilic substitution/condensation ("rearrangement") reaction. Without wishing to be bound by theory, it is believed that one of the driving forces for this substitution reaction (also called "grafting") results from the ring strain of four-membered $Q^{2r}$-type and/or $Q^{3s,d}$-type siloxane ring species in the Q-type precursor material used for preparing the polysiloxane materials described herein. The release of ring tension in the Q-type core material is sufficient for efficiently adding, i.e. grafting, M-, D- and/or T-type silanes onto the Q-type core material without the need for further chemical reagents such as acetic anhydride and, if the reaction time can be extended considerably, essentially also without the need for a rearrangement catalyst as defined herein. An exemplary structural formula (2D representation) of such a core material is shown in FIG. 1., where selected typical $R^1$ alkoxy ligand populations can be seen depending on the relative abundance of the monomer or oligomer Q-type starting materials used in the respective precursor preparation.

Furthermore, a similar structural exemplary representation of a material described herein is shown in FIG. 2, again as a general case with various organofunctional T, D and M functionalities and also as specialized cases with three non-identical T-type functionalities.

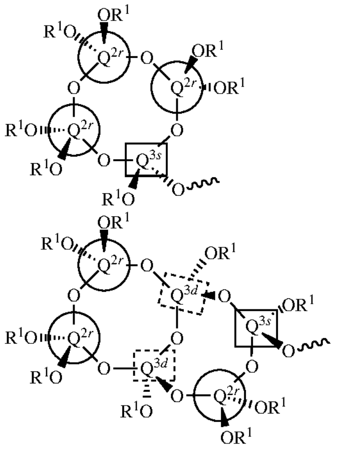

The term "four-membered" ring or polysiloxane ring or Q-type ring species as referred to herein always refers to an ensemble of all $Q^{2r}$ and $Q^{3s,d}$-type moieties comprised in the material which are part of a four membered polysiloxane ring structure. Two representative examples of such typical configurations of moieties in single and double four-membered ring structures are shown in the above formulas. $Q^{2r}$ ring moieties occur in both, "single" and "double" ring structures and comprise two siloxane bonds on each $Q^{2r}$ which are both part of the ring structure and two alkoxy group ($—OR^1$) substituents. In the example on the left of a single four-membered siloxane ring, only $Q^{2r}$ ring (circle) and "single ring" $Q^{3s}$ (square) species are possible. In the second example of two connected four-membered siloxane rings (a bi-cyclic structure) shown on the right, in addition to $Q^{2r}$ ring species (circle) and "single ring" $Q^{3s}$ (square) species, also "double ring" $Q^{3d}$ (rectangle, dashed line) moieties are possible, which are located at the bridge sites connecting the two rings. It is noted that in these $Q^{3d}$ species, all siloxane bonds are part of the double ring network. Also, it is noted that the wiggly lines on the oxygen atoms connected to $Q^{3s}$ moieties represent a siloxane bond to any other possible Cr, $T^n$, $D^n$ or $M^n$ moiety with n≥=1. It must further be understood, that in the above examples for typical configurations, moieties are of Q-type but that these are only examples for assisting the skilled person's understanding but in reality there is no restriction to Q-type moieties. In fact it is within the scope of this disclosure and very much expected that in such four-membered polysiloxane ring structures also T-type and/or D-type moieties will be present.

Herein, $Q^2$ species in any four membered siloxane ring structures are termed "$Q^{2r}$" and "$Q^3$" species in single ring structures and in double ring structures are termed "$Q^{3s}$" and "$Q^{3d}$", respectively.

For quantification purposes, there are different indicators that can be used to define or constrict the above mentioned four membered polysiloxane ring species. A first indicator is to be defined as the total number of $Q^{2r}$ and $Q^{3s,d}$ ring species over the total Q species in the material:

$$\%\ (Q^{2r}\ \&\ Q^{3s,d})\ \text{ring species} = 100\cdot\sum(A_{Q2rings} + A_{Q3rings}/\sum(A_{Qn}) = 100\cdot(A_{Q2r} + A_{Q3s} + A_{Q3r})/(A_{Q0} + A_{Q1} + A_{Q2} + A_{Q3} + A_{Q4});$$

A second indicator is to be defined as the total number of $Q^{3s,d}$ ring species over all $Q^3$ species in the material:

$$\%\ (Q^{3s,d})\ \text{ring species within}\ Q^3 = 100\cdot\sum(A_{Q3rings})/A_{Q3} = 100\cdot(A_{Q3s} + A_{Q3d})/A_{Q3} = 100(1-(A_{Q3l}/A_{Q3}))$$

A third indicator is to be defined as the total number of $Q^{3d}$ ring species over the total Q species in the material:

$$\%\ (Q^{3d})\ \text{ring species} = 100\cdot A_{Q3d}/\sum(A_{Qn}) = 100\cdot A_{Q3d}/(A_{Q0} + A_{Q1} + A_{Q2} + A_{Q3} + A_{Q4});$$

A fourth indicator is to be defined as the total number of $Q^{3d}$ ring species over all $Q^3$ species in the material:

$$\%\ (Q^{3d})\ \text{ring species within}\ Q3 = 100\cdot A_{Q3d}/A_{Q3};$$

All mol-% numbers described herein—unless specifically mentioned otherwise—are defined by the sum of all D-, M- or T-type silicon atoms divided by the sum of all silicon atoms in the material, e.g. as measured by means of quantitative $^{29}$Si-NMR. The variable A is the spectral peak area as defined further below.

The mol-% of four-membered $Q^2$-type and/or $Q^3$-type siloxane ring species relative to the total Q-type siloxane species can be determined by $^{29}$Si-NMR analysis, as demonstrated below in the examples. The polysiloxane material described herein comprises less than the stated mol-% four-membered ($Q^{2r}$ & $Q^{3s,d}$) and/or ($Q^{2r}$) and/or ($Q^{3s}$ single) and/or ($Q^{3d}$ double) ring species relative to the total Q-type siloxane species. This means that the material comprises either less than the stated mol-% four-membered $Q^{2r}$-type siloxane ring species, less than the stated mol-% four-membered $Q^{3s,d}$-type siloxane ring species and/or less than the stated mol-% four-membered $Q^{2r}$-type and $Q^{3s,d}$-type siloxane ring species, cumulatively. For all embodiments described herein, the four-membered $Q^{3s,d}$-type siloxane ring species includes $Q^{3s,d}$-type siloxane species, wherein one $Q^{3s,d}$-type siloxane is part of one or two four-membered rings.

The atomic ratio of T- to Q-species in the material is the ratio between the silicon atoms of all T-type species ($T^0$, $T^1$, $T^2$ and $T^3$) and the silicon atoms of all Q-type species ($Q^0$, $Q^1$, $Q^2$, $Q^3$ and $Q^4$).

The polymeric liquid polysiloxane material described herein is $R^{5S}$-functionalized, i.e. at least 1 mol-%, optionally at least 3 mol-%, optionally at least 5 mol-% optionally at least 7 mol-% of all $R^5$ moieties in the material are $R^{5S}$ moieties, wherein $R^{5S}$ is considered a functionalized moiety. The $R^{5S}$-functionalization may be introduced into the polysiloxane material by either selecting T-type silane or siloxane moieties which are already $R^{5S}$-functionalized (i.e. are pre-$R^{5S}$-functionalized $T^0$ or T-type oligomer precursors used for rearrangement grafting) for the manufacture of the polysiloxane material, i.e. T-type monomer or oligomer compounds which comprise $R^{5S}$ moieties, e.g. to the extent as defined herein, or alternatively to a lesser extent, i.e. less than 1 mol-%. If the T-type siloxane or silane moieties in a material otherwise corresponding to that disclosed herein comprise no or less than 1 mol-% $R^{5S}$ (relative to the total mole number of $R^5$ T-type substituents), the T-type siloxane moieties can be $R^{5S}$-functionalized either by functionalizing $R^{5U}$ on already grafted T-type siloxane moieties or by grafting further, pre-$R^{5S}$-functionalized T-type silanes or oligomers comprising $R^{5S}$ moieties. The functionalization of $R^{5U}$ moieties can be done by known chemical methods and is described in the context of the present method. It is noted that the $R^{5S}$-functionalization, as described herein, is a specific form of functionalization, whereas the general term "organofunctional silane or siloxane" refers to a silane/siloxane generally bearing an organic residue directly bound to the silicon atom.

Optionally for all aspects and embodiments described herein, 0 mol-% of all $R^5$ moieties in the material are $R^{5S}$ moieties.

If $R^{5U}$ moieties of grafted T-type siloxanes are functionalized, it is within the scope of the present invention that in cases where some reactivity or comparable reactivity or even no chemical selectivity difference between $R^{5U}$ and $R^2$, $R^3$, $R^4$ substituents can be expected, some, e.g. 5 to 95 mol-% or e.g. 25 to 90% of $R^2$, $R^3$ and/or $R^4$ moieties relative to $R^{5U}$ are functionalized if $R^2$, $R^3$ and/or $R^4$ are selected from phenyl and vinyl. The functionalization of $R^2$, $R^3$ and/or $R^4$ moieties may lead to the following exemplary chemical entities:

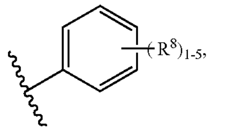

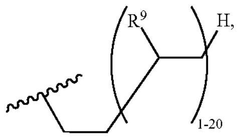

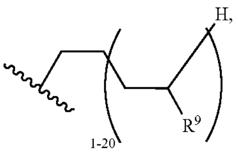

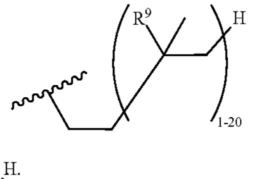

and

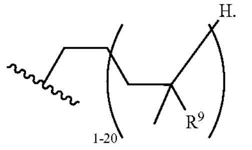

The functionalization of $R^2$, $R^3$, $R^4$ and $R^5$ can be identified and quantified by known spectroscopic means, e.g. by nuclear magnetic resonance spectroscopy, e.g. by $^1H$-, $^{13}C$-, and optionally $^{15}N$ or $^{33}S$ or $^{31}P$-NMR, optionally with isotope enrichment for analytical verification of these functionalization reactions. Specifically, during these types of organic reactions, e.g. addition or substitution or radical reactions, proton and carbon signatures experience a shift in their NMR response due to the change in electronic structure and structural environment and its resulting impact on the magnetic couplings. Typically, a signature from a proton or group of protons or carbon(s) will disappear when such an organic reaction takes place and a new peak appears further up or downfield in the spectrum depending on how the functionalization reaction impacted the magnetic couplings of these species in question. Thus, both the disappearance of the old chemical signature and the appearance of the new signature can be followed quantitatively with NMR spectroscopy. Quantitative reaction monitoring of organic reactions is common general knowledge and does not need further description.

The term "non-substituted" as used herein shall mean substituted only with hydrogen. The term "substituted" as used herein, means that any one or more hydrogens on the designated atom or group is replaced, independently, with an atom different from hydrogen, optionally by a halogen, optionally by fluorine, chlorine, bromine, iodine, a thiol, a carboxyl, an acrylato, a cyano, a nitro, an alkyl (optionally $C_1$-$C_{10}$), aryl (optionally phenyl, benzyl or benzoyl), an alkoxy group, a sulfonyl group, by a tertiary or quaternary amine or by a selection from the indicated substituents, provided that the designated atom's normal valence is not exceeded, and that the substitution results in a stable compound, i.e., a compound that can be isolated and characterized using conventional means. Optionally, the substitution occurs on the beta position or the omega (opposite terminal hydrocarbon, if the $R^{5S}$ substituent linkage is through the alpha position) of the hydrocarbon chain or optionally on the beta or gamma position of the hydrocarbon chain (next or next-next neighboring carbons from substituent attachment carbon). In the case of unsaturated hydrocarbons, the substitution occurs optionally on the beta or omega position of the hydrocarbon chain or optionally on the carbon being part of a double or triple bond or on its directly adjacent carbon.

In the context of the present invention it is understood that antecedent terms such as "linear or branched", "substituted or non-substituted" indicate that each one of the subsequent terms is to be interpreted as being modified by said antecedent term. For example, the scope of the term "linear or branched, substituted or non-substituted alkyl, alkenyl, alkynyl, carbocycle" encompasses linear or branched, substituted or non-substituted alkyl; linear or branched, substituted or non-substituted alkenyl; linear or branched, substituted or non-substituted alkynyl; linear or branched, substituted or non-substituted alkylidene; and linear or branched, substituted or non-substituted carbocycle. For example, the term "$C_{1-18}$ alkyl, $C_{2-18}$ alkenyl and $C_{2-18}$ alkynyl" indicates the group of compounds having 1 or 2 to 18 carbons and alkyl, alkenyl or alkynyl functionality.

The expression "alkyl" refers to a saturated, straight-chain or branched hydrocarbon group that contains the number of carbon items indicated, e.g. linear or branched "($C_{1-18}$) alkyl" denotes a hydrocarbon residue containing from 1 to 18 carbon atoms, e.g. a methyl, ethyl, propyl, iso-propyl, n-butyl, iso-butyl, sec-butyl, tert-butyl, n-pentyl, iso-pentyl, n-hexyl, 2,2-dimethylbutyl, etc.

If an alkyl chain is characterized by a name that allows for linear or branched isomers, all linear or branched isomers are encompassed by that name. For example, "butyl" encompasses n-butyl, iso-butyl, sec-butyl and tert-butyl.

The expression "alkenyl" refers to an at least partially unsaturated, substituted or non-substituted straight-chain or branched hydrocarbon group that contains the number of carbon atoms indicated, e.g. "($C_{2-18}$)alkenyl" denotes a hydrocarbon residue containing from 2 to 18 carbon atoms, for example an ethenyl (vinyl), propenyl (allyl), iso-propenyl, butenyl, iso-prenyl or hex-2-enyl group, or, for example, a hydrocarbon group comprising a methylene chain interrupted by one double bond as, for example, found in monounsaturated fatty acids or a hydrocarbon group comprising methylene-interrupted polyenes, e.g. hydrocarbon groups comprising two or more of the following structural unit —[CH═CH—$CH_2$]—, as, for example, found in polyunsaturated fatty acids.

The expression "alkynyl" refers to at least partially unsaturated, substituted or non-substituted straight-chain or branched hydrocarbon groups that may contain, e.g. from 2 to 18 carbon atoms, for example an ethinyl, propinyl, butinyl, acetylenyl, or propargyl group.

The expressions "alkyl ether" refers to a saturated or non-saturated, straight-chain or branched hydrocarbon group that contains the number of atoms that result in a molecular weight of up to 5000 g/mol. Alkyl ether groups as used herein, shall be understood to mean any linear or branched, substituted or non-substituted alkyl chain comprising an oxygen atom as an ether motif, i.e. an oxygen bound by two methylene groups. Exemplary alkyl ethers are polyethylene glycol (PEG), poly(propylene oxide), polypropylene glycol (PPG) and polytetrahydrofuran chains. The ether residue is attached to the Formula provided in the present invention via the oxygen atom of the ether residue. Optionally, if the ether residue is substituted at a carbon atom with a nucleophilic substituent, e.g. an amine or a thiol, the ether residue can be attached to the Formula provided in the present invention via the nucleophilic substituent.

As used herein, a wording defining the limits of a range of length such as, e. g., "from 1 to 5" or "($C_{1-5}$)" means any integer from 1 to 5, i.e. 1, 2, 3, 4 and 5. In other words, any range defined by two integers explicitly mentioned is meant to comprise and disclose any integer defining said limits and any integer comprised in said range.

The scope of the present invention includes those analogs of the compounds as described above and in the claims that feature the exchange of one or more carbon-bonded hydrogens, optionally one or more aromatic carbon-bonded hydrogens, with halogen atoms such as F, Cl, or Br, optionally F.

If a residue or group described herein is characterized in having two further residues of the same name, e.g. in $R^{10}$ being

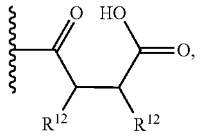

each of these further residues (in this example Ru) can be independently selected from the definitions of this residue (in this example $R^{12}$) given herein.

The skilled person is aware that any combination of $R^{1'}$, $R^8$, $R^9$, $R^{9'}$, L', Y, X, $R^{10}$, $R^{11}$ and $R^{12}$ for forming $R^{5S}$ must lead to a stable compound, i.e., a compound that can be isolated and characterized using conventional means. The skilled person can determine from his common general knowledge which compound, i.e. combination of $R^{1'}$, $R^8$, $R^9$, $R^{9'}$, L', Y, X, $R^{10}$, $R^{11}$ and $R^{12}$ is not stable and specifically which linker chemistries are possible and do not interfere with other chemical functionalities in the polymeric liquid material. Any combination of $R^{1'}$, $R^8$, $R^9$, $R^{9'}$, L', Y, X, $R^{10}$, $R^{11}$ and $R^{12}$ that would result in a not stable compound is excluded from the scope of the claims.

For example, poly- and oligosaccharides in the context of $R^{12b}$ are connected to the respective moiety (e.g. to $R^8$, Y, $R^{10}$, or $R^{11}$) via an oxygen atom or optionally via a nitrogen atom (e.g. chitosan).

For example, amino acids, oligo- or polypeptides in the context of $R^{12c}$ are connected to o the respective moiety (e.g. to $R^8$, Y, $R^{10}$, or $R^{11}$) via their amine or via the carbonyl carbon or optionally via a thiol (e.g. in the case of cysteine containing $R^{12b}$).

Fatty acids in the context of $R^{12c}$ are, for example, connected to o the respective moiety (e.g. to $R^8$, Y, $R^{10}$, or $R^{11}$) via a hydroxyl group (e.g. for castor oil) or via the carboxylic acid functionality or optionally for unsaturated fatty acids through the double bond group(s), e.g. via radical polymerization chemistry.

Triglycerides or polyols derived from fatty acids by epoxidation and ring opening with for example an alkali hydroxide base can also be connected via the hydroxyl functionality, either directly by means of ether linkages or esterification or optionally by secondary substitution e.g. by brominating or oxidation to the ketone and e.g. subsequent further substitution or optionally by reaction with isocyanate terminated $R^{5S}$ groups.

In an embodiment, the polymeric liquid hyperbranched polysiloxane material of the present invention is one, wherein $R^8$ is selected from the group consisting of —Cl, —Br, —I, —CN, —SCN, —$N_3$, —$NO_2$, —$SO_2OR^{1'}$, and —O—C(═O)$R^{1'}$;

Y is selected from the group consisting of

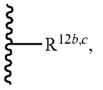
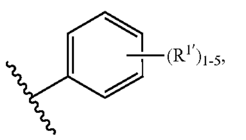
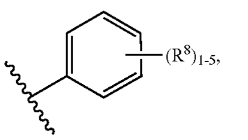
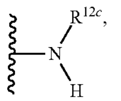
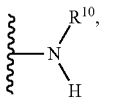
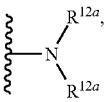

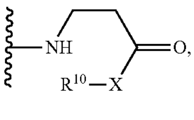
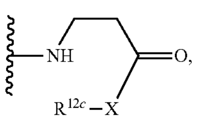
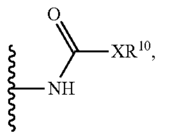
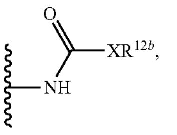

-continued
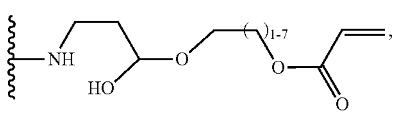 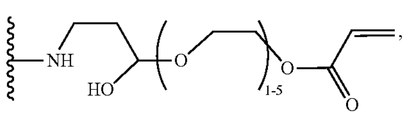 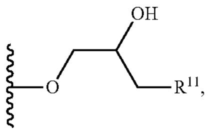
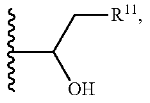 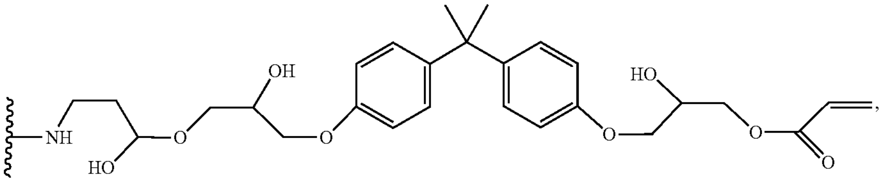
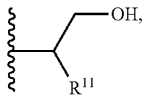 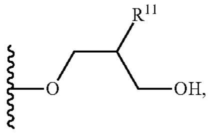 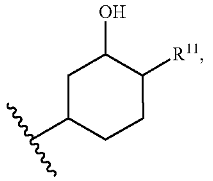 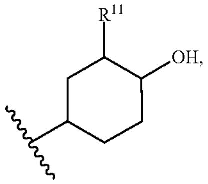 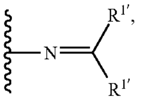
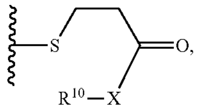 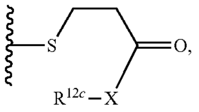 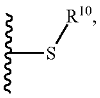 and 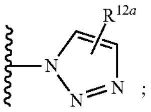 ;
$R^{10}$ is selected from the group consisting of
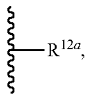 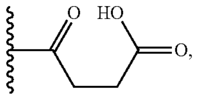 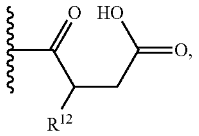
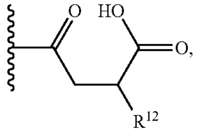 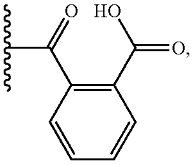
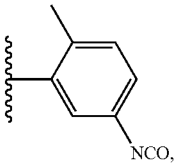
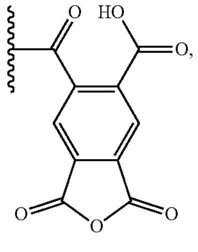
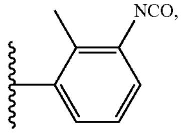 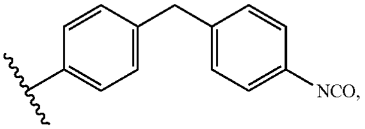
-continued
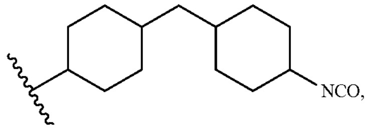
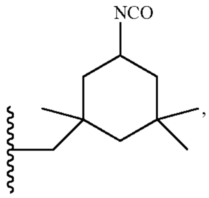
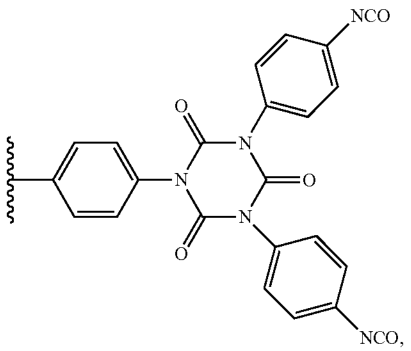

-continued

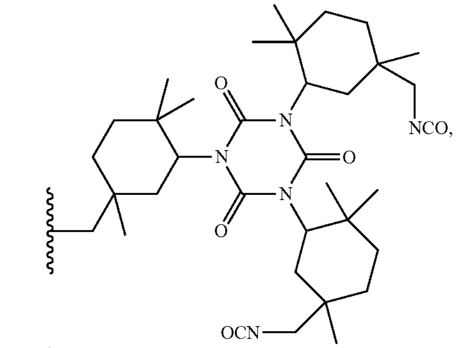

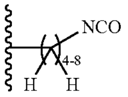

and

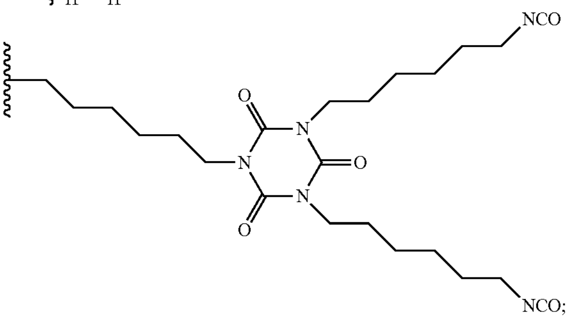

$R^{11}$ is selected from $R^8$ and optionally $R^{12c}$; and $R^{12}$ is selected from the group consisting of $R^{12a}$, $R^{12b}$, $R^{12c}$, wherein

- $R^{12a}$ is selected from the group consisting of linear or branched, substituted or non-substituted $C_{1-18}$ alkyl, or $C_{2-18}$ alkenyl;
- $R^{12b}$ is selected from the group consisting of
  - linear or branched, non-substituted or terminally amino- or thiol-substituted alkyl or alkenyl ethers up to a molecular weight of 3000 g/mol, optionally terminally amino- or thiol-substituted or unsubstituted poly(ethylene oxide), poly(propylene oxide) and polytetrahydrofuran;
  - poly- or oligosaccharides up to a molecular weight of 3000 g/mol, optionally Poly D-glucose, Oligo-D-glucose, chitosan, deacetylated oligo-chitin, oligo-beta-D-galactopyranuronic acid, Poly alginic acid, oligo-alginic acid, poly amylose, oligo amylose, poly-galactose, oligo-galactose with a molecular weight up to 3000 g/mol; and
  - optionally unsubstituted polydimethylsiloxane or polydivinylsiloxane; and
- $R^{12c}$ is selected from the group consisting of
  - amino acids and oligo- or poly-peptides up to a molecular weight of 3000 g/mol; optionally oligo- and poly-peptides made of naturally occurring amino acids up to a molecular weight of 3000 g/mol; and
  - $C_{12-24}$ fatty acids, optionally naturally occurring $C_{12-24}$ fatty acids, optionally naturally occurring unsaturated fatty acids, optionally $C_{12-24}$ naturally occurring unsaturated fatty acids with 1 to 3 double bonds, optionally epoxidized fatty acids such as epoxidized castor oil, soybean oil, sunflower oil, optionally ring opened epoxidized fatty acid based polyols, optionally natural oil based polyols (NOPs) such as castor oil, soybean oil, or sunflower oil triglycerides.

In another embodiment, the polymeric liquid hyperbranched polysiloxane material according to the present invention is one, wherein $R^8$ is selected from the group consisting of —Cl, —Br, —I, —CN, —SCN, —$N_3$, —$NO_2$, —$SO_2OR^{1'}$, and —O—C(=O)$R^{1'}$;

Y is selected from the group consisting of

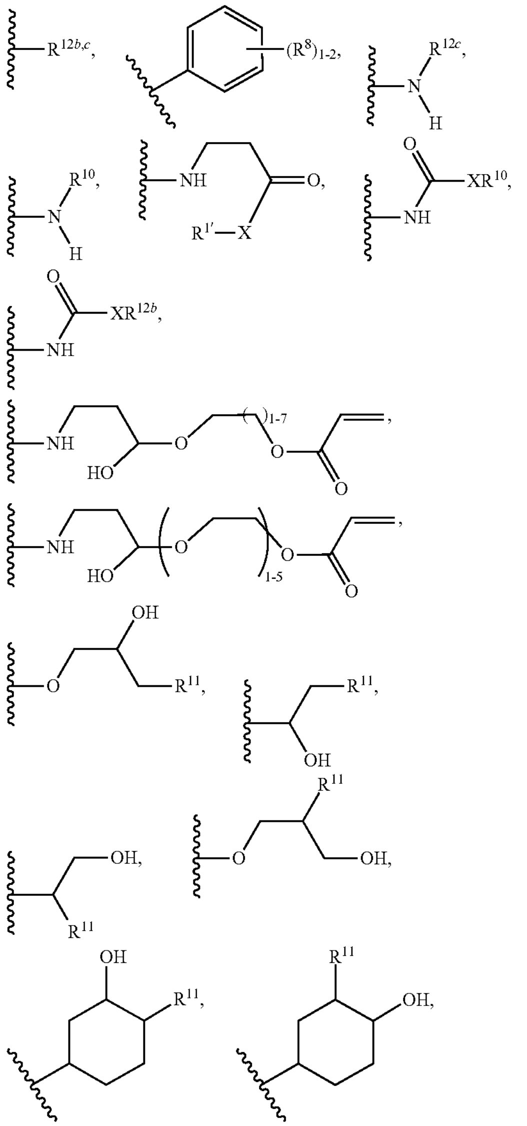

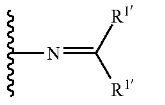

and

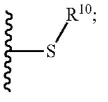

$R^{10}$ is selected from the group consisting of

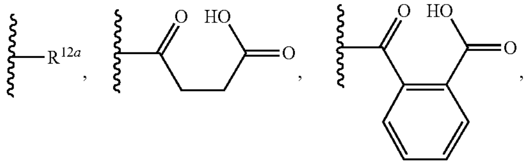

-continued

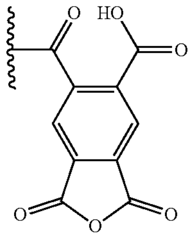,
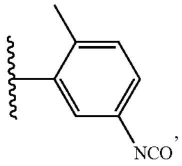,
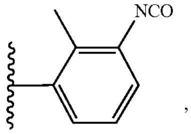,
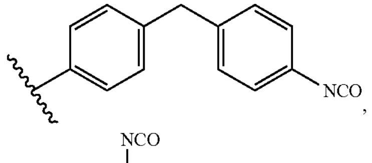,
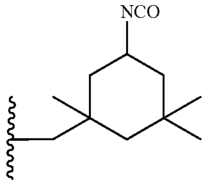
and
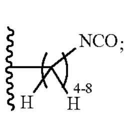

$R^{11}$ is selected from $R^8$ and optionally $R^{12c}$; and $R^{12}$ is selected from the group consisting of $R^{12a}$, $R^{12b}$, $R^{12c}$, wherein $R^{12a}$ is selected from the group consisting of linear or branched, substituted or non-substituted $C_{1-12}$ alkyl and $C_{2-12}$ alkenyl; Rub is selected from the group consisting of linear, non-substituted or terminally amino-substituted alkyl ethers up to a molecular weight of 2000 g/mol, optionally non-substituted or terminally amino-substituted poly(ethylene oxide) and poly(propylene oxide); and poly- or oligosaccharides up to a molecular weight of 2000 g/mol, optionally poly-D-glucose, oligo-D-glucose, chitosan, deacetylated oligo-chitin and oligo-beta-D-galactopyranuronic acid; and $R^{12c}$ is selected from the group consisting of amino acids and oligo- or poly-peptides up to a molecular weight of 2000 g/made of naturally occurring amino acids;

castor oil, soybean oil, and sunflower oil triglycerides; and naturally occurring $C_{12-24}$ fatty acids, optionally naturally occurring $C_{12-24}$ unsaturated fatty acids with 1 to 3 double bonds.

In a further embodiment, the polymeric liquid hyperbranched polysiloxane material of the present invention is one, wherein the material comprises (v) at least two non-identically $R^5$-substituted mono-organofunctional T-type alkoxy-terminated siloxane populations, each population making up at least 3 mol-% of all mono-organofunctional T-type moieties in the material; and/or (vi) chiral mono-organofunctional $T^1$-type moieties in an amount of at least 3 mol-% relative to all mono-organofunctional T-type moieties in the material.

The term "population", as used herein, refers to a collection of moieties or a given organofunctional T-Type or D-type or, optionally M-Type moiety in the polymeric material. As an example, grafting or heterocondensation of two dissimilar T-type trialkoxysilanes such as vinyltrimethoxysilane and methyltriethoxysilane as two randomly chosen examples onto a Q-type polysiloxane precursor leads to two distinct populations ($T^0$=unreacted monomer), $T^1$, $T^2$ and $T^3$ bearing -methyl and -vinyl as organofunctional $R^5$ substituents, respectively, which can be resolved in a $^{29}$Si-NMR spectrum because of the $R^5$ substituent effect on the respective T-type central Si atom.

The at least two non-identically $R^5$-substituted mono-organofunctional T-type alkoxy-terminated siloxane populations described herein encompass any combination of $R^{5U}$ and $R^{5S}$ for $R^5$, as long as at least 1 mol-%, optionally at least 3 mol-%, optionally at least 5 mol-% optionally at least 7 mol-% of all $R^5$ moieties in the polymeric liquid hyperbranched polysiloxane material are $R^{5S}$ moieties.

The first condition (v) shall be understood in the sense that the material comprises at least two populations of mono-organofunctional (T-type) alkoxy terminated siloxane moieties ($T^1$, $T^2$, $T^3$) which differ by their organofunctional substituent $R^5$. This means that the material features at least two different $R^5$ functionalities and that the minority species is present in a detectable amount (e.g. by $^{29}$Si-NMR).

The second condition (vi) is met by a $T^1$-type grafted siloxane moiety having four different substituents on its silicon atom, namely one Si—O—Si bond, one Si—C bond linking to the $R^5$ organofunctional group, and two different alkoxy substituents $R^1$, e.g. one ethoxy and one methoxy. This occurs already when only one population of $R^5$-functionalized T-type species is present in the material. Generally, non-identical $R^1$ alkoxy-groups can ligand-exchange among Q-type and T-type moieties. FIG. 3 shows a $^{29}$Si NMR Spectrum of a material containing one type of $R^5$-functionalized T-type population with both ethoxy and methoxy $R^1$-groups in the same material which gives rise to an ethoxy/methoxy exchange in both Q-type and T-type spectral signatures.

In another embodiment, the polymeric liquid hyperbranched polysiloxane material according to the present invention is one, wherein (vii) the degree of polymerization of the Q-type alkoxy-terminated moieties $DP_{Q\text{-}type}$ is in the range of 1.5 to 2.5;

(viii) the degree of polymerization of the D-type alkoxy-terminated siloxane moieties $DP_{D\text{-}type}$ is in the range of 1.25 to 1.75; and/or (ix) the degree of polymerization of the T-type alkoxy-terminated siloxane moieties $DP_{T\text{-}type}$ is in the range of 1.3 to 2.2;

The degree of polymerization DP for any non-crystalline silicon oxide material (for the polysiloxane material and for the corresponding methods and uses described herein) is defined here as the ratio of bridging oxygens BO (# of Si—O—Si bonds) to the total number of metal atoms $Si_{tot}$ in the system.

The term "alkoxy-terminated" for the Q-, T- and D-type siloxane moieties is understood to refer to the residual substituents of said moieties which are essentially alkoxy groups, because the polymeric liquid material is derived from alkoxy (ethoxy/methoxy) containing silane precursors in monomeric or oligomeric form. This implies that for a $Q^0$ monomer and $Q^1$, $Q^2$, $Q^3$ and $Q^4$ moiety, said "alkoxy termination" is comprised of 4, 3, 2, 1 and 0 alkoxy groups, respectively, and for a $T^0$ monomer and $T^1$, $T^2$ and $T^3$ moiety, said "alkoxy termination" is comprised of 3, 2, 1 and 0 alkoxy groups, respectively. Analogously, for a $D^0$ monomer and $D^1$ and $D^2$ moiety, said "alkoxy termination" is comprised of 2, 1 and 0 alkoxy groups, respectively.

$DP_{Q\text{-}type}$, $DP_{T\text{-}type}$ and $DP_{D\text{-}type}$ of the material can be directly obtained from quantitative $^{29}$Si-NMR data according to:

$$DP_{Q\text{-}type}=\Sigma(nA_{Qn})/\Sigma(A_{Qn})=(A_{Q1}+2A_{Q2}+3A_{Q3}+4A_{Q4})/(A_{Q0}+A_{Q1}+A_{Q2}+A_{Q3}+A_{Q4});$$

$$DP_{T\text{-}type}=\Sigma(nA_{Tn})/\Sigma(A_{Tn})=(A_{T1}+2A_{T2}+3A_{T3})/(A_{T}^{0}+A_{T1}+A_{T2}+A_{T3})$$ for general $T$-type silanes;

$$DP_{T\text{-}type,\ bipodal\ silanes}=2\cdot\Sigma(nA_{Tn})/\Sigma(A_{Tn})=2(A_{T1}+2A_{T2}+3A_{T3})/(A_{T}^{0}+A_{T1}+A_{T2}+A_{T3})$$ for bipodal $T$-type silanes; and $$DP_{D\text{-}type}=\Sigma(nA_{Dn})/\Sigma(A_{Dn})=(A_{D1}+2A_{D2})/(A_{D}^{0}+A_{D1}+A_{D2}).$$

In the above equation for $DP_{Q\text{-}type}$, the terms $A_{Qn}$ denote the quantitative $^{29}$Si-NMR peak area related to that $Q^n$ moiety (spectral signature), which is a Si atom coordinated by n siloxane bonds through bridging oxygen (BO) atoms, that connect it to its next-nearest-neighbor Si atoms and (4-n) non-bridging oxygen (NBO) atoms which are linked to terminal alkoxy groups Si—OR as defined herein. Analogously, $A_{Tn}$ and $A_{Dn}$ denote the $^{29}$Si-NMR peak areas corresponding to the respective T-type and D-type moieties (spectral signatures).

For the above definition of DP, $Q^2$ and $Q^3$ refer to all types of $Q^2$ and $Q^3$ species, including linear and single ring as well as double ring species.

Regarding the equation for $DP_{T\text{-}type}$ it is necessary to differentiate between the class of bipodal T-type silanes and all the other, "general" T-type silanes. The latter constitute the majority of commercially available T-type silanes and comprise only a single Si atom connected to three alkoxy and one organofunctional group. In contrast, bipodal silanes, which can be represented as $(RO)_3Si—(CH_2)—X—(CH_2)—Si(OR)_3$ contain a further trialkoxysilyl unit attached to the first one through a suitable linker group "X" and each spaced by at least one methylene ($—CH_2—$) group. The introduction of a modified definition for the degree of polymerization of bipodal silanes takes into account that a single connectivity to the polysiloxane network is sufficient to covalently attach the functional group and develop its targeted interface functionality. For example, simultaneous grafting through both trimethoxysilyl residues of a bipodal silane is counterproductive in a sense that it quickly leads to branching and attachment from one macromolecule to another, leading to unwanted gelation even at low surface coverage of dipodal T-type silanes. Hence it makes more sense to reference $DP_{T\text{-}type,\ bipodal\ silanes}$ in terms of single trialkoxysilyl-attachment modality, leading to the definition given above.

For organofunctional T type tri- and D-type di-alkoxysilanes, the $^{29}$Si spectral fingerprint regions are shifted progressively further downfield allowing a clear separation of the different non-organofunctional $Q^n$ from organofunctional $T^m$ and $D^l$ moieties as seen in FIG. 4. FIG. 4 shows a $^{29}$Si NMR spectrum of a materials containing M, D, T and Q-Type moieties in one material with the respective labelling.

Optionally, the total silicon to free hydrolysable alkoxy molar ratio in the material described herein is in the range of 1:1.0 to 1:3.0, optionally 1:1.2 to 1:2.5, optionally 1:1.3 to 1:2.2 if the total content of di-organofunctional D-type siloxane moieties (iii) in the polysiloxane material does not exceed 10 mol-%.

Optionally, the molar number of ethoxy terminating units ($—OCH_2CH_3$) in the material described herein is at least twice the number of methoxy terminating units ($—OCH_3$) and the material is essentially free of propoxy terminating units ($—OCH_2CH_2CH_3$), e.g. less than 3% of all alkoxy terminating units are propoxy terminating units.

Optionally, the molar number of methoxy terminating units ($—OCH_3$) in the material described herein is at least twice the number of ethoxy terminating units ($—OCH_2CH_3$) and the material is essentially free of propoxy terminating units ($—OCH_2CH_2CH_3$), e.g. less than 3% of all alkoxy terminating units are propoxy terminating units.

For any polymeric liquid material described herein, there exist different modes of interconnections, namely i) siloxane bonds with two Q-type partners (Q-Q homocondensation), ii) siloxane bonds with two T-type partners (T-T homocondensation), iii) siloxane bonds with two D-type partners (D-D homocondensation), and iii) Siloxane bonds with non-identical partners (Q-T, Q-D, T-D, Q-M, T-M, D-M heterocondensation).

The concept of heterocondensation applies to bonding states of both, statistical mixtures in core-only as well as in core-shell materials, respectively, and is exemplified in the equation below for Q-T-type siloxane bonding:

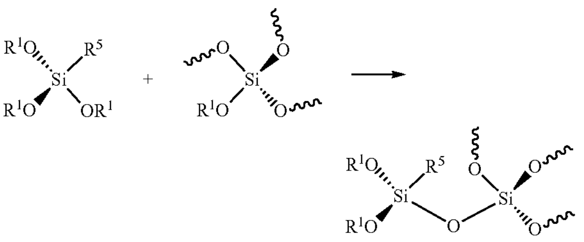

In the above example of a Q-T heterocondensation, the organofunctional trialkoxysilane is converted from $T^0$ to $T^1$ while the Q-type alkoxysilane on the left-hand side of the reaction (symbolized by the three wavy siloxane bonds) from $Q^3$ to $Q^4$, illustrating that each siloxane bond formed simultaneously increases $DP_{Q\text{-}type}$ and $DP_{T\text{-}type}$. There are obviously all sorts of other combinations of possible grafting reactions e.g. a $T^2$ species grafting onto a $Q^2$ yielding $T^3$ and $Q^3$, respectively, or $T^1$ species grafting onto a $Q^2$ yielding $T^2$ and $Q^3$ and similar combinations involving D-Type dialkoxysiloxane moieties.

$DP_{Q\text{-}type}$, $DP_{T\text{-}type}$ and $DP_{D\text{-}type}$ are the primary parameters that define the polymeric liquid material described herein, together with the atomic ratio of T-type to Q-type and, optionally, the total molar content of D-type species in the material. These parameters can all be determined from quantitative $^{29}$Si-NMR spectroscopy data with the special provisions given above for the calculation of $DP_{T\text{-}type}$ for bipodal silanes.

For materials comprising more than one T-type subgroup with non-identical $R^5$ organofunctional substituents, the quantification of those two T-type chemical species within the material can be done either directly from quantitative analysis of $^{29}$Si-NMR spectra, if the T-type moieties belonging to the two non-identical $R^5$ subgroups within the T-spectral window can be sufficiently resolved. The spectral separation of non-identically $R^5$-substituted T-type populations is shown for an example with aminopropyl (AP) and vinyl (V) $R^{5U}$-functional T-type bearing material with $R^1$=Me (FIG. 5). Alternatively, e.g. when both methoxy/ethoxy IV groups are present in the material, non-identical $R^5$ bearing T-type subgroups can be analyzed independently by means of $^{1}H$- or $^{13}C$-NMR data, e.g. with fewer resolution restrictions compared to $^{29}Si$-NMR data.

Other parameters that define the polymeric liquid material described herein can be measured using standard analytical tools: The content of hydroxy groups in the material can be determined, e.g., using $^{29}Si$- and/or $^{1}H$-NMR spectroscopy and Karl Fischer titration. The molar ratio of ethoxy and methoxy terminal alkoxy units in the material are directly accessible from $^{13}C$-NMR and independently from $^{29}Si$-NMR data. The characterization of the reaction products in terms of viscosity is readily analyzed by means of standardized viscosity measurements such as a cylindrical rotation viscometer according to, e.g., ASTM E2975-15: "Standard Test Method for Calibration of Concentric Cylinder Rotational Viscometers". Other viscosity test methods are also possible such as, e.g., Staudinger-type capillary viscometers or modern, dynamic viscometry methods.

In a further embodiment, the polymeric liquid hyperbranched polysiloxane material according to the present invention is one, wherein the total content of di-organofunctional D-type siloxane and/or the total content tri-organofunctional M-type siloxane moieties is zero.

Optionally, the polymeric liquid hyperbranched polysiloxane material according to the present invention is one, wherein the mono-organofunctional T-type siloxane moieties comprise (x) a first population of mono-organofunctional T-type alkoxy-terminated siloxane moieties, wherein $R^5$ is selected from the group consisting of methyl, ethyl, n-propyl, isopropyl, n-butyl, t-butyl, hexyl, octyl, dodecyl, hexadecyl, (3,3,3-trifluoro), propyl, (1H,1H,2H,2H-perfluoro)octyl, (1H,1H,2H,2H-perfluoro)dodecyl and (1H,1H,2H,2H-perfluoro)hexadecyl, and either (xi) a second population of mono-organofunctional T-type alkoxy-terminated siloxane moieties, wherein $R^5$ is selected from the group consisting of methyl, ethyl, n-propyl, isopropyl, n-butyl, t-butyl, hexyl, octyl, dodecyl, hexadecyl, (3,3,3-trifluoro)propyl, (1H,1H,2H,2H-perfluoro)octyl, (1H,1H,2H,2H-perfluoro) dodecyl and (1H,1H,2H,2H-perfluoro)hexadecyl, wherein the $R^5$ groups of the first and second populations are not identical, (xii) mono-organofunctional T-type alkoxy-terminated siloxane moieties, wherein $R^5$ is L-Z, vinyl,

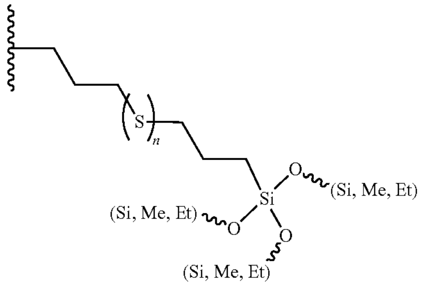

or

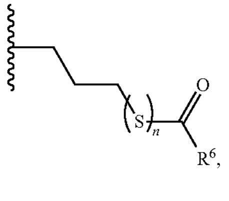

or (xiii) mono-organofunctional T-type alkoxy-terminated siloxane moieties, wherein $R^5$ is $R^{5S}$.

The above option is directed to a tailorable hydrophobic material for the combination of (x) and (xi) and a mixed hydrophobic/functional material for the combination of (x) and (xii).

For example by combining (x) and (xi), a polymeric liquid material can be created by using multiple hydrophobic $R^5$-organofunctional T-type moieties, which allows to control steric accessibility and hydrophobic properties of the material and thus its solubility and compatibility with polymers, solvents, inorganic and hybrid phases alike. This allows, e.g., tailoring of the polymeric liquid material to virtually any application specific formulation with a degree of freedom not attainable by today's commercial silane monomer and prehydrolysate systems.

For example, the combination of (x) and (xii) or (xiii), the combination of $R^5$ moieties bearing both hydrophobic properties and specific functionalities (see feature (xii)) then allows tailoring of the overall compatibility with an application-specific matrix while also introducing further chemical connectivity options. For example, a material exhibiting both hydrophobic $R^5$ selected from feature (x) while simultaneously bearing radical polymerizable groups such as methacrylate groups (selected from feature (xii)) could then control its interaction/compatibility through the hydrophobic component and its radical crosslinking reactivity essentially independently through the loading of said methacrylate component. The division of application-relevant system compatibility by selecting of a first type and loading of hydrophobic $R^5$ functionality and the selection of a second $R^5$ group to introduce a specific chemical function is expected to greatly improve performance and cost effectiveness of silane and siloxane technology. The advantage of this approach seems to further benefit from a core-shell type architecture, while different combinations are possible and could individually be selected depending on the application:

$R^5$ being as defined in feature (xii) within the core with a hydrophobic T-type siloxane (feature x) forming a shell, thus combining system compatibility with the ability to incorporate specific functions in the core. The Extension of such functionality options through $R^5$-substitution further extends the range of functionality considerably.

Hydrophobic (feature (x)) and functional (feature (xii)) $R^5$ moieties both present in a shell, creating an interplay between hydrophobic/matrix compatibility tailoring and functional group density and activity.

Hydrophobic (feature (x)) moieties distributed inside the core and functional (feature (xii)) moieties in the shell.

Additional combinations involving $R^{5S}$ (feature (xiii)).

In another embodiment, the polymeric liquid hyperbranched polysiloxane material according to the present invention is one, wherein the relative atomic ratio of T- to Q-species is in the range of 0.02:1 to 0.75:1, optionally in the range of 0.03:1 to 0.5:1.

For example, an advantage of the polymeric liquid materials according to the present invention is the fact that they are essentially free of silanol species (Si—OH). Specifically, their molar content with respect to the total number of Si atoms present in the material is less than about 5, 2.5, 2, 1.5, 1 or 0.5%, optionally less than about 0.2%. This provides, e.g., greatly improved stability and shelf life over conventional sol-gel (e.g. hydrolytically prepared) based hybrid materials and substantially more structural control. In practical applications, they can be used "as is" in non-polar organic solvents, blends etc. or directly incorporated into hydrophobic matrices such as polymer melts.

In another aspect, the present invention is directed to a hydrolysis product obtainable by reacting at least one polymeric liquid material described herein with a predetermined amount of water or with a predetermined amount of a water-solvent mixture, optionally in the presence of at least one surfactant.

The predetermined amount of water or water-solvent mixture for hydrolysis or for emulsifying is determined, e.g. by the molar amount of water to total molar amount of Si in the system confined in typical formulations by upper and lower bound limits. A lower bound value defining the water to total Si molar ratio can be 0.02:1, optionally 0.1:1 or 0.5:1. An upper bound value defining the water to total Si molar ratio can be 5'000:1, optionally 500:1 or 50:1. The amount of cosolvent can be chosen independently and technically without limitation imposed by the water to Si molar ratios.

For example, solvents for hydrolysis can be selected from the group consisting of water-soluble organic solvents such as low-molecular weight alcohols, ethers, carboxylic acids, e.g.:

alcohols of formula $R_x$—OH with $R_x$ being selected from the group consisting of —$CH_3$, —$C_2H_5$, —$C_3H_7$, —$C_4H_9$, —$C_5H_{11}$, and —$C_6H_{13}$;

ketones of formula $R_x$, $R_y$—(C═O) with $R_x$, $R_y$ independently selected from the group consisting of —$CH_3$, —$C_2H_5$, and —$C_3H_7$;

carboxylic acids of formula $R_x$—COOH with $R_x$ being selected from the group consisting of —$CH_3$, —$C_2H_5$, —$C_3H_7$, —$C_4H_9$, —$C_5H_{11}$, and —$C_6H_{13}$;

low-molecular weight organic esters such as ethyl acetate, methyl acetate or ethyl formate, methyl formate; and/or ethers of formula $R_x$—O—$R_y$ with $R_x$, $R_y$ being independently selected from the group consisting of —$CH_3$, —$C_2H_5$, and —$C_3H_7$ or cyclic ethers such as tetrahydrofuran.

Together with the solvent, also an acid or a base can be used as a hydrolysis/condensation catalyst. Typical acids to be used are mineral inorganic acids and low-molecular organic carboxylic acids. Typical bases are alkali hydroxides, ammonia or aliphatic/aromatic primary, secondary or tertiary amines.

For example, surfactants for hydrolysis and/or emulsification can be selected from the group consisting of non-ionic surfactants such as polyethylene-oxide/polypropylene oxide block copolymers or similar polyether block copolymer surfactants;

carboxylic acid based ionic surfactants, particularly fatty acids and related saturated or unsaturated linear and or branched aliphatic hydrocarbon-carboxylates such as lauric acid, stearic acid, oleic acid etc. and their corresponding alkali salts;

sulfonic acid or phosphonic acid based ionic surfactants, particularly saturated or unsaturated linear and or branched aliphatic hydrocarbon-sulfonates such as dodecylsulfonic acid (SDS) and their corresponding alkali salts; and/or trialkylammonium salt based ionic surfactants such as cetyltrimethylammonium bromide (CTAB) or cetyltrimethylammonium chloride (CTAC).

In another aspect, the present invention is directed to an emulsion obtainable by emulsifying a polymeric liquid material as described herein with a predetermined amount of water, optionally in the presence of at least one surfactant.

In another aspect, the present invention is directed to a method for preparing a polymeric liquid material of the present invention, comprising the following steps:

providing a polymeric liquid material as described herein, wherein at least 1 mol-%, optionally at least 3 mol-%, optionally at least 5 mol-%, optionally at least 10 mol-% optionally at least 20 mol-% of all $R^5$ moieties in the material are $R^{5U}$ moieties;

functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues;

retrieving, optionally isolating and optionally purifying the polymeric liquid material.

The term modifying or $R^{5S}$-functionalizing as used herein for obtaining $R^{5S}$ residues means that a chemical reaction is performed which is suitable for converting an $R^{5U}$ residue into an $R^{5S}$ residue. The suitable chemical reactions are known to the skilled person and are routinely chosen to obtain the desired $R^{5S}$ residue.

Suitable non-limiting chemical reactions are, for example, as listed below.

Michael additions, aza-Michael additions (e.g. amine or thiol with acrylates, alkenes, alkynes, carbonyl isocyanates, or unsaturated carbonyls); reactions with anhydrides (e.g. amine with maleic anhydride); reactions with acid chlorides (e.g. amine with a suitable —C(═O)Cl moiety); epoxide ring opening (e.g. with amines, thiols, CN—, or halogens); imine formation (primary amine with ketone); thiol substitution with a halogenoalkane; various nucleophilic substitutions (e.g. $S_N2$) on halogenoalkanes; elimination on a halogenoalkane to form a double bond; reaction of a halogenoalkane with sodium azide to form an alkyl azide, optionally followed by the reaction of the alkyl azide, e.g. in a click-chemistry reaction (azide-alkyne cycloaddition) or through conversion to an isocyanate; various functionalization reactions with di- and trisisocyanates; reaction of alkenes, such as a "thiol-ene" reaction with thiols, electrophilic addition of a halogen onto an alkene, e.g. vinyl, followed by elimination to the alkyne; tetrasulfide- or thiol or unsaturated compounds (e.g. vinyl, methacrylate) reactions with unsaturated aromatic or unsaturated aliphatic compounds in the presence of a radical source (e.g. radical initiator), organic and inorganic peroxides or in the presence of aliphatic or aromatic, linear or cyclic epoxides; Friedel-Crafts-alkylation or -acylation on aromatic rings, e.g. phenyl rings; or peptide bond formation through amine or carboxylic groups.

The skilled person know which type of reactions and/or reaction conditions are compatible with the presence of (small amounts) water and/or silanol groups. The skilled person will choose a suitable protocol for carrying out the individual synthesis steps in order to minimized undesired side reactions with water and/or silanol groups. V-Functionalization reactions that are not compatible with the presence of water and/or silanol groups and must be carried out in their presence are optionally excluded from the scope of the present invention. A preferred protocol for $R^{5S}$-functionalization reactions that are sensitive to water and/or silanol groups includes to first carry out the functionalization on a $T^0$ monomer followed by grafting of the $T^0$ monomer onto the siloxane core, thus circumventing reactions in the presence of water and/or silanol groups by temporal separation of the $R^{5S}$-functionalization.

The polymeric liquid polysiloxane material prepared by the method described herein is $R^{5S}$-functionalized, i.e. at least 1 mol-%, optionally at least 3 mol-%, optionally at least 5 mol-% optionally at least 7 mol-% of all $R^5$ moieties in the material are $R^{5S}$ moieties, wherein $R^{5S}$ is considered a $R^{5S}$-functionalized moiety. The starting material for the method may be non-$R^{5S}$-functionalized (essentially 100 mol-% of all $R^5$ moieties in the material are $R^{5U}$ moieties) or partly $R^{5S}$-functionalized (at least 3 mol-% of all $R^5$ moieties in the material are $R^{5U}$ moieties). $R^{5S}$-Functionalization of the starting material may be done by functionalizing $R^{5U}$ of grafted T-type siloxane moieties or optionally by grafting further, pre-$R^{5S}$-functionalized T-type silanes comprising $R^{5S}$ moieties. The $R^{5S}$-functionalization of $R^{5U}$ moieties can be done by known chemical methods. Retrieving, optionally isolating and optionally purifying the polymeric liquid material can be done as outlined in the context of step (g) of the method below.

In another aspect, the present invention is directed to a method for preparing a polymeric liquid material as described herein, comprising the following steps:

(a) providing a Q-type polymethoxy, polyethoxy, polypropoxy or mixed poly(methoxy/ethoxy/propoxy) polysiloxane precursor, optionally comprising
 (a1) di-organofunctional D-type siloxane moieties; and/or
 (a2) mono-organofunctional T-type siloxane moieties, wherein $R^5$ is selected from $R^{5U}$ and $R^{5S}$;
  optionally comprising less than 12 mol-% of (a1) and (a2) combined relative to the total amount of all Q-type species;
 optionally further comprising a rearrangement catalyst;
 wherein the precursor comprises at least 28, optionally at least 35, optionally at least 42 mol-% four-membered combined $Q^{2r}$-type and $Q^{3s,d}$-type siloxane ring species relative to the total Q-type siloxane species; and/or
 wherein the precursor comprises at least 60%, optionally at least 67%, optionally at least 75% four-membered combined $Q^{3s,3d}$-type siloxane ring species relative to all $Q^3$-type siloxane species; and
 wherein degree of polymerization of the Q-type polysiloxane $DP_{Q\text{-}type}$ is in the range of 1.5 to 2.7, optionally 1.5 to 2.5, optionally 1.7 to 2.5;
(b) adding at least one of a
 (b1) tri-organofunctional M-type silane $Si(OR^1)(R^2)(R^3)(R^4)$; and/or
 (b2) di-organofunctional D-type silane $Si(OR^1)_2(R^2)(R^3)$; and/or
 (b3) mono-organofunctional T-type silane $Si(OR^1)_3(R^5)$, wherein $R^5$ is selected from $R^{5U}$ and $R^{5S}$; in mono- or oligomeric form to the polysiloxane of (a);
(c) optionally adding a rearrangement catalyst to the mixture of step (b);
(d) heating the mixture of (c) in the absence of water:
(e) optionally repeating steps (b) to (d) at least once;
(f) optionally functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues;
(g) retrieving, optionally isolating and optionally purifying the polymeric liquid material;

with the proviso that at least one of steps (a2) or (b3) is carried out, and with the proviso that a rearrangement catalyst is present in at least one of steps (a) or (c).

The Q-type polymethoxy, polyethoxy, polypropoxy or mixed poly(methoxy/ethoxy/propoxy) polysiloxane precursor of step (a) can be any, e.g. commercially available, Q-type polymethoxy, polyethoxy, polypropoxy or mixed poly(methoxy/ethoxy/propoxy) polysiloxane as long as it comprises the non-organofunctional $Q^1$- to $Q^4$-type siloxane moieties defined for the polysiloxane material herein, wherein at least 28, optionally at least 35, optionally at least 42 mol-% of all Q-type species are part of four-membered $Q^2$-type and $Q^3$-type siloxane ring species (including single and double rings), and/or wherein at least 60%, optionally at least 67%, optionally at least 75% of all $Q^3$-type species are part of four-membered $Q^{3s,3d}$-type siloxane rings, and as long as the degree of polymerization of the Q-type polysiloxane $DP_{Q\text{-}type}$ is in the range of 1.5 to 2.5, optionally 1.5 to 2.7, optionally 1.7 to 2.4. In the context of the present method, the four-membered $Q^3$-type siloxane ring species are those $Q^3$-type siloxane species which are part of one or two four-membered rings, respectively. The term "all Q-type species" in the context of the present method includes all $Q^1$ to $Q^4$ siloxane species as well as $Q^0$ silane monomer(s).

The Q-type polymethoxy, polyethoxy, polypropoxy or mixed poly(methoxy/ethoxy/propoxy) polysiloxane of step (a) constitutes the precursor material as described herein. If a core-shell architecture is targeted, typically a pure Q-type precursor material is used as the core. The $^{29}Si$ NMR spectrum of a typical and exemplary Q-type precursor material is shown in FIG. 6 (top), displaying substantial amounts of $Q^{2r}$ and $Q^{3s,d}$ tetrasiloxane ring species. Upon T-type monomer silane grafting, ring species are significantly reduced as also shown in FIG. 6 (bottom).

For example, the following Q-type polymethoxy, polyethoxy or mixed poly(methoxy/ethoxy) polysiloxane can be used in step (a): commercial oligomers of TEOS or TMOS, e.g. ethylsilicates with 40% by mass of total $SiO_2$ equivalent content such as Dynasylan 40 (Evonik Industries), Wacker Silicate TES 40 WN (Wacker), TEOS-40 (Momentive) or simply "ethylsilicate-40" as referred to by many non-branded Asian suppliers. Also, oligomers with higher silicate content such as Dynasylan Silbond 50 or equivalent products with up to 50% equivalent $SiO_2$ solids content can be used. The same holds for TMOS oligomers such as "Tetramethoxysilane, oligomeric hydrolysate" (Gelest Inc.) or "MKC silicate" (Mitsubishi Chemicals) which exist in variations with up to 59% $SiO_2$ equivalent content can be used as a source for methylsilicates. Comparable propoxy-silicates, if available commercially, can also be used.

Alternatively, the Q-type polymethoxy, polyethoxy, polypropoxy or mixed poly(methoxy/ethoxy/propoxy) polysiloxane of step (a) can be synthesized according to known protocols in the art, including hydrolytic and non-hydrolytic methods, e.g. as described in the examples below, in WO 2019/234062 A1, EP1576035 B1, Macromolecules 2006, 39, 5, 1701-1708, Macromol. Chem. Phys. 2003, 204(7), 1014-1026, or Doklady Chem., Vol. 349, 1996, 190-19.

The definitions of chemical substituents in the tri-organofunctional M-type silane $Si(OR^1)(R^2)(R^3)(R^4)$, the di-organofunctional D-type siloxane moieties $Si(OR^1)_2(R^2)(R^3)$ and the mono-organofunctional T-type siloxane moieties $Si(OR^1)_3(R^5)$ in the context of the present method correspond to the definitions given in the context of the polysiloxane material described herein.

The term "in mono- or oligomeric form", as used herein, means that the M-, D- and T-type silanes are not highly polymerized when used as a precursor, i.e. are either monomers or small oligomers of, e.g., common mixtures with less than ten monomer units in a typical oligomer.

The rearrangement catalyst for use in the present method can be any catalyst that accelerates the grafting of T-, D- and M-type monomers or oligomers by nucleophilic substitution leading to the polymeric liquid material described herein. Catalyst concentrations are generally in the range from 0.01 mol-% to 1.5 mol-% based on the total molar silicon content in the prepared material. The catalyst may be present in step (a) or (c), or both with the proviso that it is present in at least one of steps (a) or (c).

In a further embodiment, main group or transition metal salts or organometallic compounds or organic (e.g. aliphatic amine- or aminosilane-) or inorganic bases are used as rearrangement catalysts.

The rearrangement catalyst, as used herein can be positively identified for example by following the protocol of Example 27 below. Any catalyst that elicits at least 75% grafting of $T^0$ (less than 25% residual $T^0$ monomer) for the MTES model compound defined in the protocol of Example 27 is a rearrangement catalyst for use in the present invention.

The catalyst for use in the present method can be selected from a group of compounds with the sum formulae $M(II)L_1L_2$ for metal ions in the oxidation state +2 such as $Zn^{+2}$ or $Fe^{+2}$ $M(III)L_1L_2L_3$ or $O{=}M(III)L_1$ for metal ions in the oxidation state +3 such as $Ce^{+3}$ or $Fe^{+3}$ $M(IV)L_1L_2L_3L_4$ or $O{=}M(IV)L_1L_2$ for metal ions in the oxidation state +4 such as $Ti^{+4}$ or $Hf^{+4}$ $M(V)L_1L_2L_3L_4L_5$ or $O{=}M(V)L_1L_2L_3$ for metal ions in the oxidation state +5 such as $V^{+5}$ or $Nb^{+5}$ wherein M(II, III, IV, IV) is a main group or transition metal ion in an oxidation state +2 to +5 and bonded by covalent, ionic or coordination bonds or a combination thereof to identical or non-identical coordinating counterions and/or ligands $L_1$ to $L_5$, where at least one of these ligands is selected from the group of halides (e.g. $F^-$, $Cl^-$, $Br^-$, $I^-$), pseudohalides (e.g. $SCN^-$, $N_3^-$, $CN^-$), chalcogenides, mineral acid counterions, organic carboxylates, organic alcoholates, acetylacetonates, organic sulfonic or phosphonic acid counterions, where preferably the main group or transition metal ion is selected from the group of elements Fe, Al, Sc, Y, Ti, Zr, Hf, V, Nb, Ta, Zn, Ce, Co, Fe and Mn in their naturally occurring oxidation states.

"In the absence of water" as noted in step d) optionally does not apply to reactions, e.g. grafting and/or rearrangement reactions, with tri-organofunctional M-type silanes as defined in the present method. In the present method, the reaction step with tri-organofunctional M-type silanes may be performed in the presence of water, e.g. in the presence of an aqueous acid/co-solvent mixture (e.g. EtOH, water, ketones etc.) as commonly used in the art. Optionally the M-type silane grafting is temporally separated from D-Type and/or T-type grafting, either being carried out before or after.

In order to allow sufficiently fast kinetics to yield reasonable reaction times, the use of elevated temperature in conjunction with a catalyst are typically required at least in step (d), optionally in steps (b) to (e) as described herein.

Each reaction step may be carried out for, e.g. half an hour to several hours or several days, depending on the rearrangement catalyst type and concentration used. Alternatively, if a radiofrequency-assisted heating method is used, the reaction times may be shortened significantly.

All of steps (b) to (f) are optionally carried out under stirring. Optionally stirring is continued in steps d) and/or (f) for at least 30 minutes after the M-, D- or T-type silane was added.

For example, during step (d) and/or (f), the total degree of polymerization remains essentially constant if the reaction is carried out in the absence of water. As noted herein, the degree of polymerization always refers to the that of the siloxane material.

Optionally, in step (d) and/or (f), low-molecular reaction products and/or residual starting materials in the reaction mixture can be removed by vacuum distillation, e.g. through gradually lowering the pressure inside the reaction vessel and holding a final pressure in the range of, e.g. about 5 to 250 mbar for a period of time between, e.g. 2 and 60 minutes. Optionally, residual volatile organic compounds, solvent residues and/or low molecular starting products (VOC) can be further removed at any stage in the workup procedure by bubbling a purge gas through the preferably still warm or hot reaction mixture.

For example, each of steps (a) through (e) of the present method are carried out essentially in the absence of any chemical reagent and/or any chemical reagent other than the rearrangement catalyst for promoting the polymerization and/or grafting reaction. For example, all of steps (a) through (e) are carried out essentially in the absence of acetic anhydride, acetic acid or other anhydrides or alphatic or aromatic carboxylic acids or water optionally in the absence of chlorosilanes, chlorosiloxanes, acetoxysilanes or acetoxysiloxanes. "Essentially in the absence" means that there may be traces or catalytic amounts of the aforementioned substances present, however, "essentially in the absence" means that the amounts are not sufficient to promote a detectable or significant polymerization reaction by means of these substances.

Without wishing to be bound by theory, it is believed that the driving force for this substitution reaction (also called "grafting") in step (d) results at least to a significant extent from the ring strain of four-membered $Q^2$-type and/or $Q^3$-type siloxane ring species in the Q-type material of step (a). The release of ring tension in the Q-type precursor or core material is sufficient for efficiently adding, i.e. grafting, M-, D- and/or T-type silanes onto the Q-type core material without the need for further chemical reagents such as acetic anhydride. Optionally, also no rearrangement catalyst as defined herein is necessary if the reaction temperature and duration is adjusted accordingly. As can be seen in the examples below, the mol-% of ring species in the material of step (a) is significantly reduced in the product according to the present preparation method. As an example of a typical grafting reaction, FIG. 6 (bottom) shows the reaction product after rearrangement of a typical example using an polyeythoxysiloxane Q-type precursor (FIG. 6 (top)) and MTES as a monomeric T-type precursor. By direct comparison with one notices that the grafted product features a significant reduction in both Q" and also $Q^{3s}$, $Q^{3d}$ tetrasiloxane ring species as well as an increase in $Q^0$ monomer which most likely results from a partial Q-type depolymerisation. At the same time, the fraction of linear Q-type moieties ($Q^{2r}$ and $Q^{31}$) has increased significantly. FIG. 7 shows the temporal decay of $Q^{2r}$ and $Q^{3s,d}$ tetrasiloxane species (expressed as $(O^{2r}+Q^{3s,d})/Q_{tot}$ in %) over the course of the a typical rearrangement grafting reaction.

The proviso that at least one of steps (a2) or (b3) is carried out means that at the product of the present method is a polymeric liquid polysiloxane material as described herein comprising mono-organofunctional T-type siloxane moieties as described herein, hence, the T-type silanes of formula $Si(OR^1)_3(R^5)$ must be added in monomeric or oligomeric form in at least one step of the present method. This is synonymous with saying that the product must contain T-type moieties.

When step (e) is optionally performed, the repetition of step (b) encompasses that the materials added during that or a further repetition step are not necessarily the same materials compared to the previously performed step. For example, if for the first performance of step (b3), $R^{5U}$ is chosen for $R^5$, then $R^{5U}$, $R^{5S}$ or any combination thereof can be chosen for $R^5$ when repeating step (b3). The same applies to all other repeated steps, e.g. regarding whether M-, D- or T-type silanes are added and/or which type of $R^1$, $R^2$, $R^3$ and $R^4$ are chosen, as well what type and amount of catalyst are added during the repetition.

For the mono-organofunctional T-type siloxane moieties and silanes of step (a2) and (b3), $R^5$ is selected from $R^{5U}$ and $R^{5S}$. This means that the T-type siloxane moieties/silanes may be non-$R^{5S}$-functionalized (essentially 100 mol-% of all $R^5$ moieties of all T-type siloxane moieties/silanes in the material are $R^{5U}$ moieties), fully $R^{5S}$-functionalized (essentially 100 mol-% of all $R^5$ moieties of all T-type siloxane moieties/silanes in the material are $R^{5S}$ moieties) or partly $R^{5S}$-functionalized (the T-type siloxane moieties/silanes comprise both $R^{5U}$ and $R^{5S}$ moieties in any possible ratio). Optionally, $R^5$ of the mono-organofunctional T-type siloxane moieties in step (a2) of the present method is $R^{5U}$.

Step (f) is optional to the extent that no functionalization of the $R^{5U}$ residues is mandatory if the T-type siloxane moieties and silanes of step (a2) and/or (b3) are chosen such that in the product of the method at least 1 mol-%, optionally at least 3 mol-%, optionally at least 5 mol-% optionally at least 7 mol-% of all $R^5$ moieties are $R^{5S}$ moieties in the absence of step (f). Of course, step (f) can be carried out even if the T-type siloxane moieties and silanes of step (a2) and/or (b3) already lead to a product wherein at least 1 mol-%, of all $R^5$ moieties in the material are $R^{5S}$, e.g. to increase the molar percentage of functionalized $R^5$ residues.

Optionally, step (f) can also be performed between steps (d) and (e) and the sequence of steps (e) and (f) are optionally interchangeable.

In a further embodiment, the method described herein is one, wherein in step (a), the $R^5$ of the T-type siloxane moiety is $R^{5U}$;
in step (b), the $R^5$ of the T-type silane is $R^{5U}$; and
the method comprises the step (f) of functionalizing the $R^{5U}$ residues of the polymeric liquid material to obtain at least 1 mol-%, optionally at least 3 mol-%, optionally at least 5 mol-% optionally at least 7 mol-% $R^{5S}$ residues relative to all $R^5$ residues.

In another embodiment, the method described herein is one, wherein in step (a), the $R^5$ of the T-type siloxane moiety is $R^{5U}$;
in step (b), the $R^5$ of at least one T-type silane is $R^{5S}$; wherein in optional step (e) the $R^5$ of the T-type silane is selected from $R^{5U}$ and $R^{5S}$, and
the method optionally does not comprise the step (f).

The choice of $R^{5S}$-functionalized or non-$R^{5S}$-functionalized T-type siloxane moieties and silanes of step (a2) and (b3) can be any choice that, together with optional steps (e) and (f), leads to a polymeric liquid material, wherein at least 1 mol-%, optionally at least 3 mol-%, optionally at least 5 mol-% optionally at least 7 mol-% of all $R^5$ moieties are $R^{5S}$ moieties. It is within the purview of the skilled person to routinely implement any permutations in the choice of starting materials and further functionalization reaction in the context of $R^5$ moieties.

The concept of the $R^{5S}$-functionalization protocol variability can be illustrated by NMR spectroscopic investigations as shown for three exemplary non-limiting model functionalizations, namely i) "on polysiloxane" fuctionalization of a "Jeffamine" type PPG-diamine onto a glycidyl $R^{5U}$-T-type bearing polysiloxane (FIG. 8 shows $^1H$, FIG. 9 shows $^{13}C$, FIG. 10 shows $^{29}Si$ NMR spectra),
ii) "$T^0$ grafting" functionalization of an aza-Michael addition product of a diacrylate with aminopropyl-triethoxysilane onto a pure Q-type polysiloxane precursor (FIG. 11 shows $^1H$, FIG. 12 shows $^{13}C$ NMR spectra),
iii) "on polysiloxane" fuctionalization of maleic anhydride onto an aminopropyl $R^{5U}$-T-type polysiloxane (FIG. 13 shows $^1H$, FIG. 14 shows $^{13}C$ NMR spectra), wherein bonding to the polysiloxane core in the Figures is symbolized by a single siloxane bond connecting the corresponding T-type units to the poly"Siloxane".

The product of the present method is retrieved in step (g) by collection of the material from the reaction vessel. The product may optionally be isolated and purified by standard methods known in the art, e.g. by distillation, optionally using a thin film evaporator, VOC removal by stripping with a purge gas etc.

In an embodiment, the method described herein further comprises before step (b) or after step (d) or (e) the step of adding a tri-organofunctional M-type silane $Si(OR^1)(R^2)(R^3)(R^4)$ or M-type siloxane $(R^2)(R^3)(R^4)Si—O—Si(R^2)(R^3)(R^4)$ and optionally a di-organofunctional D-type silane in mono- or oligomeric form as described in step (b2) in the presence of water and a suitable co-solvent and an acid catalyst, followed by heating the mixture, optionally to reflux. If the addition takes place before step (b), water is removed before step (b) is initiated.

For example, solvents for adding a tri-organofunctional M-type silane $Si(OR^1)(R^2)(R^3)(R^4)$ and/or optionally a di-organofunctional D-type siloxane can be selected from the group consisting of ethanol, methanol, n-propanol, isopropanol, acetone, methyl-ethyl ketone, dimethyl ether, methyl-ethyl ether, diethyl ether.

For example, an acid catalyst can be selected from of strong acids with a negative pKa value, preferably selected from the group consisting of hydrochloric acid, nitric acid, sulfuric acid, hydrobromic or hydroiodic acid.

In another embodiment, the reaction temperature for steps (c) through (e) of the method described herein is in the range from 30 to 170, optionally 50 to 150 or 70° C. to 120° C., and the pressure during steps (c) through (e) is in the range of 0.1 bar to 2 bar, optionally in the range of 0.5 bar to 1.4 bar or in the range of 0.6 bar to 1.2 bar.

The step of optionally functionalizing (f) is not necessarily performed at elevated temperatures, even if the step is performed before step (e). It is common general knowledge which reaction temperatures are necessary for which type of $R^{5S}$-functionalization reaction in step (f).

In a further embodiment, the rearrangement catalyst for use in the present method is selected from the group consisting of $Ti(IV)(OR^{13})_4$ and $Zr(IV)(OR^{13})_4$;
$Ti(IV)X_4$ and $Zr(IV)X_4$;
$O{=}Ti(IV)X_2$ and $O{=}Zr(IV)X_2$);
$Ti(IV)X_2(OR^{13})_2$ and $Zr(IV)X_2(OR^{13})_2$;
$Ti(IV)X_2(OAcAc)_2$ and $Zr(IV)X_2(OAcAc)_2$;
$Ti(IV)(OSi(CH_3)_3)_4$ and $Zr(IV)(OSi(CH_3)_3)_4$;
$(R^{13}O)_2Ti(IV)(OAcAc)_2$ and $(R^{13}O)_2Zr(IV)(OAcAc)_2$;
$O{=}Ti(IV)(OAcAc)_2$ and $O{=}Zr(IV)(OAcAc)_2$;
$Ti(IV)(OAc)_4$ and $Zr(IV)(OAc)_4$;
$Ti(IV)(OAc)_2(OR^{13})_2$ and $Zr(IV)(OAc)_2(OR^{13})_2$; and
$O{=}Ti(IV)(OAc)_2$ and $O{=}Zr(IV)(OAc)_2$;

wherein $R^{13}$ is selected from the group consisting of $—CH_3$, $—CH_2CH_3$, $—CH(CH_3)_2$, $—CH_2CH_2CH_3$, $—C(CH_3)_3$, —$CH_2CH_2CH_2CH_3$ and $CH_2CH_2CH(CH_3)_2$ and wherein X is a halide, a pseudohalide, nitrate, chlorate or perchlorate anion, and wherein the catalyst amount in each of steps (a) or (c) is optionally between 0.01 and 5 mol-%, optionally between 0.05 or 0.1 to 3 mol-%, based on the total molar silicon content present in said step.

In another aspect, the present invention is directed to a product obtained or obtainable by any of the methods described herein.

In a further aspect, the present invention is directed to a use of a polymeric liquid material described herein, comprising at least one population of T-type siloxane moieties with $R^5$ as a radical polymerizable organofunctional residue selected from the group consisting of vinyl, methacrylate, butacrylate, acrylate,

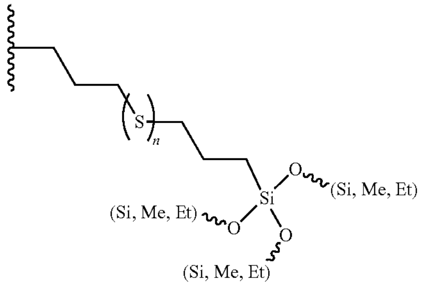

and

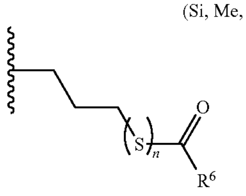

as a crosslinker within a formulation, with a content of the polymeric liquid material in the range of 0.2% to 25% by weight with respect to the formulation.

The term "formulation", as used herein, refers to any product comprising the polymeric liquid material described herein, e.g. as a crosslinker or as any other functional entity. The formulation may be a liquid, a paste or an emulsion or slurry. Such a formulation typically comprises, e.g., other compatible radical polymerizable monomers, oligomers or prepolymers or silane terminated polymeric building block moieties, fillers as well as performance or lifetime enhancing additives and stabilizers such as: UV and light stabilizers, antioxidants, rheology modifiers, tack modifiers, film forming additives, gloss additives, antistatics, nucleation agents etc. If thermally activatable, such a formulation will also typically contain, e.g., a radical starter molecule chosen to meet the designed curing onset temperature.

In a further aspect, the present invention is directed to a use of the polymeric liquid material, of the hydrolysis product or of the emulsion described herein containing at least one population of T-type alkoxy-terminated siloxane moieties with organofunctional groups selected from methyl, ethyl, vinyl, methacrylate, n-propyl, isopropyl, n-butyl, t-butyl, hexyl, octyl, dodecyl, hexadecyl, (3,3,3-trifluoro)propyl, (1H,1H,2H,2H-perfluoro)octyl, (1H,1H,2H,2H-perfluoro)dodecyl and (1H,1H,2H,2H-perfluoro)hexadecyl for $R^5$, in a hydrophobic formulation, wherein the loading of the polymeric liquid, hydrolysis product or emulsion in the formulation is 0.5% to 25% by weight.

The following Figures and Examples serve to illustrate the invention and are not intended to limit the scope of the invention as described in the appended claims.

DETAILED DESCRIPTION OF THE INVENTION

Examples

Figure 1:
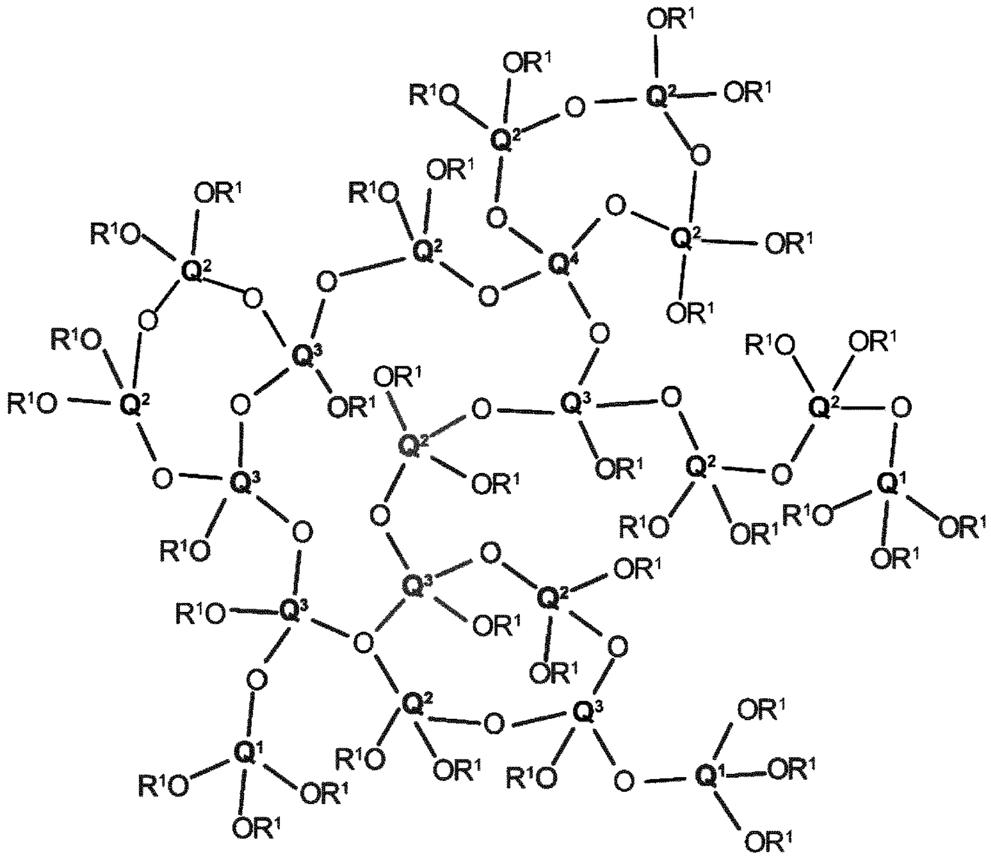
FIGS. 1*a*, 1*b*, 1*c*, and 1*d* show exemplary 2D molecular structure representations of a typical pure Q-type precursor material or core in a general case (FIG. 1*a*) (all combinations of methoxy, ethoxy, propoxy for IV possible), and in three more specific cases with primarily ethoxy and less methoxy for $R^1$ (FIG. 1*b*), roughly equal ethoxy and methoxy (FIG. 1*c*) as well as ethoxy $R^1$ groups only but with a small amount of silanol groups also present (FIG. 1*d*).
Figure 1:
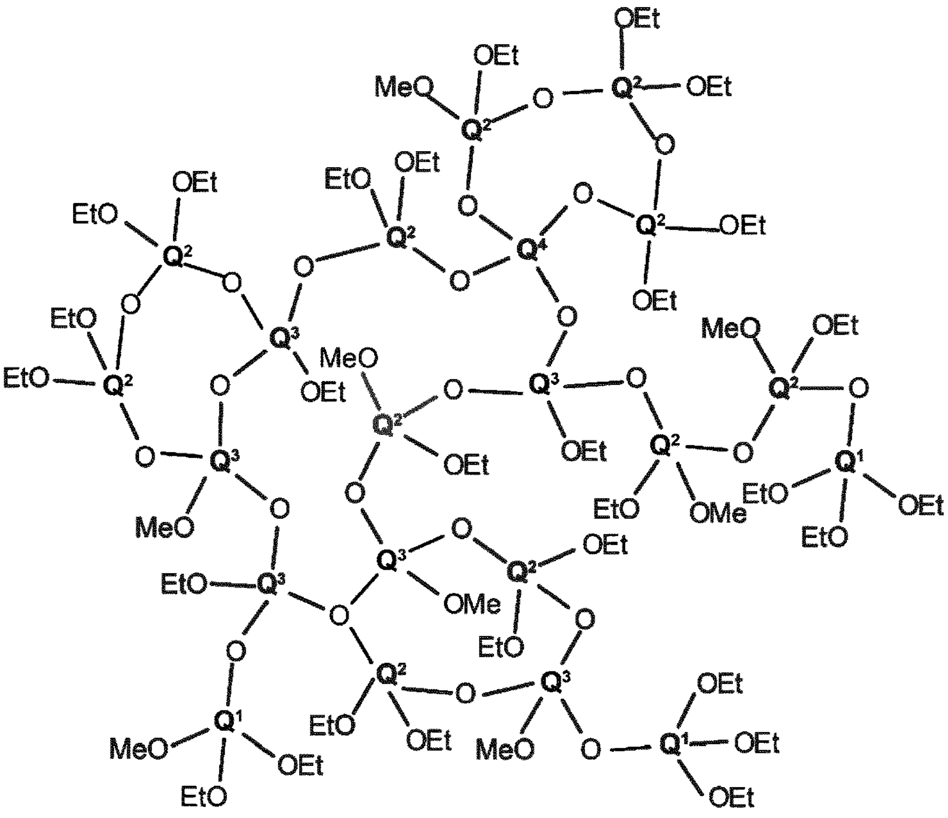
Figure 1:
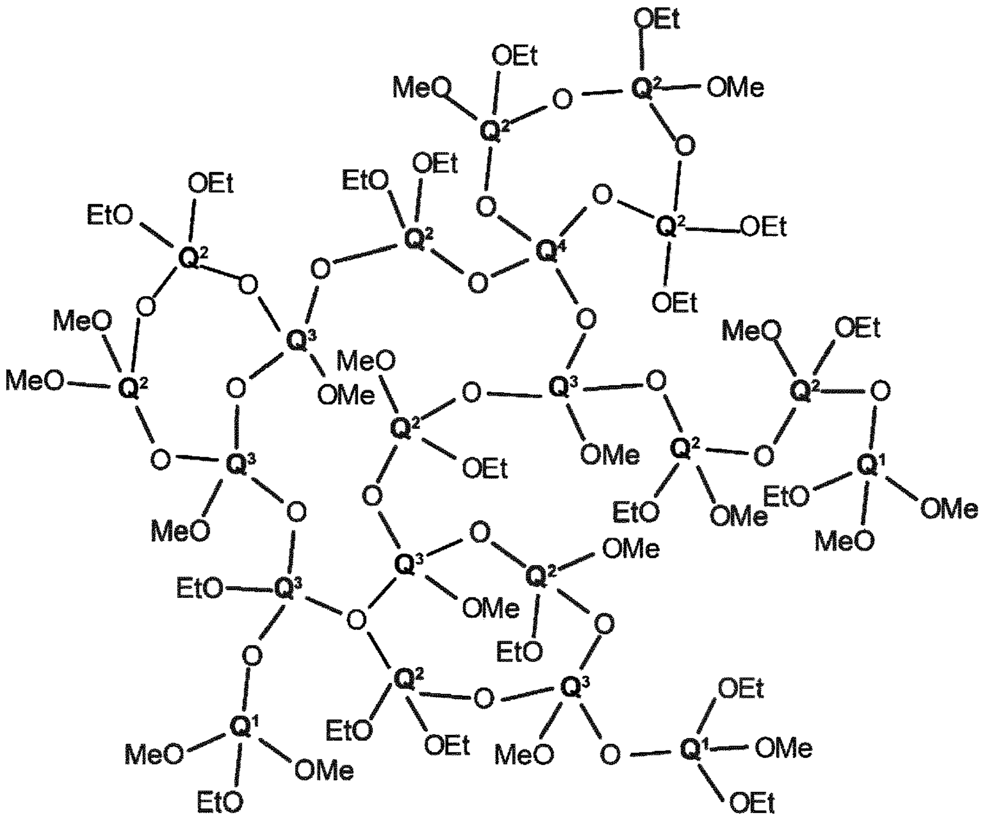
Figure 1:
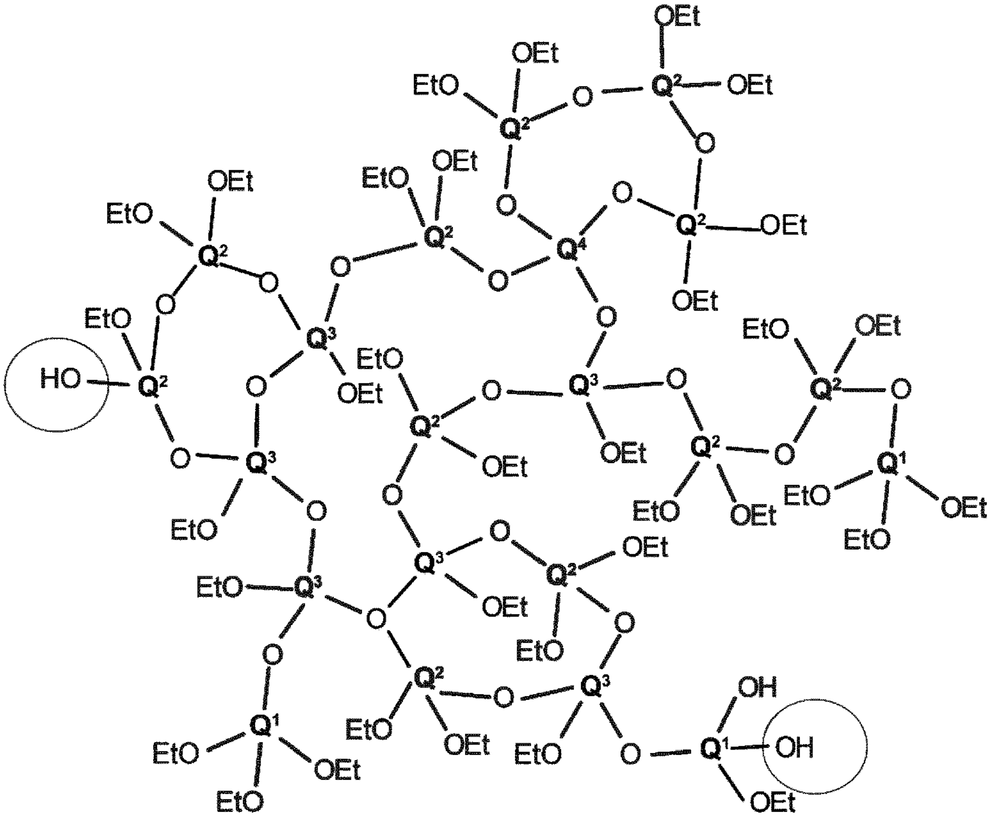
Figure 2:
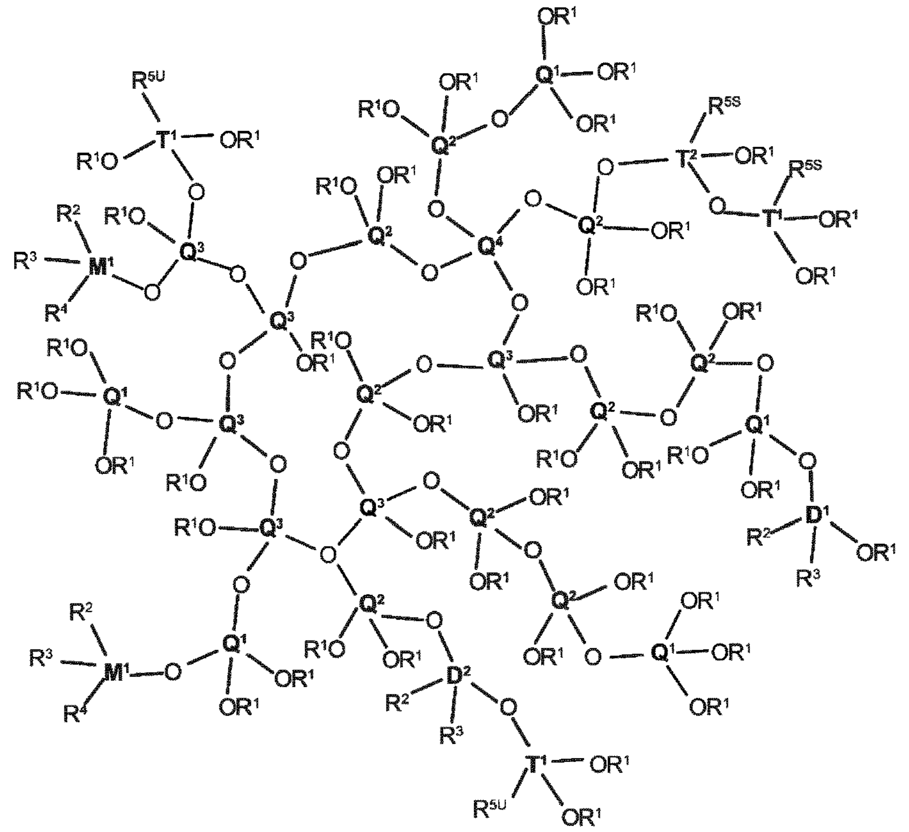
FIGS. 2*a*, 2*b*, 2*c*, and 2*d* show exemplary 2D molecular structure representations of typical materials described herein based on a pure Q-type precursor material only. In the general case (FIG. 2*a*), all combinations of M, D and T functionalizations are possible and indicated by the presence of selected $T^1$, $T^2$, $D^1$, $D^2$ and $M^1$ moieties. Although $T^3$ moieties are also possible in the general description, they are not included in this simplified 2D structural representation. Furthermore, the three specialized cases are limited to idealized compounds featuring (FIG. 2*b*) aminopropyl functional with partial —$R^{10}$ functionalization of the amine groups, featuring both $R^{5U}$ and $R^{5S}$, (FIG. 2*c*) $R^{11}$-glycidoxypropyl-adduct functional with complete functionalization featuring only $R^{5S}$ as well as (FIG. 2*d*) phenyl-functional with partial —$R^{11}$ functionalization of the phenyl (Ph) groups, featuring both $R^{5U}$ and $R^{5S}$ T-type siloxane moieties to illustrate aspects of diversity in terms of Q-type precursor/single T-type grafted siloxane combinations. The representations are for illustration purposes only and do not represent any limitation in further T ($R^{5S}$ and $R^{5U}$), D, M-Type grafting combinations.
Figure 2:
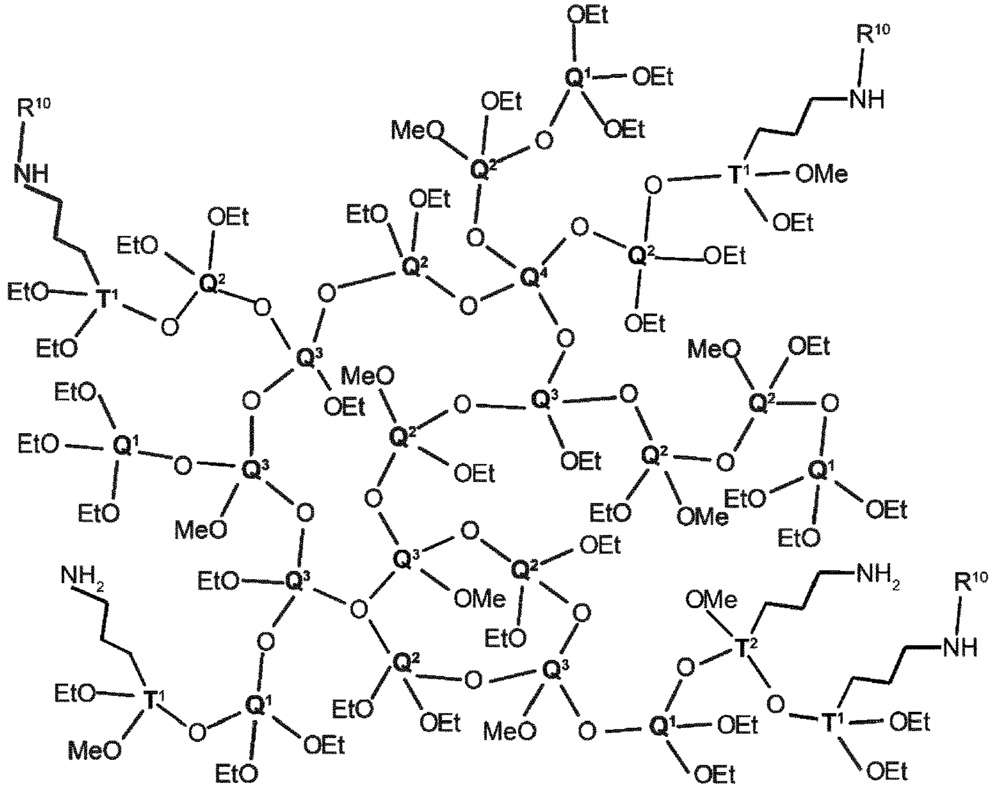
Figure 2:
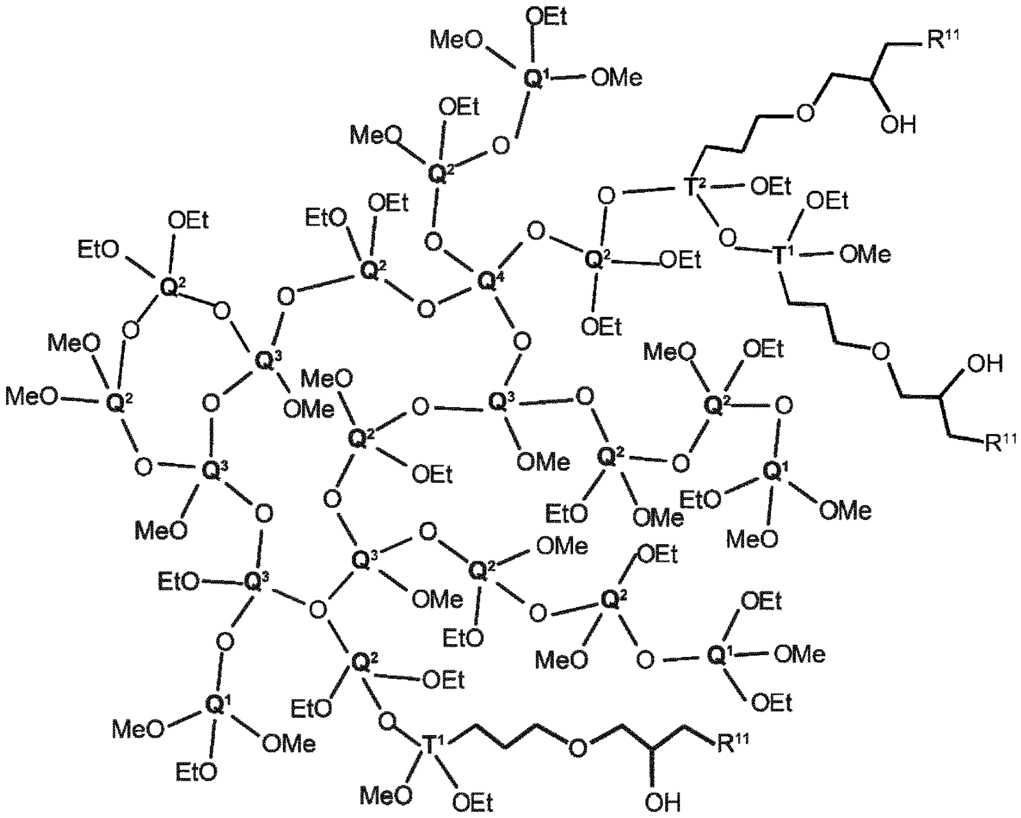
Figure 2:
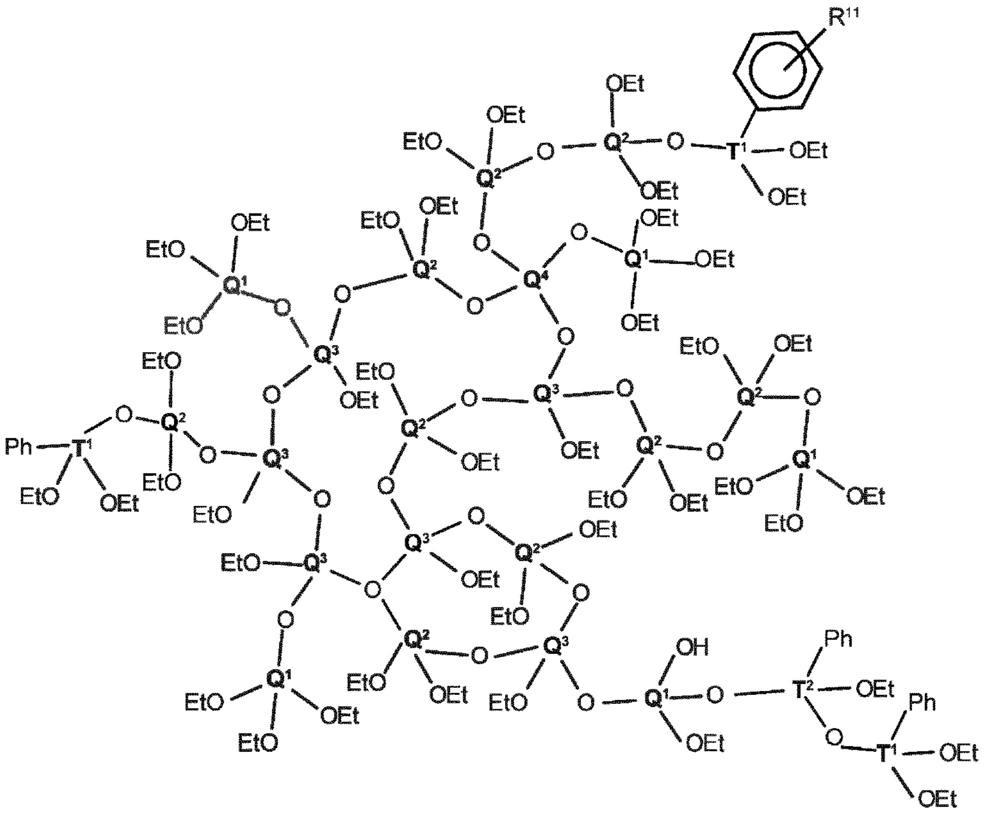
Figure 3:
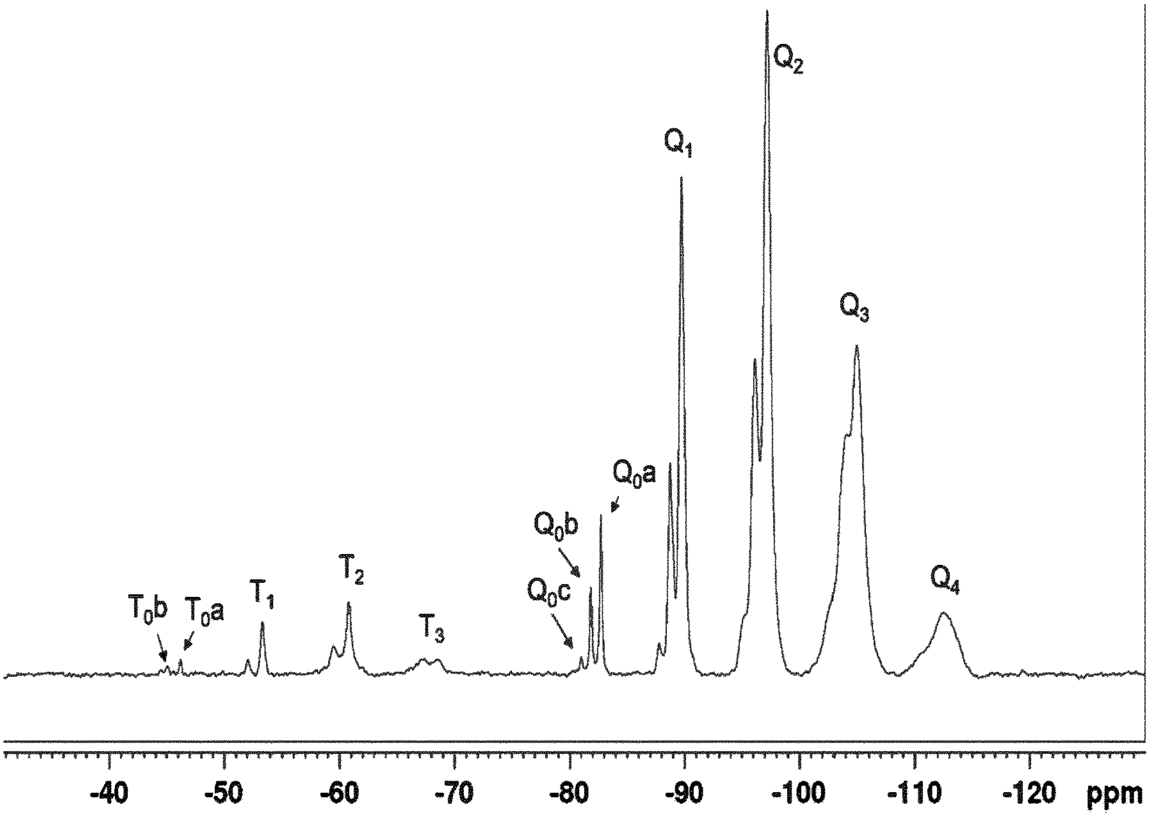
FIG. 3 shows a $^{29}Si$ NMR spectrum of a material prepared from an ethoxy-based Q-type and a methoxy-based T-type precursor, illustrating the ethoxy/methoxy ligand exchange in both Q-type and T-type spectral domains in the final material. By example on $T^0$ and $Q^0$ monomers, the ethoxy/methoxy exchange is shown in the form of each moiety signature splitting into various subpeaks. For $T^0$, a subset of three peaks, $T^{0a}$, $T^{0b}$ is observed originating from $T^0$ moieties comprising 3 ethoxy, as well as 2 ethoxy and 1 methoxy substituents. As this particular material is very rich in ethoxy, further peaks $T^{0c}$ (1 ethoxy and 2 methoxy) and also $T^{0d}$ (3 methoxy) cannot be resolved (too small signal). Analogously, for the $Q^0$ spectral range a subset of 5 peaks $Q^{0a}$, $Q^{0b}$, $Q^{0c}$ can be seen, originating from $Q^0$ moieties comprising 4 ethoxy, 3 ethoxy and 1 methoxy, 2 ethoxy and 2 methoxy with the $Q^{0d}$ (1 ethoxy and 3 methoxy substituents) and $Q^{0e}$ (4 methoxy) signals again not visible.
Figure 4:
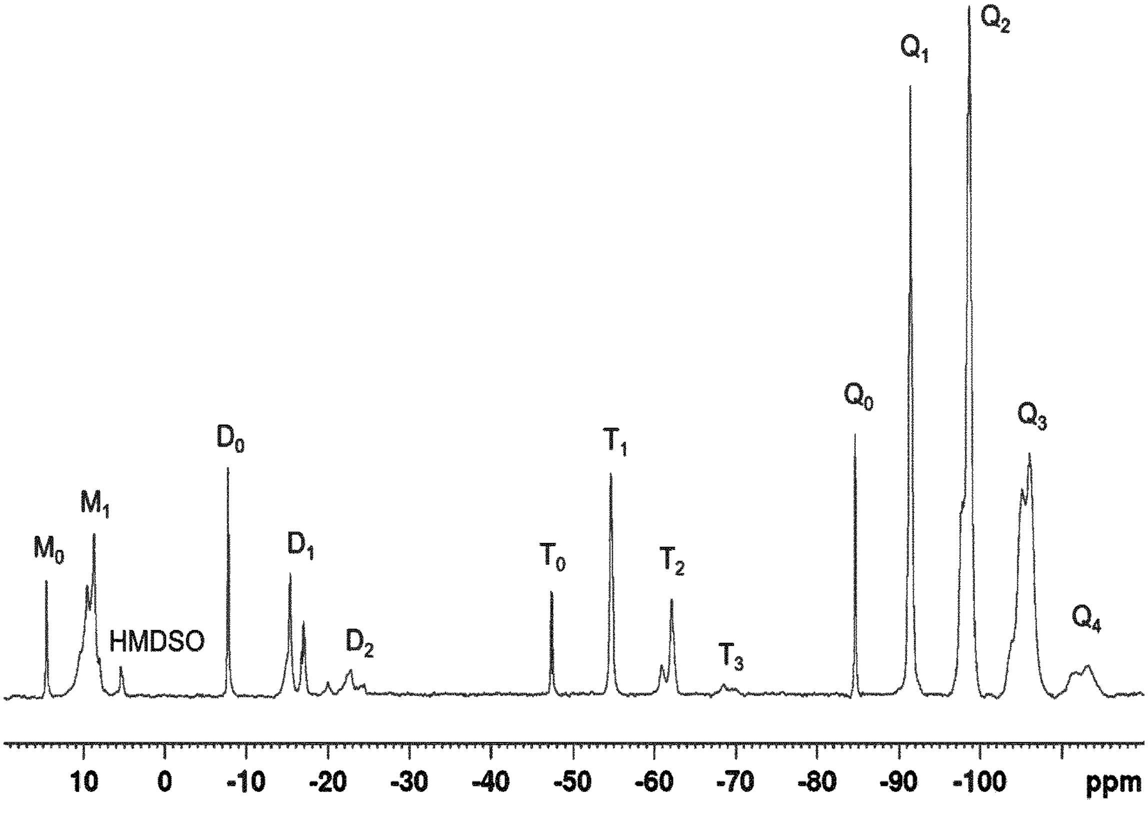
FIG. 4 shows a $^{29}Si$ NMR spectrum of a material prepared from an ethoxy-based Q-type precursor featuring grafted M-type (from trimethylethoxysilane TMES), D-Type (from Dimethyldiethoxysilane DMDES) and both non-functionalized $R^{5U}$ and functionalized $R^{5S}$ T-type moieties (from partially —$R^{11}$ functionalized mercaptopropyltriethoxysilane MPTES) in one material with labelling of individual moiety spectral peak signatures.
Figure 5:
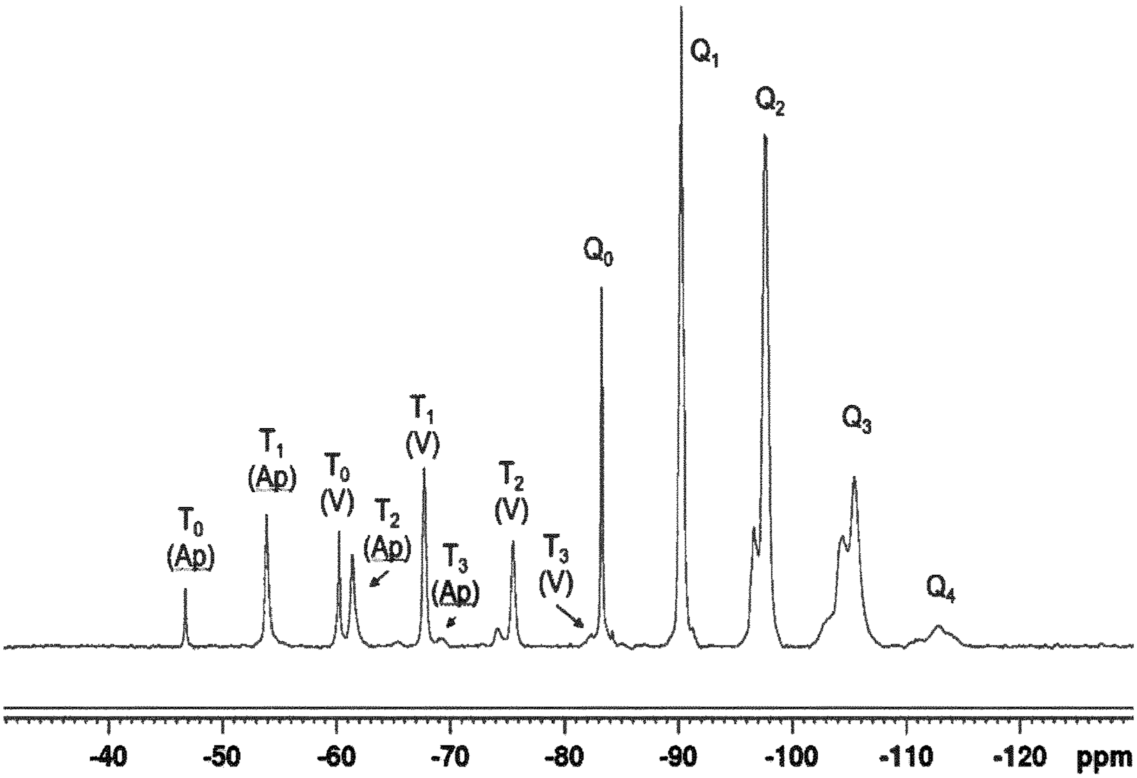
FIG. 5 shows a $^{29}Si$ NMR spectrum of a material made from a TEOS oligomer Q-type precursor and two different triethoxysilane monomer T-type precursors, namely vinyltriethoxysilane (VTES) and aminopropyltriethoxysilane (APTES), where the aminopropyl-functional T-type was partially $R^{5S}$-functionalized with organic $R^{10}$ groups, meaning that vinyl T-type moieties contained only non-functionalized $R^{5U}$ and aminopropyl T-type moieties contained both non-functionalized $R^{5U}$ and functionalized $R^{5S}$. Individual moieties belonging to the vinyl (V) and aminopropyl (AP, both $R^{5U}$ and $R^{5S}$) $R^5$-functional T-type subpopulations can be clearly spectrally resolved and are labelled for clarity.
Figure 6:
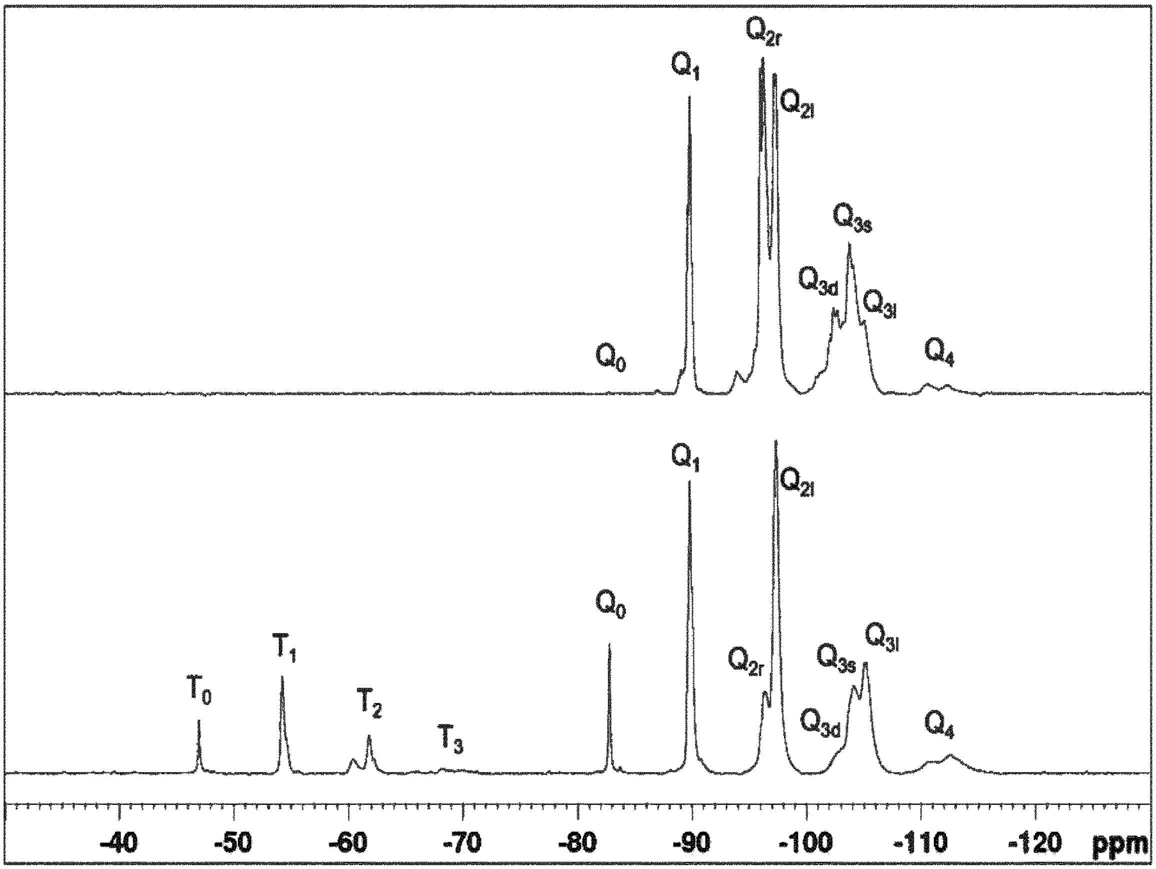
FIG. 6 shows the effect of the rearrangement grafting on the terasiloxane ring species content. The upper $^{29}$Si NMR spectrum of a polyethylsilicate Q-type precursor material displays an abundance of $Q^{2r}$ and $Q^{3s,d}$ tetrasiloxane ring species. The lower $^{29}$Si NMR spectrum shows a material made from that exact polyethylsilicate Q-type precursor by means of Ti(IV) catalyzed rearrangement grafting with a single triethoxysilane monomer T-type precursor with peak assignment of the corresponding Q-type and T-type moieties. One can clearly see that the product contains much fewer $Q^{2r}$ and $Q^{3s,d}$ tetrasiloxane ring species than the Q-type precursor material which it was made from. Specifically, a large fraction of $Q^{2r}$ species have been converted to $Q^{2l}$ and also most $Q^{3d}$ and some $Q^{3s}$ tetrasiloxane ring species have disappeared and are replaced by linear $Q^{3l}$ species presumably as a result of the rearrangement grafting reaction.
Figure 7:
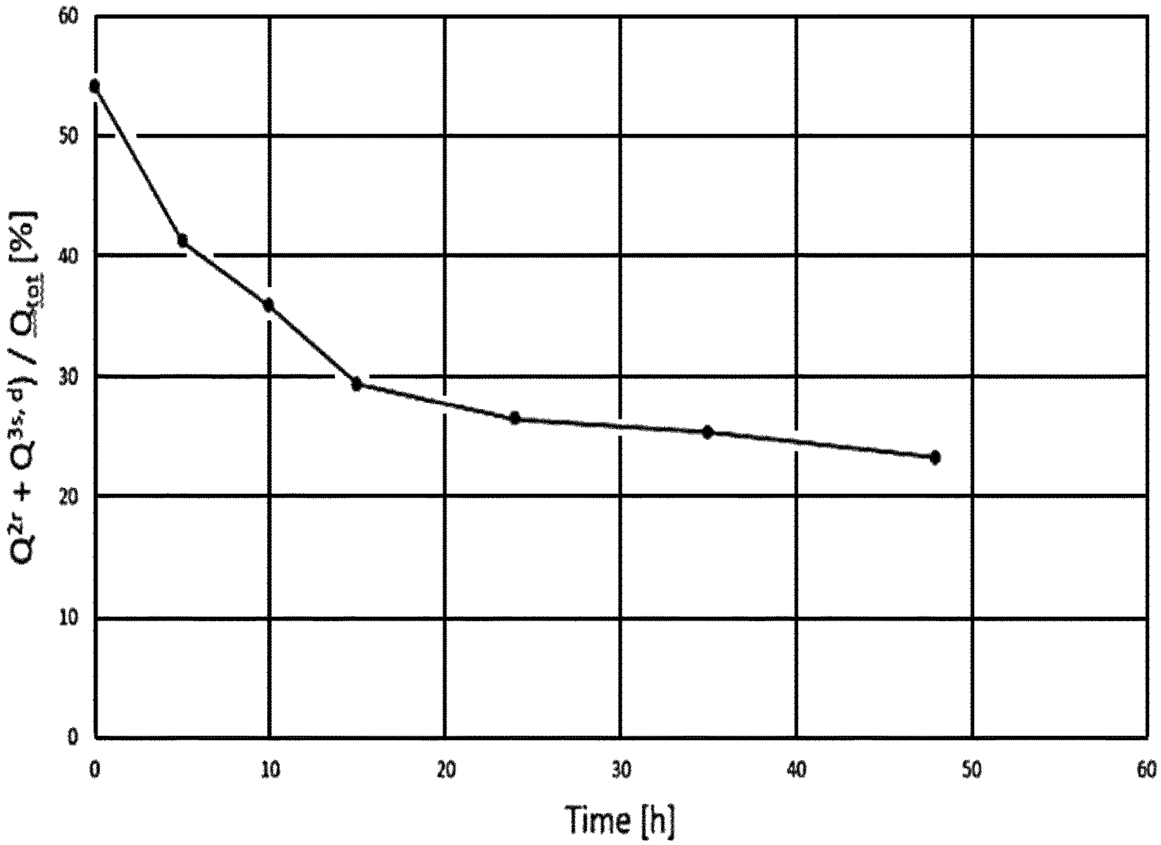
FIG. 7 shows the disappearance of ring species exemplified by the % ($Q^{2r}$ & $Q^{3s,d}$) ring species indicator during a model grafting reaction of MTES on a Q-type model precursor compound with increasing reaction time. The disappearance of ring species during thermal treatment in the presence of a rearrangement catalyst is concurrent with the grafting of the monomeric T-type model silane compound onto the Q-type precursor.
Figure 8:
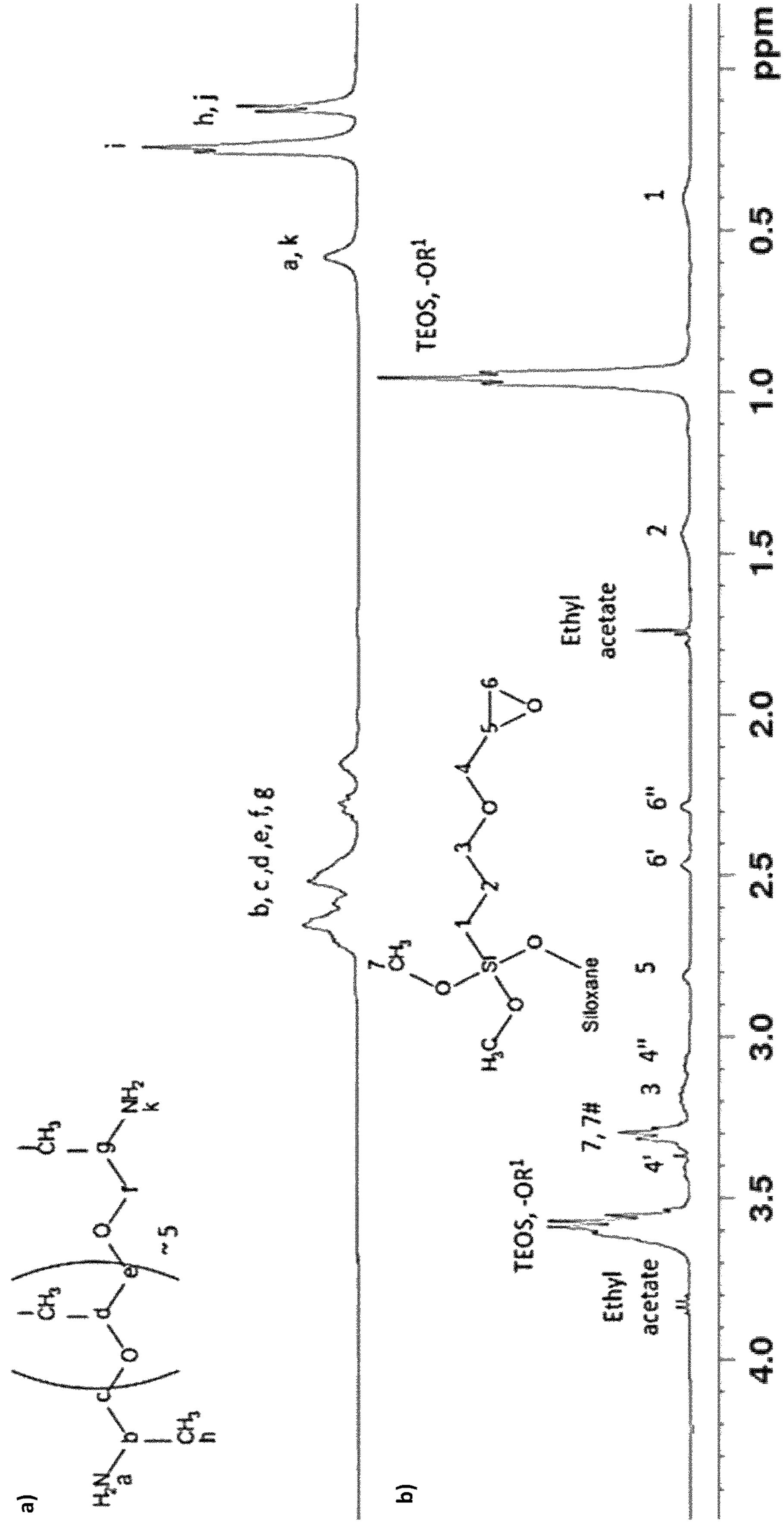
FIGS. 8*a*, 8*b*, and 8*c* show the $R^{5S}$-functionalization reaction monitoring by means of $^1$H NMR spectra of the various intermediates used in the preparation of an $R^{5S}$-functionalized Q-T polysiloxane material via the functionalization "on polysiloxane". The various spectra show a reference spectrum of the organic substrate used for $R^{5S}$-functionalization α,ω amino-terminated polypropylene glycol (Jeffamine D400, FIG. 8*a*), the $R^{5U}$ non-functionalized ($R^{5U}$=glycidoxyporopyl (Gly)) T-type moiety bearing polysiloxane (FIG. 8*b*), and the $R^{5S}$-functionalized polysiloxane polymeric liquid material obtained by epoxide ring opening functionalization with the organic substrate (FIG. 8*c*).
Figure 8:
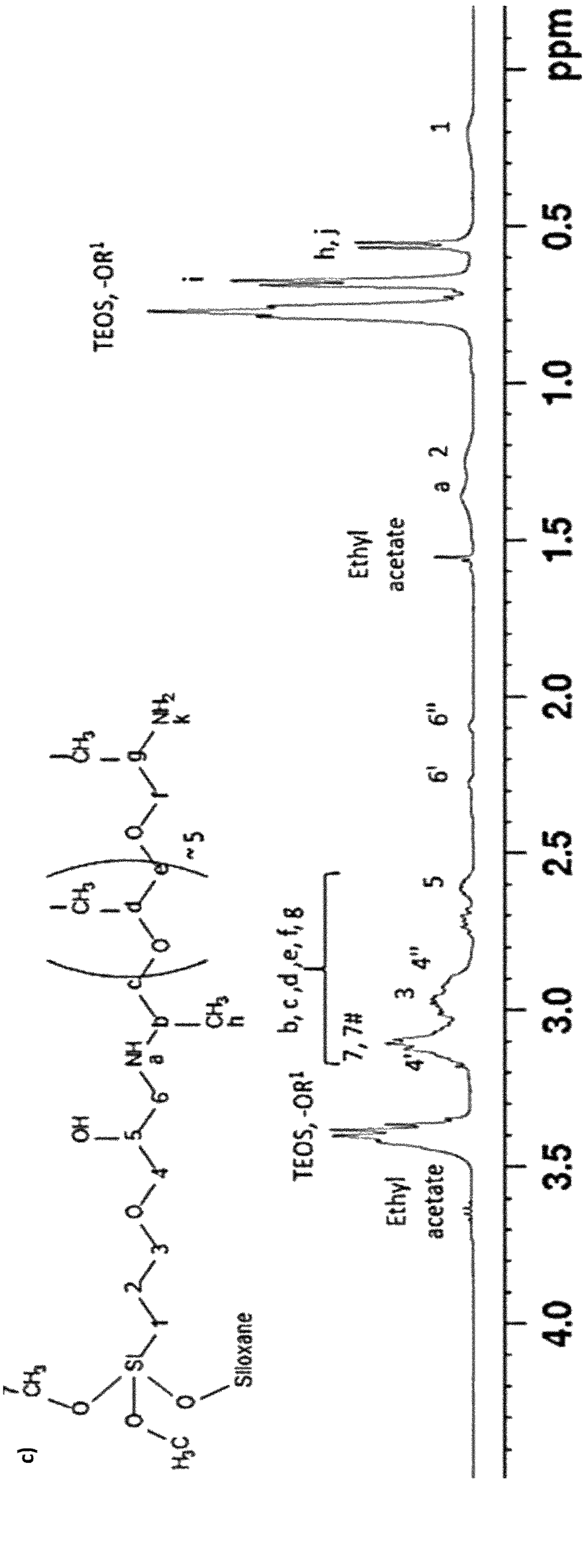
Figure 9:
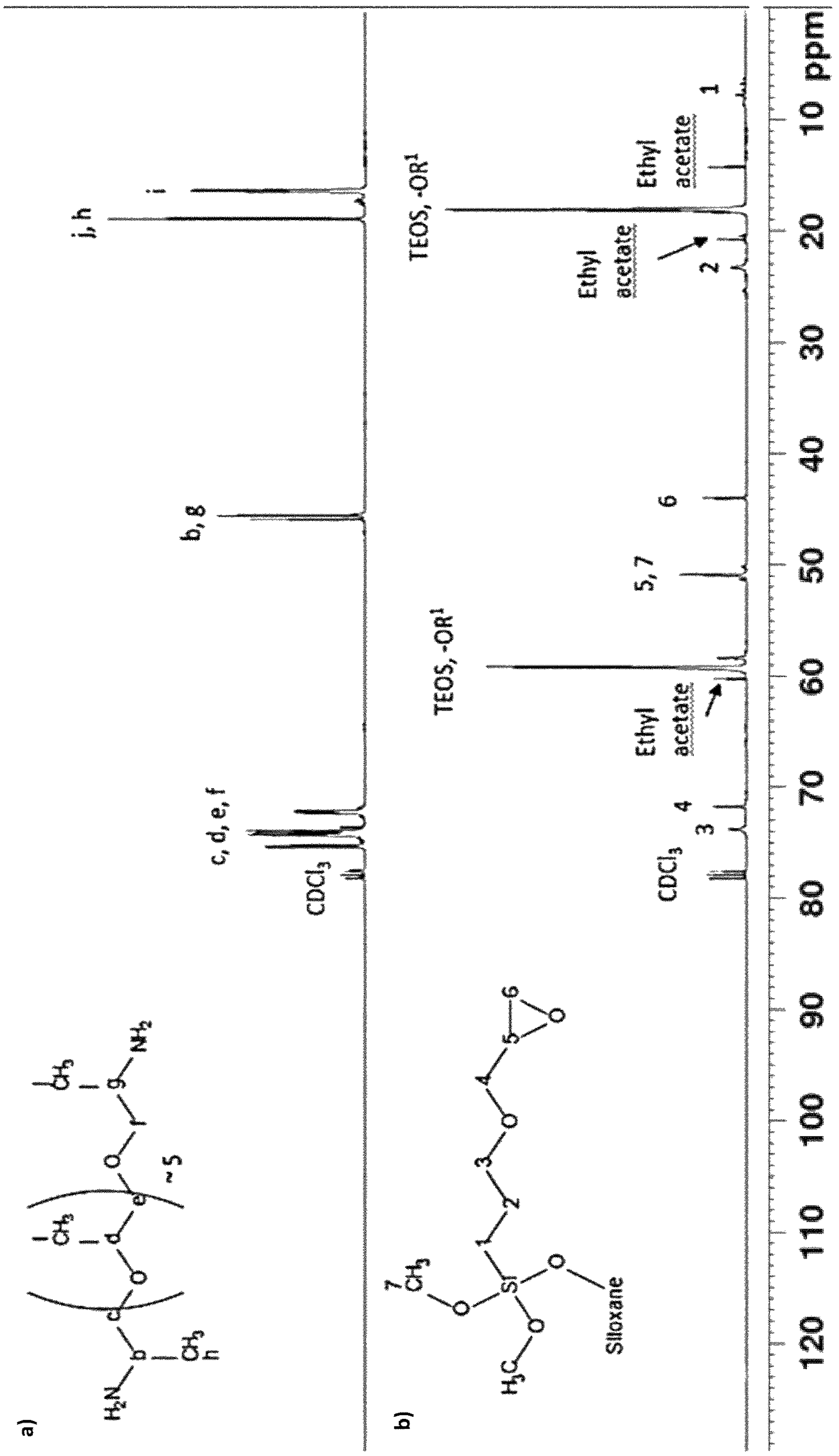
FIGS. 9*a*, 9*b*, and 9*c* show the $R^{5S}$-functionalization reaction monitoring by means of $^{13}$C NMR spectra of the various intermediates used in the preparation of an $R^{5S}$-functionalized Q-T polysiloxane material via the functionalization "on polysiloxane". The various spectra show a reference spectrum of the organic substrate used for $R^{5S}$-functionalization α,ω amino-terminated polypropylene Glycol (Jeffamine D400, FIG. 9*a*), the $R^{5U}$ non-functionalized ($R^{5U}$=glycidoxyporopyl (Gly)) T-type moiety bearing polysiloxane (FIG. 9*b*), and the $R^{5S}$-functionalized polysiloxane polymeric liquid material obtained by epoxide ring opening functionalization with the organic substrate (FIG. 9*c*).
Figure 9:
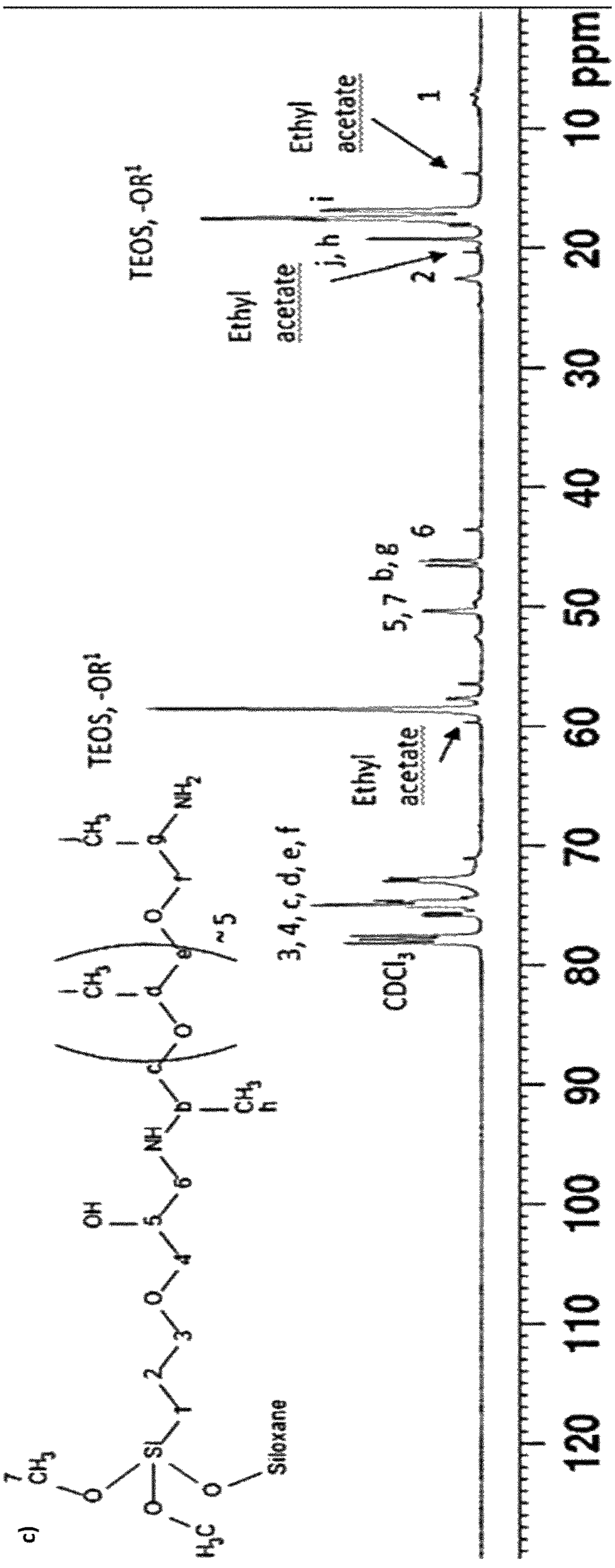
Figure 10:
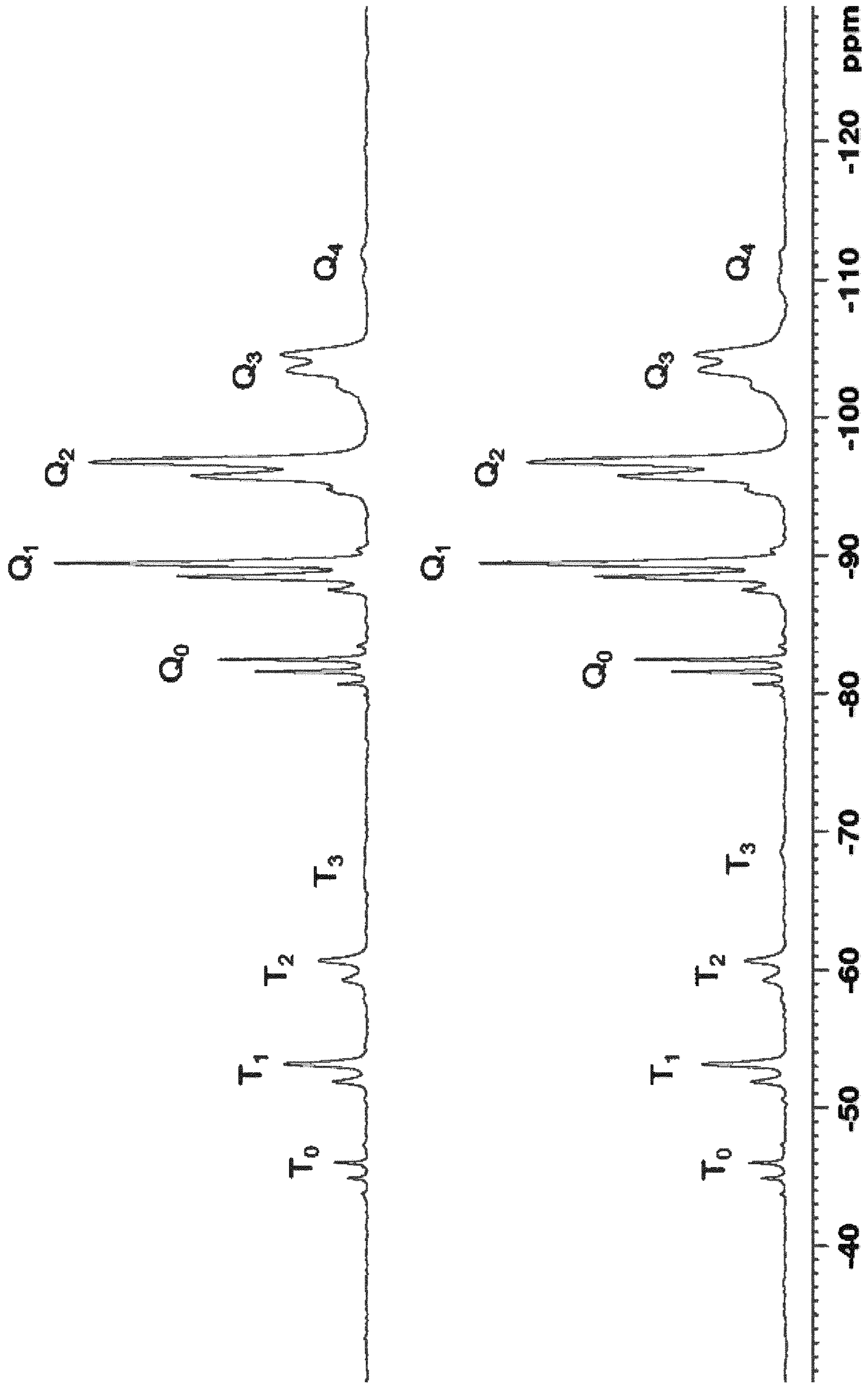
FIG. 10 shows $^{29}$Si NMR spectra of an $R^{5U}$=glycidoxyporopyl (Gly) T-type moiety bearing polysiloxane (top) and the same material after $R^{5S}$-functionalization by epoxide ring opening with an α,ω amino-terminated polypropylene Glycol (Jeffamine D400, bottom).
Figure 11:
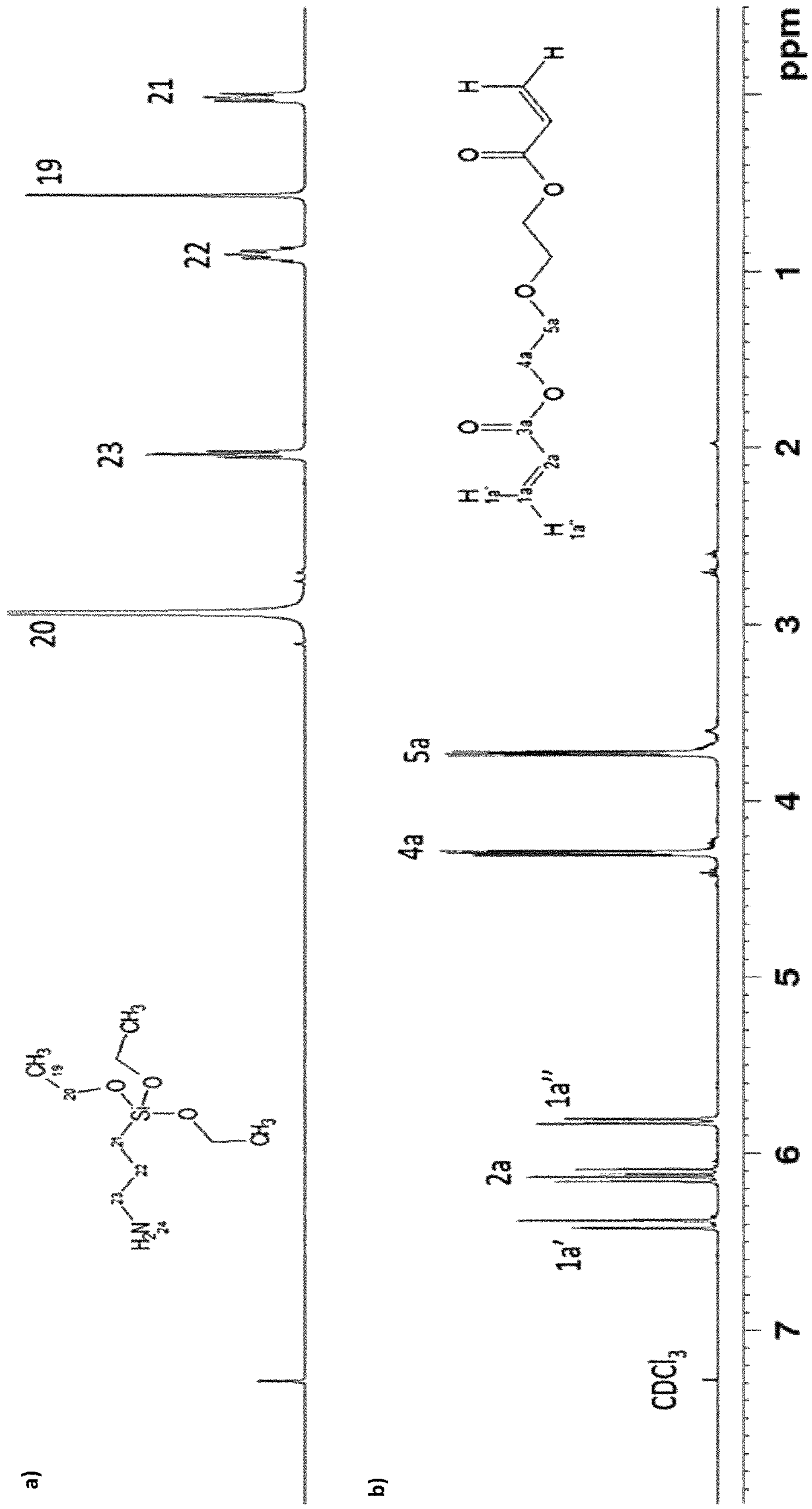
FIGS. 11*a*, 11*b*, 11*c*, and 11*d* show the $R^{5S}$-functionalization reaction monitoring by means of $^1$H NMR spectra of the materials used in the preparation of a non-$R^{5S}$-functionalized Q-T polysiloxane material using the "$T^0$ grafting" approach. The various spectra show the non-$R^{5S}$-functionalized ($R^{5U}$=—$CH_2CH_2CH_2$—$NH_2$) monomeric T-type silane APTES (FIG. 11*a*), a reference spectrum of the organic substrate used for $R^{5S}$-functionalization diethylyeneglycol-diacrylate (DEGDA, FIG. 11*b*), the DEGDA-$R^{5S}$-functionalization product with APTES constituting a functionalized $R^{5S}$-bearing $T^0$ monomer used later for condensation grafting (FIG. 11*c*) and finally the polysiloxane material featuring said grafted $R^{5S}$-bearing T-type moieties (FIG. 11*d*).
Figure 11:
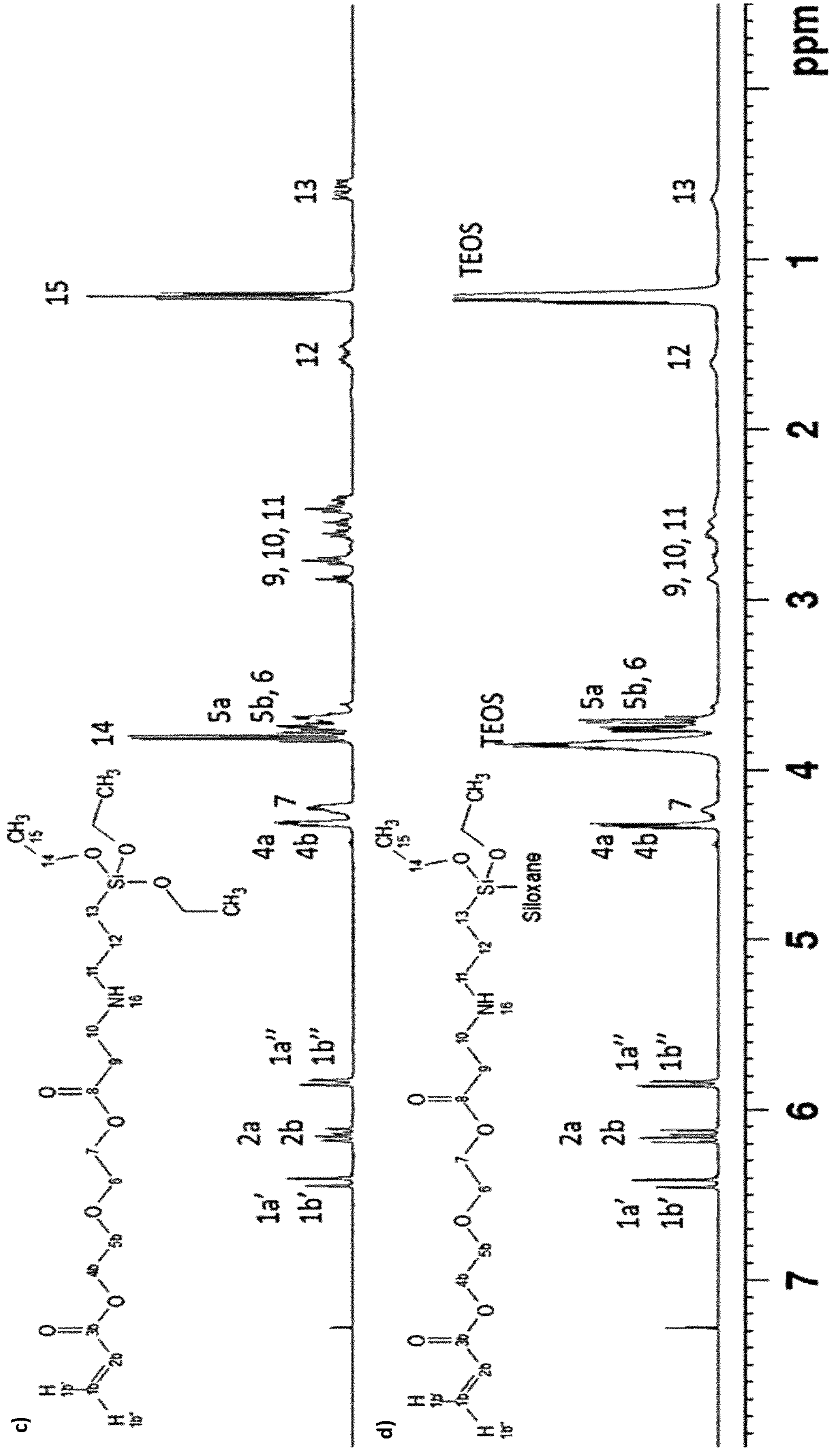
Figure 12:
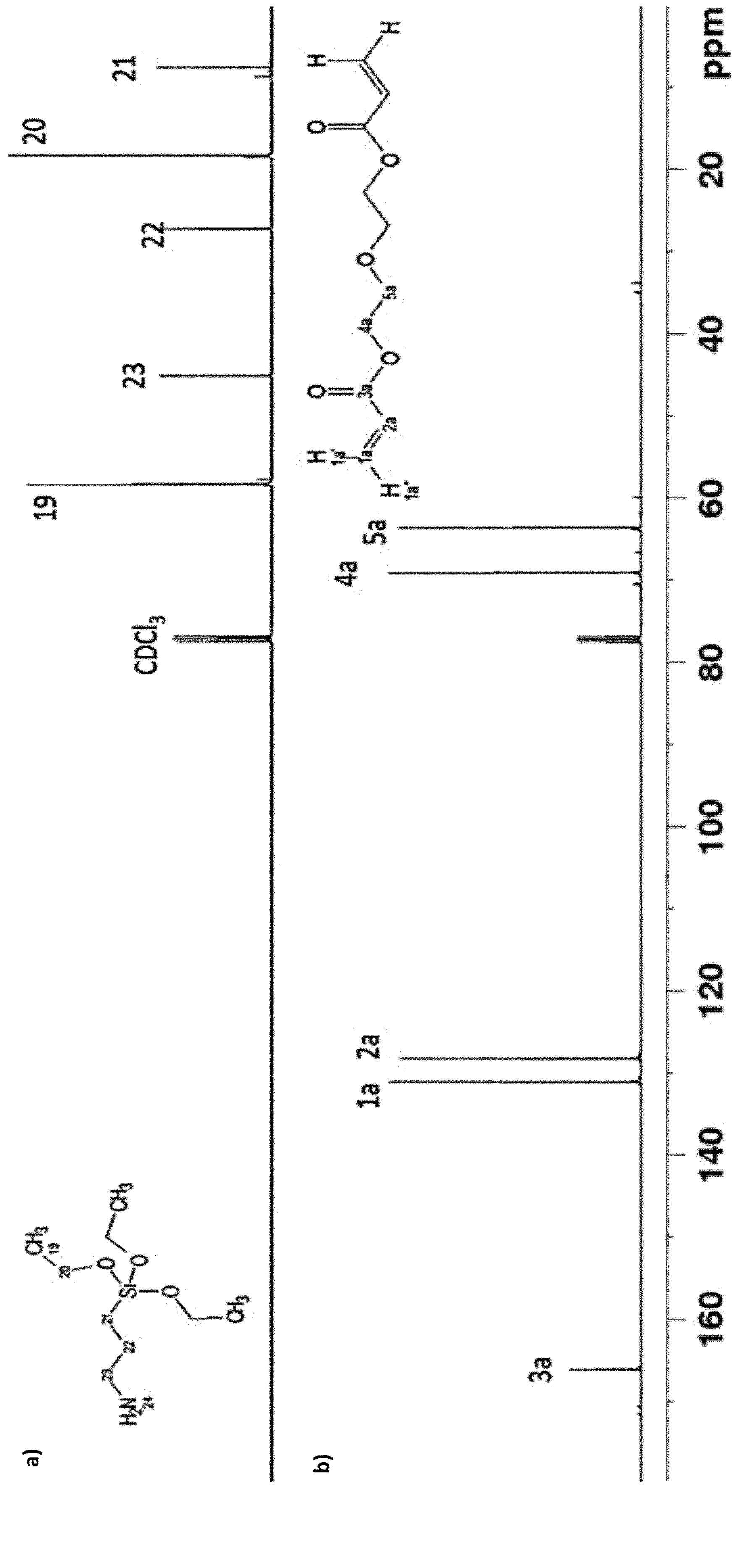
FIGS. 12*a*, 12*b*, 12*c*, and 12*d* show the $R^{5S}$-functionalization reaction monitoring by means of $^{13}$C NMR spectra of the materials used in the preparation of a $R^{5S}$-functionalized Q-T polysiloxane material. The various spectra show the non-$R^{5S}$-functionalized ($R^{5U}$=—$CH_2CH_2CH_2$—$NH_2$) monomeric T-type silane APTES (FIG. 12*a*), a reference spectrum of the organic substrate used for $R^{5S}$-functionalization diethylyeneglycol-diacrylate (DEGDA, FIG. 12*b*), the DEGDA-$R^{5S}$-functionalization product with APTES constituting a functionalized $R^{5S}$-bearing $T^0$ monomer used later for condensation grafting (FIG. 12*c*) and finally the polysiloxane material featuring said grafted $R^{5S}$-bearing T-type moieties (FIG. 12*d*).
Figure 12:
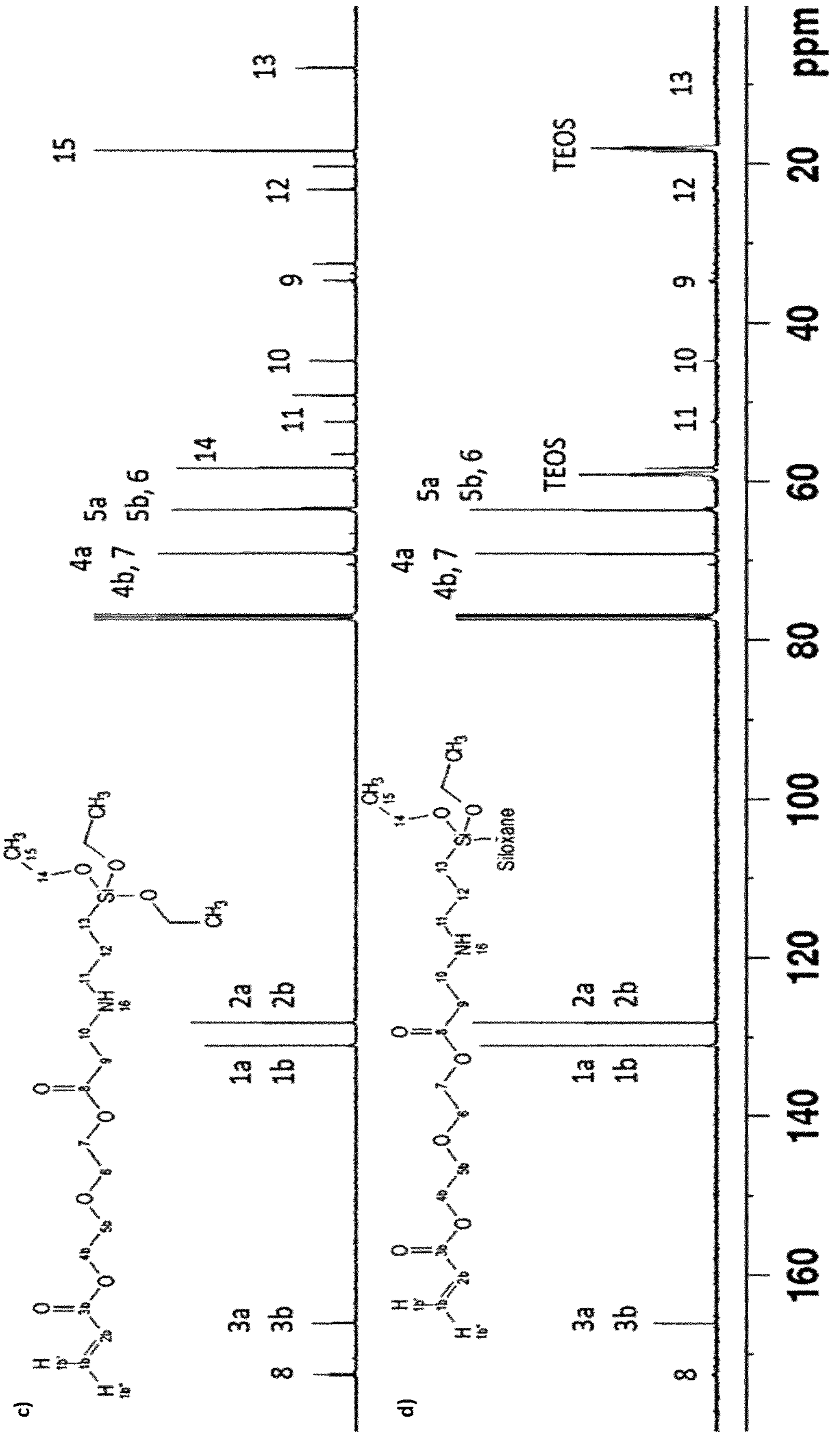
Figure 13:
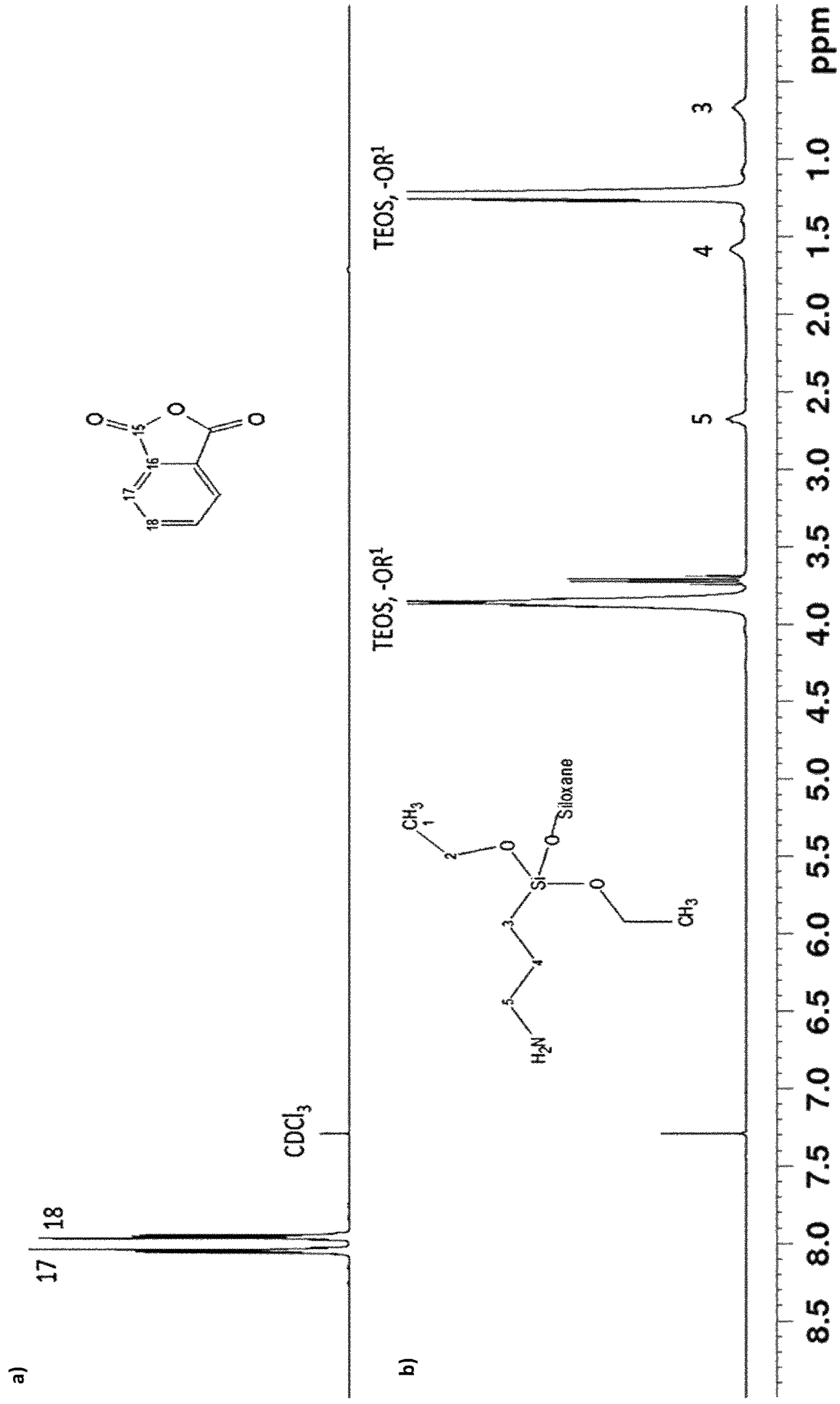
FIGS. 13*a*, 13*b*, and 13*c* show the $R^{5S}$-functionalization reaction monitoring by means of $^1$H NMR spectra of the materials used in the preparation of an $R^{5S}$-functionalized Q-T polysiloxane material via the $R^{5S}$-functionalization "on polysiloxane". The various spectra show a reference spectrum of the organic substrate used for $R^{5S}$-functionalization phthalic anhydride (PhA, FIG. 13*a*), the non-$R^{5S}$-functionalized ($R^{5U}$=aminopropyl (AP)) T-type moiety bearing polysiloxane (FIG. 13*b*), and the $R^{5S}$-functionalized polysiloxane polymeric liquid material obtained by amid coupling with the organic substrate (FIG. 13*c*).
Figure 13:
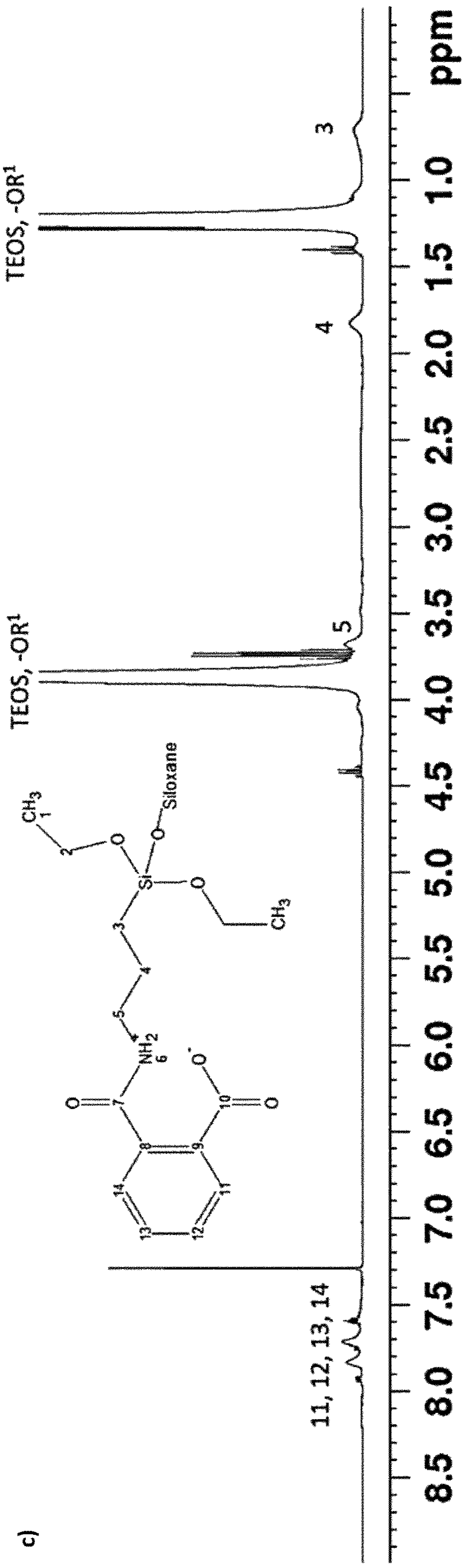
Figure 14:
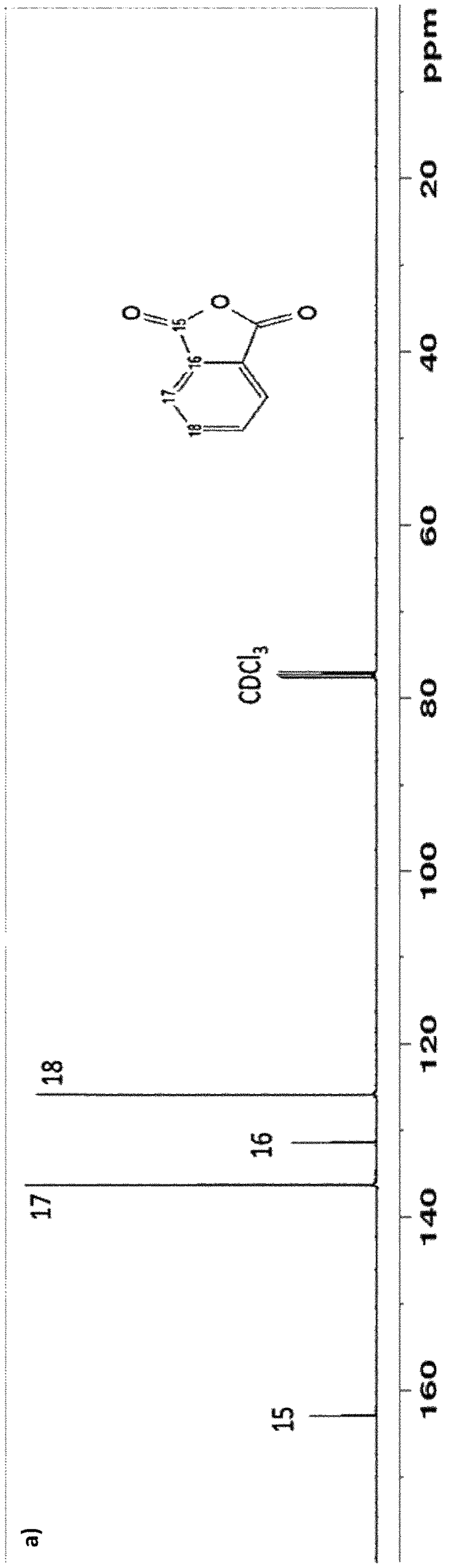
FIGS. 14*a*, 14*b*, and 14*c* show the $R^{5S}$-functionalization reaction monitoring by means of $^{13}$C NMR spectra of the various materials used in the preparation of an $R^{5S}$-functionalized Q-T polysiloxane material via the $R^{5S}$-functionalization "on polysiloxane". The various spectra show a reference spectrum of the organic substrate used for $R^{5S}$-functionalization phthalic anhydride (PhA, FIG. 14*a*), the non-$R^{5S}$-functionalized ($R^{5U}$=aminopropyl (AP)) T-type moiety bearing polysiloxane (FIG. 14*b*), and the $R^{5S}$-functionalized polysiloxane polymeric liquid material obtained by amid coupling with the organic substrate (FIG. 14*c*).
Figure 14:
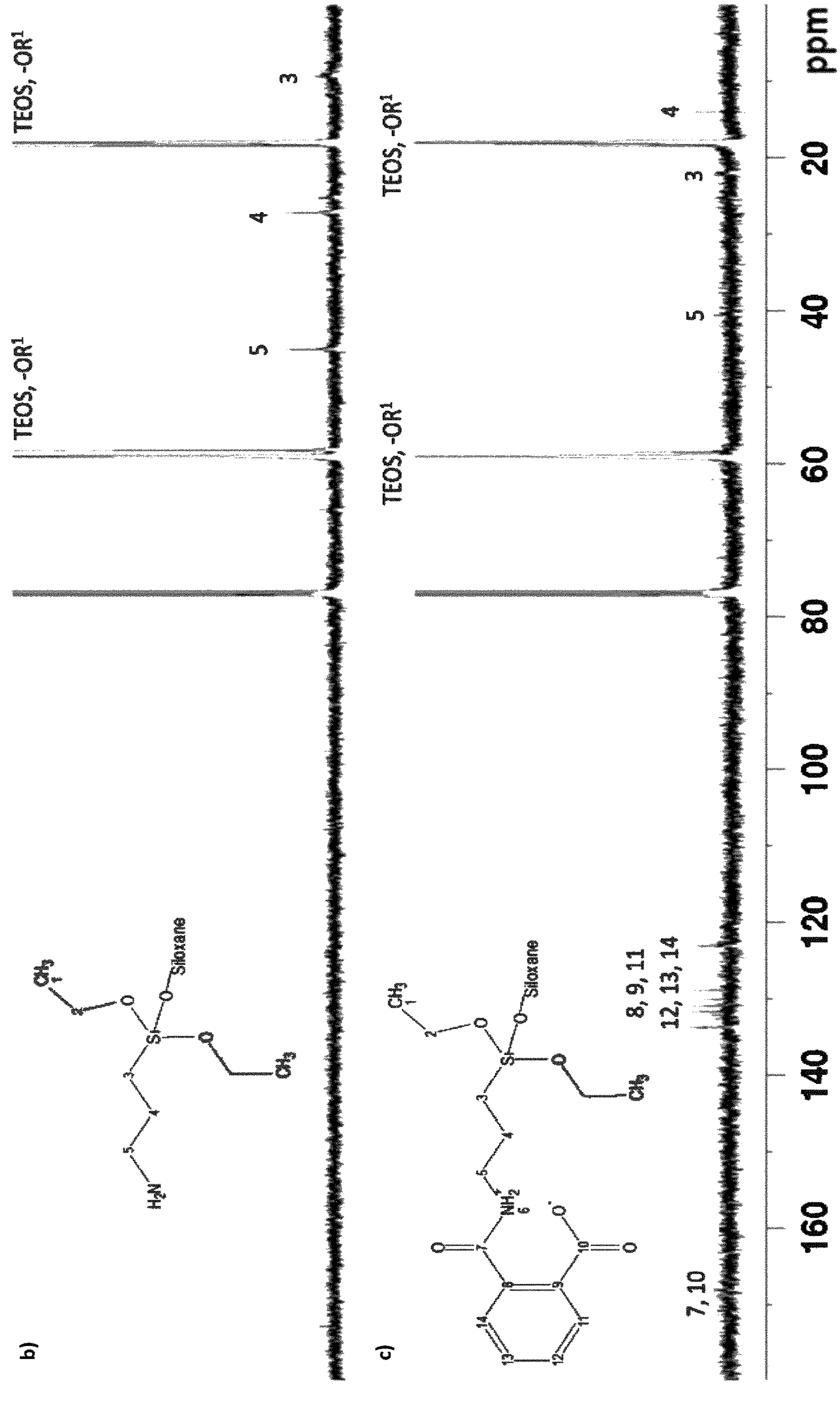

In all examples, the mol-percentage of (tetrasiloxane) ring species refers to the sum of all $Q^2$ and $Q^3$ ring species relative to the total number of Q species also referred herein as % ($Q^{2r}$&$Q^{3s,d}$) ring species unless specifically mentioned otherwise.

In all examples, the mol-percentage of (tetrasiloxane) ring species refers to the sum of all $Q^2$ and $Q^3$ ring species relative to the total number of Q species also referred herein as % ($Q^{2r}$&$Q^{3s,d}$) ring species unless specifically mentioned otherwise. Examples are structured as follows:

Example 1 describes various preparation protocols of non-$R^{5S}$-functionalized (i.e. $R^{5U}$-bearing) liquid materials.

Example 2 describes a general protocol with examples for the $R^{5S}$-functionalization of $R^{5U}$-bearing T-type monomers with various organic substrates resulting in complete or partial conversion of $R^{5U}$ into $R^{5S}$ substituents.

Example 3 describes various functionalization protocols employing different functionalization protocols (specifically, organic functionalizations "on polysiloxane" meaning that the organic functionalization reaction is carried out on $R^{5U}$-bearing T-type moieties on a Q-T(D,M) polysiloxane or alternatively "$T^0$ grafting", where a previously prepared non-$R^{5S}$-functionalized (i.e. $R^{5U}$-bearing) T-type monomer (or oligomer) is being grafted by rearrangement grafting mechanism.

Example 4 then describes combinations of organic $R^{5S}$-functionalizations employing both, functionalization "on polysiloxane" and "$T^0$ grafting" combining at least on of each of those types of $R^{5S}$-functionalizations in one material.

Example 1: Synthesis of an Non-$R^{5S}$-Functionalized D-50/(APTMS:TMCS) Polycondensate Material with $n_{Q\text{-}type}$:($n_{T\text{-}type}$:$n_{M\text{-}type}$)=1:(0.20:0.05:0.05)

483 g/3.78 mol Si equivalent of a commercial ethylsilicate Q-type precursor "Dynasylan Silbond 50" (Evonik Industries) or equivalent was placed inside a 1 L round bottom flask with refluxing column in an oil bath together with 134.2 g/0.75 mol of a monomeric T-type precursor Methyltriethoxysilane (MTES) and with 28.0 g/0.19 mol of a monomeric D-type precursor Dimethyldiethoxysilane (DMDES). The mixture was heated to a temperature of 100° C. at which point a rearrangement catalyst Tetrakis(trimethylsiloxy)titanium(IV) was added to the hot mixture. The mixture was kept stirring for a period of 40 hours, at which point 20.5 g/0.19 mol of a monomeric M-type precursor Trimethylchlorosilane (TMCS) was added and kept stirring for half an hour. Next, a solution containing 120 g of absolute ethanol and 5.5 g/0.31 mol of water was added to the hot reaction mixture, which was then left to reflux for 2 hours. Finally, the residual solvent was removed by replacing the reflux condenser by a distillation bridge and distilling it off. Approximately 125 g of condensate and 669.8 g of crude reaction product were isolated. $^{29}$Si NMR analysis confirmed that the product contained less than 8% $T^0$-monomer measured by the total amount of T-type and moieties, respectively as well as less than 19% of Q-type tetrasiloxane ring species.

Example 1b: Alternative Synthesis of D-50/(APTMS:DVDMS:TMCS) Polycondensate Material with $n_{Q\text{-}type}$:($n_{T\text{-}type}$:$n_{D\text{-}type}$:$n_{M\text{-}type}$)=1:(0.20:0.05:0.05)

The procedure shown in the above Example 1 was modified in terms of the mode of addition of the TMCS M-type precursor, which was added together with 50 ml of Ethanol but no additional water in the very beginning together with the Q-type precursors. Furthermore, during $R^{5U}$-T-type grafting, also a D-type monomer (Diphenyldimethoxysilane, DPhDMS, 46.2 g/0.19 mol) precursor was added. M and Q-type precursor were first refluxed at 100° C. for 7 h before T-type and D-type precursors and rearrangement catalyst were added (same quantities). Following a 37 h reaction time, excess volatiles were removed by distillation, first at ambient pressure and then at 200 mbar vacuum.

Example 1c: Synthesis of a TEOS Polycondensate/(PTES+N3-PTES) Polycondensate Material with $n_{Q\text{-}type}$:($n_{T\text{-}type}$)=1:(0.05+0.08)

334 g of a Q-type precursor with a DP_$Q_{type}$ of 2.17 and 44.7% ring species prepared by nonhydrolytic condensation of tetraethoxysilane (TEOS) with acetic anhydride in the presence of a Titanium(IV) isopropoxide rearrangement catalyst were placed inside a 1 L round bottom flask together where after 27.4 g/0.13 mol of a monomeric T-type precursor Propyltriethoxysilane (PTES) and 52.2 g/0.21 mol of a second T-type precursor 3-azidopropyltrimethoxysilane (N3-PTES) without further rearrangement catalyst addition. The mixture was heated to a temperature of 118° C. and was kept stirring for a period of 9 hours, at which point any residual volatiles were removed by pulling a 250 mbar vacuum for 5 minutes. $^{29}$Si NMR analysis confirmed that the product contained less than 6.5% of total $T^0$-monomer measured by the total amount of T-type moieties, respectively as well as less than 27% of Q-type tetrasiloxane ring species.

Example 1d: Synthesis of a Non-$R^{5S}$-Functionalized Ethylsilicate Polycondensate/(PTES+APTMS) Polycondensate Material with $n_{Q\text{-}type}$:($n_{T\text{-}type}$)=1:(0.05+0.15)

Again, the exact same synthesis procedure as in Example 1c above was used to prepare the material, with the sole difference that O═Zr(IV)(OAcAc)$_2$ was added as a catalyst instead of Titanium(IV)isopropoxide for the rearrangement grafting of T-type precursors and that the amount and type of the second T-type precursor (APTMS instead of N3-PTES) was varied.

Example 1e: Alternative Synthesis of a Non-e-Functionalized TEOS Polycondensate/(PTES+N3-PTES) Polycondensate Material with $n_{Q\text{-}type}$:($n_{T\text{-}type}$)=1:(0.05+0.08)

The exact same synthesis procedure as in Example 1c above was used to prepare the material, with the main difference that the first T-type precursor PTES was already added together with TEOS during the Q-type precursor preparation step, resulting in a mixed Q-T precursor with a molar $n_{Q\text{-}type}$:$n_{T\text{-}type}$ ratio of =1:0.05. During the second condensation step, an additional aliquot of a second rearrangement catalyst, $Hf(NO_3)_4$ was added while the remaining parameters and preparation steps were left unchanged. $^{29}$Si NMR analysis confirmed that the product contained less than 4.5% of total $T^0$-monomer measured by the total amount of T-type moieties, respectively as well as less than 25% of Q-type tetrasiloxane ring species and less than 49% of % ($Q^{3s,d}$)/$Q^3$ ring species.

Example 1f: Synthesis of a Non-e-Functionalized TEOS Polycondensate/(Alkinyl Functional T Type) Polycondensate Material with $n_{Q\text{-}type}$:($n_{T\text{-}type}$)=1:(0.03)

0.46 mol equivalent of a Q-type precursor with a DP_$Q_{type}$ of 1.84 and 41.2% ring species which had previously been prepared by controlled hydrolysis of commercial Ethylsilicate-40 was placed inside a 100 ml round bottom flask. Next, 4.2 g/13.8 mmol of an alkenyl terminated T-type precursor (O-(propargyl)-N-(triethoxysilylpropyl)carbamate, Gelest Inc.) and 250 ppm of a Titanium(IV) t-butoxide rearrangement catalyst were added. The mixture was heated to a temperature of 109° C. with stirring. The reaction solution was kept at temperature for 14 hours hours under nitrogen gas atmosphere, at which point the mixture was allowed to cool to room temperature. $^{29}$Si NMR analysis confirmed that the product contained less than 8% of total $T^0$-monomer measured by the total amount of T-type moieties, respectively as well as less than 31% of Q-type tetrasiloxane ring species.

Example 1g: Synthesis of a Non-e-Functionalized Ethylsilicate Polycondensate/(PTES+APTMS) Polycondensate Material with $n_{Q\text{-}type}:(n_{T\text{-}type})=1:(0.05+0.15)$ Again, the exact same synthesis procedure as in Example 1c above was used to prepare the material, with the difference that O═Zr(IV)(OAcAc)$_2$ was added as a catalyst instead of Titanium(IV)isopropoxide for the rearrangement grafting of T-type precursors and that the amount and type of the second T-type precursor (APTMS instead of N3-PTES) was varied. $^{29}$Si NMR analysis confirmed that the product contained less than 5% of total T$^0$-monomer measured by the total amount of T-type moieties, respectively as well as less than 24% of Q-type tetrasiloxane ring species.

Example 1h: Synthesis of a Non-e-Functionalized Methylsilicate Polycondensate/(oligoPTES+APTMS) Polycondensate Material with $n_{Q\text{-}type}:(n_{T\text{-}type})=1:(0.05+0.15)$ The exact same synthesis procedure as in Example 1g above was used to prepare the material, with the difference that the Q-type precursor was a methylsilicate precursor prepared from tetramethoxysilane (TMOS) with a $DP_{Qtype}$ value of 1.63 and that the first T-type precursor PTES was added in oligomeric form (oligoPTES). $^{29}$Si NMR analysis confirmed that the product contained less than 13% of total T$^0$-monomer measured by the total amount of T-type moieties, respectively as well as less than 21% of Q-type tetrasiloxane ring species.

Example 1i: Synthesis of a Non-e-Functionalized TMOS/TEOS/TPOS Polycondensate/(Cl-PTES:DMDES) Polycondensate Material with $n_{Q\text{-}type}:(n_{T\text{-}type}:n_{D\text{-}type})=1:(0.20:0.05)$ 1.33 mol equivalent of a Q-type precursor was prepared by controlled hydrolysis of a TMOS, TEOS and TPOS mixture in a molar ratio of 0.3:0.4:0.3. A first rearrangement grafting step was carried out by mixing said precursor with 48.0 g/0.20 mol of 3-chloropropyltriethoxysilane (Cl-PTES) in a microwave autoclave reactor for 19 minutes. Bis-acetylacetonato-titanium(IV)-diisopropoxide was used as the rearrangement catalyst. For the second grafting, an additional 16.0 g/0.067 mol Cl-PTES T-Type precursor and 9.9 g/0.067 mol DMDES D-Type precursor were added and the reaction was again carried out for an additional 67 minutes in the same microwave autoclave reactor. The finished reaction product was isolated and residual volatiles removed on a laboratory rotary evaporator. $^{29}$Si NMR analysis confirmed that the product contained less than 9% of combined T$^0$-monomers and less than 11% D$^0$-monomers measured by the total amount of T-type and D-type moieties, respectively, and less than 22% of Q-type tetrasiloxane ring species.

Example 1j Synthesis of a Non-e-Functionalized Ethylsilicate 40/GPTMS Polycondensate Material with $n_{Q\text{-}type}:(n_{T\text{-}type})=1:(0.10)$ 380 g/2.6 mol ethylsilicate with 40% SiO$_2$ solids content from Wacker (Wacker Silicate TES 40 WN) was poured into a pressure-tight autoclave with lid was added together with 62.4 g/0.26 mol of a T-type precursor (3-Glycidyloxypropyl) trimethoxysilane and O═Zr(IV)(NO$_3$)$_2$ as a catalyst. The autoclave was then hermetically sealed and heated to a temperature of 108° C. resulting in pressure buildup. The mixture was allowed to react for a period of 14 h, after which the autoclave was cooled to room temperature and the crude reaction product was isolated. $^{29}$Si NMR analysis confirmed that the product contained less than 9.5% of total T$^0$-monomer measured by the total amount of T-type moieties and less than 22% of Q-type tetrasiloxane ring species.

Example 1k: Synthesis of a Non-R$^{5S}$-Functionalized TMOS+TPOS:DMDES Polycondensate Precursor/(MTES) Polycondensate Material with $n_{Q\text{-}type}:(n_{T\text{-}type}:n_{D\text{-}type})=1:(0.05:0.05)$ 2.2 mol Si equivalent of a Q-type precursor with a DP_Q$_{type}$ of 2.03 and 44.7% ring species prepared by nonhydrolytic condensation of a 50:50 molar ratio mixture of TMOS and TPOS with acetic anhydride in the presence of a Titanium(IV) methoxide rearrangement catalyst, containing also a D-type silane co-precursor DMDES constituting a molar ratio of $n_{Q\text{-}type}:n_{D\text{-}type}$ of =1:0.05 were placed inside a 1 L round bottom flask. Grafting of the T-type precursor MTES was then carried out using additional Ti(IV) ethoxide as a rearrangement catalyst. $^{29}$Si NMR analysis confirmed that the product contained less than 7.0% of total T$^0$-monomer measured by the total amount of T-type moieties, respectively as well as less than 25% of Q-type tetrasiloxane ring species.

Example 1l: Synthesis of a Non-R$^{5S}$-Functionalized TEOS &TMOS/SH-PTMS Polycondensate Material with $n_{Q\text{-}type}:(n_{T\text{-}type})=1:(0.15)$ 511 g/2.66 mol Si of tetramethoxysilane (TMOS) and 277 g/1.33 mol Si of tetramethoxysilane (TEOS) and Zirconium (IV)-isobutoxide catalyst were placed inside a 1 L round bottom flask with distillation bridge resulting in a relative molar ratio of TMOS to TEOS monomer for the Q-type precursor preparation of 2:1. The flask was purged with nitrogen, sealed, and left under nitrogen pressure (balloon) and immersed into a hot oil bath, which was kept at 130° C. The Q-Type monomer/catalyst mixture was brought to temperature with stirring at 500 rpm. Once the temperature has been reached, a selected amount (465.3 g/4.56 mol) acetic anhydride was added in portions. Soon thereafter, refluxing of the reaction byproduct ethyl acetate occurred. After approximately 8 minutes, a continuous stream of methyl acetate and ethyl acetate was distilling over through the distillation bridge and collected in the capture vessel. The reaction continued for a total time of about 75 more minutes, at which point it stopped, coinciding with the ceasing of the methyl/ethyl acetate distilling over. The collection vessel was removed after a total reaction time of 1 h and 40 minutes and emptied, yielding a total mass of 725 g of collected condensate and 465 g of Q-type precursor. $^{29}$Si NMR analysis confirmed that the precursor had a DP_Q$_{type}$ of 2.22 and 51.0% Q-type tetrasiloxane ring species before the grafting step. This precursor was then mixed with 117.8 g/0.6 mol Mercaptopropyltrimethoxysilane (SH-PTMS) as a T-type precursor. The mixture was then again heated up to temperature of 115° C. with stirring in the same reaction vessel and was kept for 5 hours, at which point the heating source was removed and the product allowed to cool to room temperature. $^{29}$Si NMR analysis confirmed that the product contained less than 8.3% of total T$^0$-monomer measured by the total amount of T-type moieties, respectively as well as less than 22% of Q-type tetrasiloxane ring species and less than 43.2% of % ($Q^{3s,d}$)/$Q^3$ ring species.

Example 1m: Synthesis of a Non-$R^{5S}$-Functionalized TEOS/(PhTES+PTMS:DPhDES) Polycondensate Material with $n_{Q\text{-}type}$:($n_{T\text{-}type}$ $n_{D\text{-}type}$)=1:(0.10+0.05:0.05)

An amount containing 4.5 mol Si equivalent of a Q-type precursor prepared by controlled hydrolysis of TEOS was injected into a hermetically sealed stirred glass reactor (Buchi versoclave, 11) set to a temperature of 105° C. Next, 108.2 g/0.45 mol and 37.0 g/0.23 mol of a first and second T-type monomer precursor phenyltriethoxysilane (PhTES) and propyltrimethoxysilane (PTMS) were also injected into the hot autoclave together with 56.2 g/0.23 mol of a D-type precursor diphenyldimethoxysilane (DPhDMS) and Titanium(IV)-methoxide as a catalyst. The mixture was kept at temperature with stirring for 13 hours and then removed from the heating source and allowed to cool to room temperature. $^{29}$Si NMR analysis confirmed that the product contained less than 16% $T^0$-monomer and less than 11% of $D^0$-monomer measured by the total amount of T-type and D-type moieties, respectively, as well as less than 26.9% of Q-type tetrasiloxane ring species.

Example 1n: Synthesis of a Non-$R^{5S}$-Functionalized TEOS/(PhTES+PTMS) Polycondensate Material with $n_{Q\text{-}type}$:($n_{T\text{-}type}$)=1:(0.10+0.05)

The exact same synthesis procedure as in Example 1m above was used to prepare the material with the sole difference that the D-type precursor was omitted during the synthesis. $^{29}$Si NMR analysis confirmed that the product contained less than 13% $T^0$-monomer measured by the total amount of T-type and D-type moieties as well as less than 26.9% of Q-type tetrasiloxane ring species.

Example 1o: Synthesis of a Non-$R^{5S}$-Functionalized TEOS (Oligomer)/(TESPT+VTES) Polycondensate Material with $n_{Q\text{-}type}$:($n_{T\text{-}type}$)=1:(0.17+0.06)

2.66 mol Si equivalent of a Q-type precursor made by the "silanol route" (preparation of triethoxysilanol from TEOS with sodium hydroxide, followed by workup and condensation of the triethoxysilanol) were placed inside a 500 ml glass cylinder with cap. Next, 185.8 g/0.44 mol of a first T-type precursor Bis(triethoxysilylpropyl)tetrasulfide (TESPT) and 23.1 g/0.16 mol of a second T-type precursor vinyltriethoxysilane (VTES) was added together with a bis-acetylacetonato-titanium(IV)-diisopropoxide rearrangement catalyst. The mixture was heated to 80° C. and was kept stirring for a period of 6 days. Residual solvent was removed by pulling a 100 mbar vacuum for 30 minutes. $^{29}$Si NMR analysis confirmed that the product contained less than 42% $T^0$ species measured by the total amount of T-type moieties as well as less than 29.2% of Q-type tetrasiloxane ring species.

Example 1p: Synthesis of a Non-e-Functionalized TEOS (Oligomer)/MaPTMS Polycondensate Material with $n_{Q\text{-}type}$:$n_{T\text{-}type}$=1:0.10

A procedure identical to the one described in Example 1j was used to prepare this material, with the key differences that the T-type precursor was 3-Methacryloxypropyltrimethoxysilane (MaPTMS) dissolved in a cosolvent (Methyl ethyl ketone) and that the autoclave was heated by means of a microwave source and a reduced reaction time of 3.5 hours was used. $^{29}$Si NMR analysis confirmed that the product contained less than 11% of total $T^0$-monomer measured by the total amount of T-type moieties and less than 24% of Q-type tetrasiloxane ring species.

Example 2 a-l: General Synthetic Protocol for the Preparation of $R^{5S}$-Functionalized Graftable $T^0$ Monomers (or Oligomers) to be Used in Rearrangement Grafting In a typical experiment, an non-$R^{5S}$-functionalized "$R^{5U}$ monomer" (or oligomer) is functionalized using the following protocol: The "$R^{5U}$ monomer" is used neat or dissolved in a solvent (SO). It is then reacted with a suitable organic substrate (SU) exemplified by the specific examples a to l in Table 1 below by slow dosing of the latter. The reaction stoichiometry is selected according to the ability of the multifunctionality of the individual SU compounds. The mode of addition can also be inversed, meaning that the organic substrate can be placed in the vessel first (with solvent SO) and then the "$R^{5U}$ monomer" T-type silane dosed slowly. As a general rule of thumb, the material which is the stoichiometrically limiting component is the one being dosed to the component which is present in excess. The reaction is then kept at a desired reaction temperature with stirring for a desired reaction time (TR), if needed in the presence of a suitable catalyst. Depending on the type of reaction, a workup and purification step may be necessary. The resulting $R^{5S}$-functionalized $T^0$ monomer can the be used for rearrangement grafting onto a suitable Q(T,D) precursor material as exemplified in Example 3 below.

TABLE 1

| Example # | Silane substrate [$R^{5U}$-Monomer] | Organic substrate [SU] | Stoichiometry | Solvent [SO] | Reaction time [TR] | Temperature | Catalyst | Reference Lit. |
|---|---|---|---|---|---|---|---|---|
| 2a | Aminopropyl | Epoxide DGEBA | 1:8 | | 4 h | 80 | | J. Vinyl Add. Technol., 2016, 22(1), 80-87 |
| 2b | Mercaptopropyl | Epoxide Bisphenol F DGE | 1:1 | THF/DMSO/DMF | 2 h | r.t. | Base (e.g. TBAF) | J. Polym. Sci. Part A: Polym. Chem., 54, 3057-3070 |
| 2c | Aminopropyl | Aldehyde Glutaraldehyde | | 2.5% (v/v) in PBS | 0.5 h | r.t. | | Applied Surface Science, 2014, 305, 522-530 |

TABLE 1-continued

| Example # | Silane substrate [$R^{5U}$-Monomer] | Organic substrate [SU] | Stoichiometry | Solvent [SO] | Reaction time [TR] | Temperature | Catalyst | Reference Lit. |
|---|---|---|---|---|---|---|---|---|
| 2d | Chloropropyl | Friedel-crafts alkylation nitrobenzene | | | 1 h | 45 | $AlCl_3$ | |
| 2e | Phenyl | Chlorination $Cl_2$, $FeCl_3$ | | | | | $FeCl_3$ | |
| 2f | Phenyl | Friedel-crafts alkylation (e-rich aromatic?) RX | | | 1 h | 45 | $AlCl_3$ | |
| 2g | Azidopropyl | via iodide to ether (2step) 1) t-BuI, aq. $Na_2S_2O_3$; 2) KOR | 1) 1:3 | 1) DCM; 2) conjugate acid of alkoxide | 18 h; 1-8 h | r.t.; reflux | | Tetrahedron, 2012, 68, 9606-9611 |
| 2h | Glycidoxypropyl | Jeffamine Poly(propylene glycol) bis(2-aminopropyl ether) | 1:1 | | 1 h | 120 | | |
| 2i | Aminopropyl | Fatty acid | | DMF | 24 h | 60 | | J.Oleo Sci., 2017, 66(7), 771-784 |
| 2j | Cylcloepoxypropyl | Chitosan/hydrolysed chitin Chitosan | 8:1 | 2% w/v CS solution in aq. acetic acid | 0.5 h | r.t. | | Polymers, 2020, 12, 2723 |
| 2k | Vinyl | Acrylonitrile oligomer (cross-metathesis?) (meth)acrylonitrile | 1:2 | DCM | 2 h | 40/reflux | [Ru] | Green Chem., 2011, 13, 2258-227 |
| 2l | Mercaptopropyl | Alkylation to alkyl-thioether NaOBu; RX (aromatic) | 2 eq. base | $CH_3CN$ | 20 h | 80 | Zn, L-Proline | RSC Adv., 2015, 5, 32675-32678 |

TABLE 2

| Example # | Siloxane substrate [$R^{5U}$] | DP_$Q_{type}$ | DP_$T_{type}$ | Organic functionalization | Organic substrate [SU] | Stoichimetry |
|---|---|---|---|---|---|---|
| 3a | Aminopropyl | 2.15 | 1.88 | On Polysiloxane | Diepoxide | 1:8 |
| 3b | Azidopropyl | 1.65 | 1.35 | $T^0$ grafting | Alkyne | |
| 3c | Alkyne | 1.88 | 1.56 | $T^0$ grafting | Azide | |
| 3d | Aminoethyl | 2.24 | 2.14 | On Polysiloxane | HDDA (Diacrylate) | >1:1.5 |
| 3e | Aminopropyl | 2.35 | 2.21 | On Polysiloxane | HDI | |
| 3f | Aminopropyl | 1.94 | 1.77 | On Polysiloxane | Triisocyanate (IPDI trimer) | |
| 3g | Mercaptopropyl | 2.04 | 1.88 | $T^0$ grafting | 4, 4-MDI | |
| 3h | Hydroxypropyl | 1.46 | 1.33 | On Polysiloxane | TDI | |
| 3i | Chloropropyl | 1.77 | 1.38 | On Polysiloxane | Ethylenediame | |
| 3j | Glycidoxypropyl | 1.91 | 1.68 | $T^0$ grafting | amino-PDMS | |
| 3k | Aminopropyl | 1.64 | 1.58 | On Polysiloxane | Maleic anhydride | 1:1 |
| 3l | Mercaptopropyl | 1.84 | | On Polysiloxane | Phthalic anhydride | 1:1 |
| 3m | Propyl-methacrylate | 1.55 | 1.37 | On Polysiloxane | MMA | |

TABLE 2-continued

| | | | | | | |
|---|---|---|---|---|---|---|
| 3n | TESPT | 1.92 | 1.48 | On Polysiloxane | Styrene | |
| 3o | Aminopropyl | 2.11 | 2.05 | $T^0$ grafting | Acid chloride, TEA | |
| 3p | Aminopropyl | 1.81 | 1.46 | On Polysiloxane | 4-bromobenzaldehyde, $B(OCH_2CF_3)_3$ | 1:1:1 |
| 3q | Mercaptopropyl | 2.06 | 1.99 | On Polysiloxane | Bromo-isopentane | |
| 3r | Mercaptopropyl | 2.44 | 2.26 | $T^0$ grafting | 1-hexene | |
| 3s | Phenyl | 1.87 | 1.72 | $T^0$ grafting | Ethyl oxalate chloride | |
| 3t | Aminopropyl | 2.1 | 1.67 | $T^0$ grafting | Oligopeptide | |

| Example # | Solvent [SO] | Reaction time [TR] | Temperature [° C.] | Catalyst | Reference Lit. J. Non Cryst solids, 2008, 143(5), 188 |
|---|---|---|---|---|---|
| 3a | | 4 h | 80 | | Macromol. Rapid Comm. 2020, 41, 1900359 |
| 3b | Large range | | r.t. | Cu(I), [Ru] | |
| 3c | | | | | |
| 3d | | 1 h | 40 | | |
| 3e | Toluene | 3 h | 70 | | J. Org. Chem, 2013, 9, 2378-2386 |
| 3f | | | | | |
| 3g | THF | 0.5 h | r.t. | Base (DBU) | Polym. Chem., 2011, 2, 88-90 |
| 3h | Toluene | | | DBTDL | Wood Sci. Technol., 2020, 54, 1091-111 |
| 3i | DMF | 9 h | r.t. | Et3N | RSCAdv., 2014, 4, 18229-18233 |
| 3j | | | | | |
| 3k | | | 55 | | |
| 3l | | | 80 | | |
| 3m | | | | | |
| 3n | | | | | |
| 3o | DCM | | r.t. | | |
| 3p | THF | 2 h | r.t. | | Org. Lett. 2015, 17, 10, 2442-2445 |
| 3q | | | | DMPA | |
| 3r | | | | | |
| 3s | DCM | 1 h | r.t. | $AlCl_3$ | Synthesis, 13, 2006, 2103-2112 |
| 3t | Amyl acohol/water | | | | |

Example 3 a-t: General Synthetic Protocol for the Preparation of $R^{5S}$-Functionalized Polymeric Liquid Materials According to this Invention Using Either One of Two Distinct Preparative Approaches In a typical experiment, an polymeric liquid material exhibiting at least one T-type silane can be $R^{5S}$-functionalized using either of two approaches, namely, i) by rearrangement grafting of an $R^{5S}$-functionalized graftable $T^0$ monomer or oligomer or ii) by direct organic functionalization of already grafted, suitable $R^{5U}$-T-type moieties on the material using specific organic functionalization reactions. Either one of these protocols can be used interchangeably if chemically meaningful and applicable and also multiple times, however for clarity, in this example only single $R^{5S}$-functionalizations were selected on any given polymeric liquid material. A list of typical examples a to t is presented above in Table 2. Please note that for each specific $R^{5S}$-functionalization, a matching specific "organic functionalization" protocol is assigned. The choice of protocol is not compulsory for the given Siloxane ($R^5$)/organic (SU) substrate combination.

Methodology for "$T^0$ Grafting" $R^{5S}$-Functionalization:

A $R^{5S}$-functionalized $T^0$ monomer or oligomer bearing organofunctional groups, which can be one selected from the list of examples in Table 1, is grafted to a non-$R^{5S}$-functionalized (i.e. $R^{5U}$-bearing) polymeric liquid material as for example the ones described in Example 1. The rearrangement reaction grafting is carried out by reacting said $R^{5S}$-functionalized T-type monomer or oligomer with a polymeric liquid material in the presence of a rearrangement catalyst. Temperature, catalyst and duration of the reaction are chosen such that satisfactory grafting efficacy is reached. Optionally, different grafting conditions can be tested out and the grating efficacy analyzed by means of $^{29}Si$ NMR spectroscopy in order to find the optimal grafting conditions.

Methodology for "on Polysiloxane" $R^{5S}$-Functionalization:

In this case, the organic $R^{5S}$-functionalization is carried out directly on suitable $R^{5U}$-bearing T-type moieties, which have already previously been grafted. In analogy to Example 2, the T-type grafted polysiloxane featuring suitable $R^{5U}$-moieties for functionalization (all descriptions in Example 1 with exception of Example 1k qualify in general, while there are many other possible combinations) is used neat or dissolved in a solvent (SO). It is then reacted with a suitable organic substrate (SU) exemplified by the specific examples in Table 2 above by slow dosing of the latter. Again, the reaction stoichiometry is selected according to the ability of the multifunctionality of the individual SU compounds. The mode of addition can also be inversed, meaning that the organic substrate can be placed in the vessel first (with solvent SO) and then the organic substrate (SU) slowly. As a general rule of thumb, the material which is the stoichiometrically limiting component is the one being dosed to the component which is present in excess. The reaction is then kept at a desired reaction temperature with stirring for a desired reaction time (TR), if needed in the presence of a suitable catalyst. Depending on the type of reaction, a workup and purification step may be necessary.

Example 4a

A non-$R^{5S}$-functionalized TMOS+TPOS:MTES:DMDES polycondensate material according to Example 1k was prepared. Next, an $R^{5S}$-functionalized $T^0$ monomer according to Example 2c was prepared and grafted using a standard rearrangement grafting protocol (90° C., 32 h, Ti(IV)isopropoxide rearrangement catalyst). $^{29}Si$ NMR analysis confirmed that the product contained less than 10.5% of total $T^0$-monomer measured by the total amount of T-type moieties, respectively as well as less than 22% of Q-type tetrasiloxane ring species and less than 41.1% of % $(Q^{3s,d})/Q^3$ ring species.

Example 4b

A non-$R^{5S}$-functionalized Q-T polycondensate according to a simplified protocol given in Example 3q was prepared from a starting material according to Example 11. Next, a second $R^{5S}$-functionalized $T^0$ monomer according to Example 2i was grafted using a standard rearrangement grafting protocol (100° C., 24 h, Ti(IV)isopropoxide rearrangement catalyst). $^{29}Si$ NMR analysis confirmed that the product contained less than 7.2% of total $T^0$-monomer measured by the total amount of T-type moieties, respectively as well as less than 25% of Q-type tetrasiloxane ring species.

Example 4c

A material identical to the one described in Example 4b was prepared but with the difference that during the Example 2i $T^0$ monomer grafting, an additional M-type precursor ethoxytrimethyl-silane (ETMS) was added. $^{29}Si$ NMR analysis confirmed that the product contained less than 8.5% of total $T^0$-monomer measured by the total amount of T-type moieties, respectively as well as less than 24% of Q-type tetrasiloxane ring species.

Example 4d

A non-$R^{5S}$-functionalized Q-T polymeric liquid material featuring -propyl and azidopropyl $R^{5U}$-substituents was prepared according to Example 1c. Next, an $R^{5S}$-functionalized $T^0$ monomer according to Example 2b was separately prepared and grafted using a standard rearrangement grafting protocol (100° C., 24 h, Ti(IV)isopropoxide rearrangement catalyst). Next, the azidopropyl substituents were partially functionalized by means of Cu(s) catalyzed Click chemistry with a 4-chlorohexine with a targeted degree of $R^{5S}$ functionalization of 40%. $^{29}Si$ NMR analysis confirmed that the product contained less than 6.1% of total $T^0$-monomer measured by the total amount of T-type moieties, respectively as well as less than 26% of Q-type tetrasiloxane ring species.

Example 4e

A material identical to the one prepared in Example 4d, wherein at the end of the synthesis a second $T^0$ monomer according to Example 2e was grafted onto the polysiloxane liquid material using a standard rearrangement grafting protocol (100° C., 24 h, no additional rearrangement catalyst addition). $^{29}Si$ NMR analysis confirmed that the product contained less than 7.1% of total $T^0$-monomer measured by the total amount of T-type moieties, respectively as well as less than 30% of Q-type tetrasiloxane ring species.

Example 4f

A non-$R^{5S}$-functionalized Q-T polymeric liquid material featuring -propyl and aminopropyl $R^{5U}$-substituents was prepared according to Example 1h. Next, an $R^{5S}$-functionalized $T^0$ monomer according to Example 2i was separately prepared and grafted using a standard rearrangement grafting protocol (100° C., 24 h, Ti(IV)isopropoxide rearrangement catalyst). Next, residual $R^{5U}$-aminopropyl substituents were completely functionalized by reaction with an excess of hexamethylene diisocyanate (HDI) in toluene according to Example 3e. $^{29}Si$ NMR analysis confirmed that the product contained less than 9.7% of total $T^0$-monomer measured by the total amount of T-type moieties, respectively as well as less than 22% of Q-type tetrasiloxane ring species.

Example 4g

A material identical to Example 4f was prepared with the sole difference that during the grafting of the second $T^0$ monomer also a D-type silane dimethyldiethoxysilane and additional rearrangement catalyst were added to the grafting solution. $^{29}Si$ NMR analysis confirmed that the product contained less than 5.9% of total $T^0$-monomer measured by the total amount of T-type moieties, respectively as well as less than 26% of Q-type tetrasiloxane ring species.

Example 4 h

A non-$R^{5S}$-functionalized Q-T polymeric liquid material featuring -propyl and -phenyl $R^{5U}$-substituents was prepared according to Example 1n. Next, an $R^{5S}$-functionalized $T^0$ monomer according to Example 2i (only partial conversion with aminosilane monomer excess) was separately prepared and grafted using a standard rearrangement grafting protocol (100° C., 24 h, Ti(IV)isopropoxide rearrangement catalyst). Next, residual $R^{5U}$-aminopropyl substituents were completely functionalized by reaction with an excess of bisphenol A diglycidyl ether (DGEBA). $^{29}$Si NMR analysis confirmed that the product contained less than 11% of total $T^0$-monomer measured by the total amount of T-type moieties, respectively as well as less than 22% of Q-type tetrasiloxane ring species.

Example 4i

A material identical to Example 4 h was prepared with the sole difference that after the end of the reaction, $R^{5U}$-phenyl groups were partially functionalized by means of a Friedel-Crafts acylation. $^{29}$Si NMR analysis confirmed that the product contained less than 9.7% of total $T^0$-monomer measured by the total amount of T-type moieties, respectively as well as less than 29% of Q-type tetrasiloxane ring species.

Example 4j

A material identical to Example 4i was prepared with the difference that during the grafting of the $R^{5S}$-functionalized $T^0$ monomer according to Example 2i also a D-type monomer diphenyl-dimethoxysilane (DPhDMS) and additional rearrangement catalyst were added to the grafting solution. Furthermore, during the Friedel Crafts acylation, a partial reaction also took place on the phenyl groups ($R^2$, $R^3$ in this case are also reactive) of the D-type moieties. $^{29}$Si NMR analysis confirmed that the product contained less than 7.4% of total $T^0$-monomer measured by the total amount of T-type moieties, respectively as well as less than 23% of Q-type tetrasiloxane ring species.

Example 4k

A Q-type precursor prepared by controlled hydrolysis of TEOS was used as precursor, onto which two $R^{5S}$-functionalized $T^0$ monomers which had been independently prepared to Examples 21 and 2c were grafted using a standard rearrangement grafting protocol (100° C., 24 h, Ti(IV) isopropoxide rearrangement catalyst). $^{29}$Si NMR analysis confirmed that the product contained less than 4.2% of total $T^0$-monomer measured by the total amount of T-type moieties, respectively as well as less than 27% of Q-type tetrasiloxane ring species.

Example 4l

A material prepared according to Example 4k was first mixed with an M-type precursor HMDSO in 98% ethanol and reacted in the presence of catalytic amounts of hydrochloric acid for 1 h at 85° C. Next, an aliquot of hexamethyldisilazane was added to the mixture and stirring continued for another 45 minutes. Residual volatiles were then removed by means of vacuum distillation. Then, a third $R^{5S}$-functionalized $T^0$ monomer was added which had been independently prepared according to Examples 2j was grafted using a standard rearrangement grafting protocol (100° C., 24 h, Ti(IV)isopropoxide rearrangement catalyst). $^{29}$Si NMR analysis confirmed that the product contained less than 6.7% of total $T^0$-monomer measured by the total amount of T-type moieties, respectively as well as less than 28% of Q-type tetrasiloxane ring species.

Example 4m

A non-$R^{5S}$-functionalized TEOS: TESPT+VTES polycondensate material according to Example 1o was prepared. Next, an $R^{5S}$-functionalized $T^0$ monomer according to Example 2i was prepared and grafted using a standard rearrangement grafting protocol (90° C., 32 h, Ti(IV)isopropoxide rearrangement catalyst). Next, functionalization of radical polymerizable $R^{5U}$-groups was achieved by reacting the mixture with acrylonitrile in a controlled radical polymerization protocol. $^{29}$Si NMR analysis confirmed that the product contained less than 7.7% of total $T^0$-monomer measured by the total amount of T-type moieties, respectively as well as less than 44.2% of % $(Q^{3s,d})/Q^3$ ring species.

Example 4n

A material identical to Example 4m was prepared with the difference that after the last step (controlled radical polymerization) residual vinyl groups were functionalized in a separate reaction step by means of a thiol-ene reaction with an excess of 1-hexene according to Example 3r. $^{29}$Si NMR analysis confirmed that the product contained less than 7.4% of total $T^0$-monomer measured by the total amount of T-type moieties, respectively as well as less than 26% of Q-type tetrasiloxane and less than 42.5% of % ($Q^{3s}$, d)/$Q^3$ ring species ring species.

Example 5: Synthesis of TEOS/(iBTES:TMES) Polycondensate Material with $n_{Q\text{-}type}$:($n_{T\text{-}type}$:$n_{D\text{-}type}$)=1:(0.20:0.05)

311 g of crude precursor from Example 4 were placed inside a 1 L round bottom flask together with 146.0 g/0.53 mol of a monomeric T-type precursor Octyltriethoxysilane (OTES) and 27.2 g/0.13 mol of a monomeric D-type precursor Dimethyldiethoxysilane (DMDES). The mixture was heated to a temperature of 100° C. at which point a rearrangement catalyst bis-acetylacetonato-titanium(IV)-diacetate was added to the hot mixture. The mixture was kept stirring for a period of 48 hours, at which point any residual solvent was removed by pulling a 250 mbar vacuum for 5 minutes. $^{29}$Si NMR analysis confirmed that the product contained less than 11% $T^0$-monomer and less than 5% of $D^0$-monomer measured by the total amount of T-type and D-type moieties, respectively as well as less than 23% of Q-type tetrasiloxane ring species.

Example 5b: Alterative Synthesis of TEOS/(OTES:DVDMS) Polycondensate Material with $n_{Q\text{-}type}$:($n_{T\text{-}type}$:$n_{D\text{-}type}$)=1:(0.25:0.05)

Instead of adding both T-type and D-type monomers together with a premade Q-type precursor from Example 4, here a premade precursor already containing the D-type moieties introduced during the precursor condensation step according to Example 4d was used. Accordingly, the premade crude precursor batch from Example 4d was further premixed with 182.4 g/0.66 mol of a monomeric T-type precursor Octyltriethoxysilane (OTES) and the same type and amount of rearrangement catalyst. The remaining protocol was identical to the one described in Example 5. $^{29}$Si NMR analysis confirmed that the product contained less than 15% $T^0$-monomer and less than 5% of $D^0$-monomer measured by the total amount of T-type and D-type moieties as well as less than 29.5% of Q-type tetrasiloxane ring species and 45.8% $Q^{3s,d}/Q^3$ ring species.

Example 6: Synthesis of TEOS/(APTMS+PTES) Polycondensate Material with $n_{Q\text{-}type}:n_{T\text{-}type}$ 1:(0.20+0.05)

334 g of crude precursor from Example 4b were placed inside a 1 L round bottom flask together where after 27.4 g/0.13 mol of a monomeric T-type precursor Propyltriethoxysilane (PTES) and 95.0 g/0.53 mol of a second T-type precursor 3-aminopropyltremethoxysilane (APTMS) were added together with a rearrangement catalyst Zirconium (IV)-chloride. The mixture was heated to a temperature of 125° C. and was kept stirring for a period of 5.5 hours, at which point any residual solvent was removed by pulling a 250 mbar vacuum for 5 minutes. $^{29}$Si NMR analysis confirmed that the product contained less than 7% of total $T^0$-monomer measured by the total amount of T-type moieties, respectively as well as less than 27% of Q-type tetrasiloxane ring species.

Example 6b: Alterative Synthesis of TEOS/(APTMS+PTES) Polycondensate Material with $n_{Q\text{-}type}:n_{T\text{-}type}$ 1:(0.20+0.05)

In analogy to example 5b, also here the entire premade crude precursor batch from Example 4e containing already the PTES T-type functional silane in Q-T oligomeric form was mixed with 95.0 g/0.53 mol of the second T-type precursor 3-aminopropyltremethoxysilane (APTMS) and the same type and amount of rearrangement catalyst. The remaining protocol was identical to the one described in Example 6. $^{29}$Si NMR analysis confirmed that the product contained less than 6% of total $T^0$-monomer measured by the total amount of T-type moieties and less than 24% of Q-type tetrasiloxane ring species.

Example 7: Synthesis of an Ethylsilicate-40/(iBTES:TMES) Polycondensate Material with $n_{Q\text{-}type}:(n_{T\text{-}type}+n_{M\text{-}type})=1:0.15:0.05$ The precursor material batch prepared in Example 4f was poured into a 1 L sealable glass bottle and additional catalyst, Ti(IV)bromide, was added together with 87.8 g/0.40 mol of a T-type precursor isobutyl-triethoxysilane (iBTES) and 31.1 g/0.26 mol of an M-type precursor trimethylethoxysilane (TMES). The bottle was then lightly sealed and placed inside a heating cabinet which was set to a constant temperature of 100° C. The mixture was allowed to react for a period of 100 h at this temperature, after which the crude reaction product was isolated. $^{29}$Si NMR analysis confirmed that the product contained less than 10% of total $T^0$-monomer measured by the total amount of T-type moieties and less than 21% of Q-type tetrasiloxane ring species.

Example 8: Synthesis of TMOS/GPTMS Polycondensate Material with $n_{Q\text{-}type}:n_{T\text{-}type}=1:0.10$ The precursor material batch prepared in Example 4c was poured into a pressure-tight autoclave with lid and additional catalyst was added together with 62.4 g/0.26 mol of a T-type precursor (3-Glycidyloxypropyl)trimethoxysilane. The autoclave was then hermetically sealed and heated to a temperature of temperature of 110° C. resulting in pressure buildup. The mixture was allowed to react for a period of 14 h, after which the autoclave was cooled to room temperature and the crude reaction product was isolated. $^{29}$Si NMR analysis confirmed that the product contained less than 8% of total $T^0$-monomer measured by the total amount of T-type moieties and less than 23% of Q-type tetrasiloxane ring species.

Example 9: Preparation of a Q-Type Polycondensate Precursor Material with a Targeted $DP\_Q_{type}=2.44$ from Tetraethoxysilane or its Oligomers Tetraethoxysilane (TEOS) in monomeric or oligomeric form was hydrolyzed in the presence of a cosolvent according to the state of the art with a water stoichiometry amount required to achieve a desired degree of polymerization of the precursor material $DP\_Q_{type}=2.44$ using a standard hydrolysis/condensation catalyst. Once the hydrolysis was completed, excess cosolvent and alcohol released during the hydrolysis were removed by vacuum distillation. $^{29}$Si NMR analysis revealed 54.9% of Q-type tetrasiloxane ring species in the precursor material.

Example 9b: Preparation of a Q-Type Polycondensate Precursor Material with a Targeted $DP\_Q_{type}=2.0$ from Tetrapropoxysilane or its Oligomers A material identical to the one in Example 9 was prepared, with the exception that tetrapropoxysilane (TPOS) was used as a starting Q-type monomer or oligomer and that the stoichiometric amount of water added was adjusted to yield a degree of polymerization $DP\_Q_{type}=2.0$. $^{29}$Si NMR analysis of the precursor material revealed 44.5% of Q-type tetrasiloxane ring species.

Example 9c: Preparation of a Q-Type Polycondensate Precursor Material with a Targeted $DP\_Q_{type}=1.72$ from Tetraethoxysilane or its Oligomers A material identical to the one in Example 9 was prepared, with the exception that the stoichiometric amount of water added was adjusted to yield a degree of polymerization $DP\_Q_{type}=1.72$. $^{29}$Si NMR analysis of the precursor material revealed 33.7% of Q-type tetrasiloxane ring species.

Example 9d: Preparation of a Q-Type Polycondensate Precursor Material with a Targeted $DP\_Q_{type}=2.2$ from Tetraethoxysilane or its Oligomers A material identical to the one in Example 9 was prepared, with the exception that the stoichiometric amount of water added was adjusted to yield a degree of polymerization $DP\_Q_{type}=2.2$. $^{29}$Si NMR analysis of the precursor material revealed 47.0% of Q-type tetrasiloxane ring species.

Example 9e: Preparation of a Q-Type Polycondensate Precursor Material with a Targeted $DP\_Q_{type}=2.56$ from Tetraethoxysilane or its Oligomers A material identical to the one in Example 9 was prepared, with the exception that the stoichiometric amount of water added was adjusted to yield a degree of polymerization $DP\_Q_{type}$=2.56. $^{29}$Si NMR analysis of the precursor material revealed 57.0% of Q-type tetrasiloxane ring species.

Example 9f: Preparation of a Q-Type Polycondensate Precursor Material with a Targeted $DP\_Q_{type}$=2.0 from Tetraethoxysilane or its Oligomers with Addition of a Rearrangement Catalyst A material identical to the one in Example 9b was prepared, with the exception that in addition to a standard hydrolysis/condensation catalyst, also an amount of Hf(IV) ethoxide was added as a rearrangement catalyst towards the end of the hydrolysis process. $^{29}$Si NMR analysis of the precursor material revealed 46.8% of Q-type tetrasiloxane ring species.

Example 9g: Preparation of a Mixed Q-Type/D-Type Polycondensate Precursor Material with a Targeted $DP\_Q_{type}$=2.2 and $DP\_D_{type}$=1.5 from Ethylsilicate-40 and DMDMS with $n_{Q\text{-}type}:n_{D\text{-}type}$=1:0.05

A material identical to the one in Example 9d was prepared, with the exception that in addition to the oligomeric ethylsilicate-40 Q-type source an amount of a D-type source DMDMS of 5% measured by the respective molar amounts of Si was used for its preparation. Furthermore, the stoichiometric amount of water added was adjusted to further account for the targeted $DP\_D_{type}$=1.5 value. $^{29}$Si NMR analysis of the precursor material revealed 45.2% of Q-type tetrasiloxane ring species.

Example 9h: Alternative Preparation of a Mixed Q-Type/D-Type Polycondensate Precursor Material with a Targeted $DP\_Q_{type}$=2.2 and $DP\_D_{type}$=1.5 from Ethylsilicate-40 and DMDCS with $n_{Q\text{-}type}:n_{D\text{-}type}$=1:0.05

A material identical to the one in Example 9g was prepared, with the exception that Dimethyldichlorosilane (DMDCS) was used as a D-type source instead of DMDMS. Residual hydrochloric acid was removed at the end of the reaction by bubbling with nitrogen as a purge gas. $^{29}$Si NMR analysis of the precursor material revealed 43.6% of Q-type tetrasiloxane ring species.

Example 10: Synthesis of a TPOS (Oligomer)/(Cl-PTMS: HMDSO) Polycondensate Material with $n_{Q\text{-}type}:(n_{T\text{-}type}+n_{M\text{-}type})$=1:0.15:0.09

5.87 mol Si equivalent of a Q-type precursor prepared according to Example 9b was placed inside a 2 L round bottom flask with refluxing column and a resistive heating mantle together with 146.1 g/0.90 mol of a dimer M-type precursor Hexamethyldisiloxane (HMDSO). To this mixture a solution consisting of 25 ml Ethanol and 0.3 ml trifluoroacetic acid (TFA) were added. The setup was then heated to 110° C. mantle temperature with stirring and allowed to react for 2 h in a first reaction step a), at which point the refluxing column was replaced by a distillation bridge and residual volatiles distilled off first at ambient pressure and towards then end with a vacuum reaching 180 mbar at the point where distillate collection had stopped completely.

With the vacuum pump turned off, the reaction vessel was then brought to ambient pressure with nitrogen and 140.0 g/0.70 mol of a monomer T-type precursor (3-Chloropropyl)-trimethoxysilane (Cl-PTMS) and Ti(IV)-methoxide as a catalyst were added. The mixture kept at 120° C. with stirring for an additional 6 hours for a second reaction step b) and then removed from the heating source and allowed to cool to room temperature. 975.4 g of crude reaction product were isolated. $^{29}$Si NMR analysis confirmed that the product contained less than 5% $T^0$-monomer measured by the total amount of T-type moieties, respectively as well as less than 26% of Q-type tetrasiloxane ring species.

Example 11: Synthesis of TEOS (Oligomer)/(GPTMS+VTMS) Polycondensate Material with $n_{Q\text{-}type}:n_{T\text{-}type}$ 1:(0.10+0.05)

18.4 g/137 mmol of Q-type precursor as prepared in Example 9f together with a first ((3-Glycidyloxypropyl) trimethoxysilane (GPTMS), 3.3 g/14 mmol) and a second (Vinyltrimethoxysilane (VTMS), 1.0 g/7 mmol T-type precursor) were placed inside a 50 ml Teflon vessel and installed inside a matching organic synthesis microwave reactor (flexiWAVE, Milestone Inc.). A preinstalled synthesis protocol with a synthesis temperature of up to 190° C. was run which lasted 6 minutes. Upon cooldown, 22.6 g of crude reaction product were isolated. NMR analysis confirmed that the product contained less than 4% $T^0$-monomer measured by the total amount of T-type moieties, respectively as well as less than 21% of Q-type tetrasiloxane ring species.

Example 12: Synthesis of TEOS (Oligomer)/MaPTMS Polycondensate Material with $n_{Q\text{-}type}:n_{T\text{-}type}$=1:0.10

A procedure identical to the one described in Example 8 was used to prepare this material, with the key differences that a Q-type precursor material prepared according to Example 9c and 3-Methacryloxypropyltrimethoxysilane (MaPTMS) were used as starting materials together with a cosolvent (ethyl acetate) and that the autoclave was heated by means of a microwave source and a reduced reaction time of 3 hours was used. $^{29}$Si NMR analysis confirmed that the product contained less than 13% of total $T^0$-monomer measured by the total amount of T-type moieties and less than 24% of Q-type tetrasiloxane ring species.

Example 13: Synthesis of Ethylsilicate-40/(HS-PTMS:DMDMS) Polycondensate Material with $n_{Q\text{-}type}:(n_{T\text{-}type}:n_{D\text{-}type})$=1:(0.15:0.05)

A procedure identical to the one described in Example 8 was used to prepare this material, with the key differences that a Q-type precursor material prepared according to Example 9g and 3-Mercaptopropyltrimethoxysilane (HS-PTMS) were used as starting materials. $^{29}$Si NMR analysis confirmed that the product contained less than 4% of total $T^0$-monomer and 4% of total $D^0$-monomer measured by the total amount of T-type and D-type moieties, respectively and less than 24% of Q-type tetrasiloxane ring species.

Example 13b: Synthesis of Ethylsilicate-40/(HS-PTMS:DMDCS) Polycondensate Material with $n_{Q\text{-}type}:(n_{T\text{-}type}:n_{D\text{-}type})$=1:(0.15:0.05)

A procedure identical to the one described in Example 13 was used to prepare this material, with the key differences that a precursor material prepared according to Example 9 h was used as starting material. $^{29}$Si NMR analysis confirmed that the product contained less than 6% of total $T^0$-monomer and 3% of total $D^0$-monomer measured by the total amount of T-type and D-type moieties, respectively and less than 26% of Q-type tetrasiloxane ring species.

Example 14: Synthesis of TEOS (Oligomer)/(VTES:HMDSO) Polycondensate Material with $n_{Q\text{-}type}:(n_{T\text{-}type}:n_{M\text{-}type})=1:(0.25:0.26)$ A procedure identical to the one described in Example 10 was used to prepare this material, with the key differences that a Q-type precursor material prepared according to Example 9d and 3-Mercaptopropyltrimethoxysilane (HS-PTMS) was used as starting materials and in a higher molar amount (1:0.25 targeted Q-type to T-type molar Si ratio) during the second reaction step b). During the first reaction step a), a 5-fold molar excess of HMDSO with respect to the desired Q-type to M-type molar Si ratio was used and the first reaction step was carried out at 105° C. for 4 h. $^{29}$Si NMR analysis confirmed that the product contained less than 19% of total $T^0$-monomer measured by the total amount of T-type moieties and less than 17% of Q-type tetrasiloxane ring species.

Example 15: Synthesis of TEOS (Oligomer)/(VTES:MTMS) Polycondensate Material with $n_{Q\text{-}type}:(n_{T\text{-}type}:n_{D\text{-}type})=1:(0.30:0.12)$ A procedure identical to the one described in Example 6 was used to prepare this material, with the key differences that a precursor material prepared according to Example 9e and Vinyltriethoxysilane (VTES) as well as Methyltrimethoxysilane (MTMS) were used as Q-type and T-type starting materials, respectively. Oxo-titanium(IV)diacetylacetonate was used as the rearrangement catalyst. $^{29}$Si NMR analysis confirmed that the product contained less than 9% of combined $T^0$-monomers measured by the total amount of T-type moieties and less than 22% of Q-type tetrasiloxane ring species.

Example 16: Synthesis of TEOS/(APTES+MTMS+PTES) Polycondensate Material with $n_{Q\text{-}type}:n_{T\text{-}type}$ 1:(0.20+0.05+0.05)

A procedure identical to the one described in Example 6 was used to prepare this material, with the key differences that a precursor material prepared according to Example 9d made from TEOS and 3-Aminopropyltriethoxysilane (APTES), Methyltrimethoxysilane (MTMS) as well as Propyltriethoxysilane (PTES) were used as Q-type and first, second and third T-type starting materials, respectively. A mixture of Zr(IV)ethoxide and Ti(IV)n-propoxide was used as the rearrangement catalyst. $^{29}$Si NMR analysis confirmed that the product contained less than 7% of combined $T^0$-monomers measured by the total amount of T-type moieties and less than 16% of Q-type tetrasiloxane ring species.

Example 16b: Alternative Synthesis of TEOS/(APTES+MTMS+PTES) Polycondensate Material with $n_{Q\text{-}type}:n_{T\text{-}type}$ 1:(0.20+0.05+0.05)

A procedure identical to the one described in Example 16 was used to prepare this material, with the key differences that some amount/s of at least one of the three T-type precursors was/were already included during the preparation of the precursor material according to Example 9d, analogous to the acetic anhydride, non-hydrolytic precursor condensation route described in Example 6c. A O═Ti(IV)$(SCN)_2$ and O═Zr(IV)$(OAc)_2$ mixture was used as rearrangement catalyst. $^{29}$Si NMR analysis confirmed that the product contained less than 5% of combined $T^0$-monomers measured by the total amount of T-type moieties and less than 20% of Q-type tetrasiloxane ring species.

Example 16c: Alternative Synthesis of TEOS/(APTES+MTMS+PTES) Polycondensate Material with $n_{Q\text{-}type}:n_{T\text{-}type}$ 1:(0.20+0.05+0.05)

A procedure identical to the one described in Example 16b was used to prepare this material, with the key differences that some amount/s of at least one of the three T-type trialkoxysilane precursors that have been included in the preparation of the precursor material according to the described modified process inspired by Example 9d, had been replaced by Trichlorosilane counterparts. $^{29}$Si NMR analysis confirmed that the product contained less than 9% of combined $T^0$-monomers measured by the total amount of T-type moieties and less than 23% of Q-type tetrasiloxane ring species.

Example 16d: Alternative Synthesis of TEOS/(APTES+MTMS+PTES) Polycondensate Material with $n_{Q\text{-}type}:n_{T\text{-}type}$ 1:(0.20+0.05+0.05)

A procedure identical to the one described in Example 16 was used to prepare this material, with the key differences that APTES was first grafted onto the Q-type precursor material prepared according to Example 9d in a first rearrangement protocol. For this, the equivalent amounts of the Q-type and first T-type precursor, respectively, was heated to 125° C. and reacted for 4 hours in the presence of $(EtO)_2$Zr(IV)$(OAcAc)_2$ as a catalyst. The reaction mixture was then allowed to cool to a temperature of 90° C. at which point, Methyltrimethoxysilane (MTMS) as well as Propyltriethoxysilane (PTES) were then added as second and third T-type precursor. The mixture was then allowed to react for an additional 26 h at that temperature. $^{29}$Si NMR analysis confirmed that the product contained less than 14% of combined $T^0$-monomers measured by the total amount of T-type moieties and less than 22% of Q-type tetrasiloxane ring species.

Example 17: Preparation of a Q-Type Polycondensate Precursor Material with a Targeted $DP\_Q_{type}=2.4$ from Tetramethoxysilane or its Oligomers Analogous to Example 9, Tetraethoxysilane (TMOS) in monomeric or oligomeric form was hydrolyzed in the presence of a cosolvent according to the state of the art with a water stoichiometry amount required to achieve a desired degree of polymerization of the precursor material $DP\_Q_{type}=2.4$ using a standard hydrolysis/condensation catalyst. Once the hydrolysis was completed, excess cosolvent and alcohol released during the hydrolysis were removed by vacuum distillation. $^{29}$Si NMR analysis revealed 53.0% of Q-type tetrasiloxane ring species in the precursor material.

Example 18: Synthesis of TEOS (Oligomer)/(TESPT:VTES) Polycondensate Material with $n_{Q\text{-}type}:(n_{T\text{-}type}:n_{M\text{-}type})=1:(0.17:0.06)$ 242.6 g of crude precursor from Example 17 were placed inside a 500 ml glass cylinder with cap. Next, 185.8 g/0.44 mol of a first T-type precursor Bis(triethoxysilylpropyl) tetrasulfide (TESPT) and 23.1 g/0.16 mol of a second T-type precursor vinyltriethoxysilane (VTES) was added together with a bis-acetylacetonato-titanium(IV)-diisopropoxide rearrangement catalyst. The mixture was heated to 75° C. and was kept stirring for a period of 6 days. Residual solvent was removed by pulling a 100 mbar vacuum for 30 minutes. $^{29}$Si NMR analysis confirmed that the product contained less than 44% $T^0$-monomer measured by the total amount of T-type moieties as well as less than 29.2% of Q-type tetrasiloxane ring species.

Example 19: Preparation of a Mixed Q-Type Polycondensate Precursor Material with a Targeted DP_$Q_{type}$=2.28 from Tetramethoxysilane (TMOS) and Tetraethoxysilane (TEOS)

511 g/2.66 mol Si of tetramethoxysilane (TMOS) and 277 g/1.33 mol Si of tetramethoxysilane (TEOS) and Zirconium (IV)-isobutoxide catalyst were placed inside a 1 L round bottom flask with distillation bridge. In other words, the relative molar ratio of TMOS to TEOS monomer used was 2:1. The flask was purged with nitrogen, sealed, and left under nitrogen pressure (balloon) and immersed into a hot oil bath which was kept at 130° C. The Q-Type monomer/catalyst mixture was brought to temperature with stirring at 500 rpm. Once the temperature has been reached, a selected amount (465.3 g/4.56 mol) acetic anhydride was added in portions. Refluxing of the reaction byproduct ethyl acetate occurred rather quickly. After approximately 8 minutes, a continuous stream of methyl acetate and ethyl acetate was distilling over through the distillation bridge and collected in the capture vessel. The reaction continued for a total time of about 70 more minutes, at which point it stopped, commensurate with the ceasing of the methyl/ethyl acetate distilling over. The collection vessel was removed after a total reaction time of 1 h and 25 minutes and emptied, yielding a total mass of 725 g of collected condensate and 465 g of Q-type precursor. $^{29}$Si NMR analysis confirmed that the precursor had a DP_$Q_{type}$ of 2.22 and 51.0% Q-type tetrasiloxane ring species.

Example 20: Synthesis of TEOS/(APTMS:DMDMS) Polycondensate Material with $n_{Q\text{-}type}$:$n_{T\text{-}type}$ 1:$n_{D\text{-}type}$ 1:(0.20:0.10)

310 g of crude precursor from Example 19 were placed inside a 1 L round bottom flask together where after 0.27 mol (Si basis) of a T-type precursor 3-aminopropyltrimethoxysilane in oligomer form (oligo-APTMS) and 16.0 g/0.13 mol of a D-type precursor dimethyldimethoxysilane (DMDMS) were added together without additional rearrangement catalyst other than the amount already present in the Q-type precursor from Example 19. The mixture was heated to a temperature of 110° C. and was kept stirring for a period of 29 hours, at which point any residual solvent was removed by pulling a 250 mbar vacuum for 5 minutes and nitrogen was bubbled through the reaction mixture for a period of 15 minutes to remove additional VOC. $^{29}$Si NMR analysis confirmed that the product contained less than 7% of total $T^0$-monomer and 22% of total $D^0$-monomer measured by the total amount of T-type and D-type moieties, respectively as well as less than 25% of Q-type tetrasiloxane ring species.

Example 21: Preparation of a Q-Type Polycondensate Precursor Material with a Targeted DP_$Q_{type}$=1.52 from a Mixture of Tetramethoxysilane (TMOS) and Tetraethoxysilane (TEOS)

A mixture consisting of Tetramethoxysilane (TMOS) and Tetraethoxysilane (TEOS) in a 20% to 80% molar ratio were hydrolyzed in the presence of a cosolvent according to the state of the art with a water stoichiometry amount required to achieve a desired degree of polymerization of the precursor material DP_$Q_{type}$=1.52 using a standard hydrolysis/condensation catalyst. Once the hydrolysis was completed, excess cosolvent and alcohol released during the hydrolysis were removed by vacuum distillation. $^{29}$Si NMR analysis revealed 35.7% of Q-type tetrasiloxane ring species in the precursor material.

Example 22: Synthesis of a TMOS+TEOS/(tFPTMS) Polycondensate Material with $n_{Q\text{-}type}$:($n_{T\text{-}type}$)=1:0.07

An amount containing 1.92 mol Si equivalent of a mixed Methoxy/Ethoxy terminated Q-type precursor prepared according to Example 21 was filled into a 500 ml round bottom which in turn was placed inside a resistive heating mantle and set to a temperature of 95° C. Next, 29.3 g/0.13 mol of a monomer T-type precursor (3,3,3 trifluoropropyl)-trimethoxysilane (tFPTMS) and Ti(IV)-tetraethoxide (TEOT) catalyst were added. The mixture kept at 95° C. with stirring for an additional 19 hours and then removed from the heating source and allowed to cool to room temperature. $^{29}$Si NMR analysis confirmed that the product contained less than 18% $T^0$-monomer measured by the total amount of T-type moieties, respectively as well as less than 24% of Q-type tetrasiloxane ring species.

Example 23: Preparation of a Q-Type Polycondensate Precursor Material with a Targeted DP_$Q_{type}$=2.0 from Tetraethoxysilane (TEOS) by Means of the Silanol Method Sodium triethoxysilanolate was first prepared by mixing 1 g (3.5 mol) pulverized sodium hydroxide with a solution of 728 g (3.5 mol) tetraethoxysilane in 1.3 l of toluene at 5° C. with stirring. After 2 h at temperature, the solvent phase consisting of toluene and ethanol produced during the reaction were distilled under vacuum. The oily residue was dried overnight in a vacuum drying chamber at 50 mbar and 40° C., yielding 628 g of crude product.

A solution of sodium triethoxysilanolate from the above step in toluene was prepared from 322 g of the crude product by filling it up with toluene to a total volume of 1800 ml in a 31 round bottom flask. This solution was added dropwise to a solution of a stoichiometric amount of acetic acid in 1 l of toluene at 0° C., again with vigorous stirring. The amount of acetic acid for stoichiometric consumption was calculated based on the theoretical formula of the sodium triethoxysilanolate and assuming 100% purity of the crude product. After filtering off the precipitated sodium acetate and washing with toluene, residual solvent (primarily toluene) was again removed by distillation from the combined reaction mixture and sodium acetate washing liquids at 45° C. and <15 mbar absolute pressure. The product yield was 133.9 g of a yellowish liquid which was identified as triethoxysilanol. The final polyethoxysiloxane Q-type precursor was then synthesized by adding the obtained triethoxysilanol (133.9 g) to a water free solution of 22.5 g ammonia (dried over sodium hydroxide pellets) dissolved in 100 ml absolute ethanol over a period of 90 minutes at −30° C. After allowing the mixture to warm to room temperature, the reaction mixture was left standing over night where after residual ammonia and ethanol were again removed by vacuum distillation followed by 10 minutes of nitrogen purge gas bubbling distilled off to give 102.7 g of a yellow polyethoxysiloxane Q-type precursor material. $^{29}$Si NMR analysis of the precursor material revealed 45% of Q-type tetrasiloxane ring species.

Example 24: Synthesis of a TEOS/(VTES+MTMS: TMMS) Polycondensate Material with $n_{Q\text{-}type}$:($n_{T\text{-}type}$:$n_{M\text{-}type}$)=1:(0.1+0.05:0.1)

An amount containing 1.92 mol Si equivalent of a mixed Methoxy/Ethoxy terminated Q-type precursor prepared according to Example 21 was filled into a 500 ml round bottom which in turn was placed inside a resistive heating mantle and set to a temperature of 90° C. Next, 36.5 g/0.19 mol of a first monomer T-type precursor vinyltriethoxysilane (VTES) and 13.1 g/0.1 mol of a second monomer T-type precursor methyltrimethoxysilane (MTMS) as well as Ti(IV)-bromide rearrangement catalyst were added. The mixture was heated to and kept at 110° C. with stirring for 8 hours, whereafter the temperature was again lowered to 90° C. and 20.0 g/0.19 mol of an M-type precursor trimethyl-methoxysilane (TMMS) was dosed over the course of half an hour to the reaction mixture. The mixture was then kept stirring for an additional 12 hours at 90° C. and removed from the heating source. $^{29}$Si NMR analysis confirmed that the product contained less than 14% of $T^0$-monomer measured by the total amount of T-type moieties, respectively as well as less than 24% of Q-type tetrasiloxane ring species.

Example 25: Preparation of a Q-Type Polycondensate Precursor Material with a Targeted $DP\_Q_{type}$=2.1 from a Mixture of Tetraethoxysilane (TEOS) and Silicon Tetrachloride ($SiCl_4$) by Means of the "Chloride Route"

A mixture containing Tetraethoxysilane (TEOS) and silicon tetrachloride in 2:1 molar ratio were heated up inside a closed autoclave vessel to a temperature of 145° C., at which point, 0.75% of zirconium tetrachloride ($ZrCl_4$) was added as a condensation catalyst. The mixture was kept stirring under inert gas atmosphere. After 21 h, the reaction was stopped and the mixture was brought to room temperature, whereafter ethyl chloride as a side product and residual volatiles were removed by distillation. The Q-type polycondensate material was a slightly yellowish liquid which was collected following the workup and analyzed. $^{29}$Si NMR analysis revealed 51.5% of Q-type tetrasiloxane ring species in the precursor material.

Example 25b: Alternative Preparation of a Q-Type/D-Type Polycondensate Precursor Material with a Targeted $DP\_Q_{type}$=2.0 and $DP\_D_{type}$=1.75 from a Mixture of Tetraethoxysilane (TEOS), Silicon Tetrachloride ($SiCl_4$) and Diphenyldichlorosilane (DPhDCS) by Means of the "Chloride Route" with $n_{Q\text{-}type}$:$n_{D\text{-}type}$=1:0.05

A procedure comparable to Example 25 was used to prepare the mixed Q-Type/D-type precursor material. Alternatively, Tetramethoxysilane (TMOS), Silicon Tetrachloride and Diphenyldichlorosilane (DPhDCS) in a 1.95:0.94:0.05 molar ratio were used as starting materials. The reaction was carried out at 135° C. for 25 h with 0.9% Zirconium(IV) tetraacetate as a condensation catalyst. The mixed Q-type/D-type polycondensate material was a slightly yellowish liquid which was collected upon cooling, depressurization of the autoclave as well as workup and analyzed. $^{29}$Si NMR analysis revealed 48.6% of Q-type tetrasiloxane ring species in the precursor material.

Example 26: Synthesis of a TEOS/(PhTES+PTMS: DPhDES) Polycondensate Material with $n_{Q\text{-}type}$:($n_{T\text{-}type}$:$n_{D\text{-}type}$)=1:(0.10+0.05:0.05)

An amount containing 4.5 mol Si equivalent of a Q-type precursor prepared according to Example 25 was placed inside a stirred glass reactor (Buchi versoclave, 11) set to a temperature of 105° C. Next, 108.2 g/0.45 mol and 37.0 g/0.23 mol of a first and second T-type monomer precursor phenyltriethoxysilane (PhTES) and propyltrimethoxysilane (PTMS) were charged into the reactor together with 56.2 g/0.23 mol of a D-type precursor diphenyldimethoxysilane (DPhDMS) and Titanium(IV)-methoxide as a catalyst. The mixture was kept at temperature with stirring for 13 hours and then removed from the heating source and allowed to cool to room temperature. $^{29}$Si NMR analysis confirmed that the product contained less than 26% $T^0$-monomer and less than 16% of $D^0$-monomer measured by the total amount of T-type and D-type moieties respectively as well as less than 26.9% of Q-type tetrasiloxane ring species.

Example 26b: Alternative Synthesis of a TEOS/(PhTES+PTMS: DPhDCS) Polycondensate Material with $n_{Q\text{-}type}$:($n_{T\text{-}type}$:$n_{D\text{-}type}$)=1:(0.10+0.05:0.05)

A procedure comparable to Example 26 was used to prepare the material, with the difference, that an alternatively prepared mixed Q-type/D-type precursor material was used. Consequently, during the preparation, no additional D-type monomer needed to be added, but only PhTES and PTMS were added to the precursor material. All other steps and reagents were left unchanged. $^{29}$Si NMR analysis confirmed that the product contained less than 23% $T^0$-monomer and less than 11% of $D^0$-monomer measured by the total amount of T-type and D-type moieties respectively as well as less than 27.2% of Q-type tetrasiloxane ring species.

Example 27: Efficiency Testing for Potential Rearrangement Catalysts

A protocol was devised to test various model catalysts for their efficiency to catalyze grafting of a T-type monomeric model silane methyltriethoxysilane (MTES). Briefly, commercial Dynasylan Silbond 50 was used as Q-type precursor. A molar ratio $n_{Q\text{-}type}$:$n_{T\text{-}type}$ of 1:0.15 was used and 30 ml aliquots of a premixed solution containing said Q-type and T-type silane precursor were filled into 50 ml glass bottles with lid. To each bottle, 1% by weight of model rearrangement catalyst was added and a blank sample was further included in the study. All glass bottles were simultaneously placed inside a heating cabinet which was kept at 100° C. and the samples were left there for a 24 h incubation period. After that, they were removed from the cabinet and allowed to cool to room temperature and analyzed by means of $^{29}$Si NMR spectroscopy.

| Catalyst: | $DP_{Q\text{-}Type}$ | $DP_{T\text{-}Type}$ | % $T^0$ | $\%(Q^{2r}\&Q^{3s,d})/Q_{tot}$ | $\%(Q^{3s,d})/Q^3$ | Rearrangement |
|---|---|---|---|---|---|---|
| No cat. | 2.12 | 0.56 | 51.6 | 48.9 | 80.8 | — |
| Fe(II)-chloride | 2.18 | 1.41 | 5.6 | 33.8 | 0.65 | Yes |
| Ti(IV)-isopropoxide | 2.08 | 1.65 | 5.8 | 24.6 | 52.0 | Yes |
| Zn(II)-chloride | 2.19 | 0.64 | 41.2 | 50.9 | 81.3 | No |
| Zr(IV)-oxynitrate | 2.16 | 1.84 | 4.4 | 25.3 | 51.6 | Yes |

Following the spectral NMR analysis, one can evaluate the performance and suitability of a catalyst in terms of its ability to graft $T^0$ monomers (DP T-Type and % $T^0$ indicators) as well as the percentage of residual tetrasiloxane ring species after the grafting step (% $(Q^{2r}\&Q^{3s,d})/Q_{tot}$ and % $(Q^{3s,d})/Q^3$ indicators.

Example 28: Hydrolysis of a Polymeric Liquid Material 40 g of Ethanol and 29.3 g of a crude reaction product from Example 3j were mixed and heated to 40° C. in an Erlenmeyer flask with stirring. Once the temperature had equilibrated, 4 ml of a 0.1 M methanesulfonic acid solution was added followed by 3 ml of distilled water. After a brief mixing step (magnetic stirrer), the solution was transferred into a glass bottles with hermetically sealing cap and kept in an oven at 40° C. for 16 hours. The final hydrolysis product was then filtered and stored in the refrigerator.

Example 29: Preparation of a Water in Oil Emulsion 228 g of a sample of a material sample of Example 3k was mixed with 600 ml of distilled water and 50 g of a surfactant (Tween20) were added. The two-phase system was then vigorously stirred using a mechanical impeller stirrer at 35° C. for 1 h. The resulting emulsion was a low-viscous stable emulsion with a shelf life of several weeks without noticeable settling effects.

Example 30: Preparation of an Oil in Water Emulsion 90 g of a sample of a material sample of Example 4k was mixed with 34.5 ml distilled water and 2.2 g of sodium dodecyl sulfate (SDS). The two-phase system was then homogenized using a high-rpm mechanical homogenizer. The resulting emulsion was a creamy paste, which had a shelf life of several weeks when kept in a tightly sealed container.

The invention claimed is:

1. A polymeric liquid polysiloxane material comprising:

(i) non-organofunctional Q-type siloxane moieties selected from the group consisting of:

$Q^1$

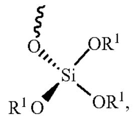

-continued $Q^2$

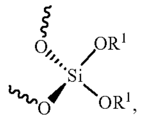

$Q^3$

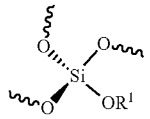

and $Q^4$

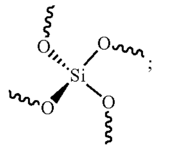

(ii) optionally tri-organofunctional $M^1$-type siloxane moieties selected from the group consisting of:

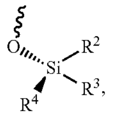

(iii) optionally di-organofunctional D-type siloxane moieties selected from the group consisting of:

$D^1$

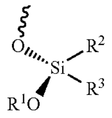

and $D^2$

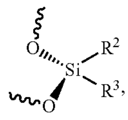

and (iv) mono-organofunctional T-type siloxane moieties selected from the group consisting of:

$T^1$

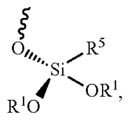

-continued

T2

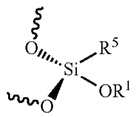

and

T3

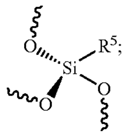

wherein

⦚ indicates a covalent siloxane bond to a silicon atom of another Q-, M-, D-and/or T-type moiety as defined in (i), (ii), (iii) and/or (iv);

$R^1$ is selected from the group consisting of methyl, ethyl, propyl, —P(═O)(OR$^{1'}$) (OH), —P(OR$^{1'}$)$_2$, and —P(═O)(OH)$_2$;

$R^{1'}$ is selected from the group consisting of methyl, ethyl, propyl and butyl;

$R^2$, $R^3$ and $R^4$ are each independently selected from the group consisting of methyl, ethyl, phenyl, cyclohexyl, vinyl and cyclopentadienyl;

$R^5$ is selected from the group consisting of $R^{5U}$ and $R^{5S}$, wherein $R^{5U}$ is selected from the group consisting of methyl, ethyl, n-propyl, isopropyl, n-butyl, t-butyl, linear, branched or cyclic $C_{5-16}$ alkyl residues, (3,3,3-trifluoro)propyl, (1H,1H,2H,2H-perfluoro)octyl, (1H,1H,2H,2H-perfluoro)dodecyl, (1H,1H,2H,2H-perfluoro)hexadecyl, vinyl, phenyl, cyclopentadienyl,

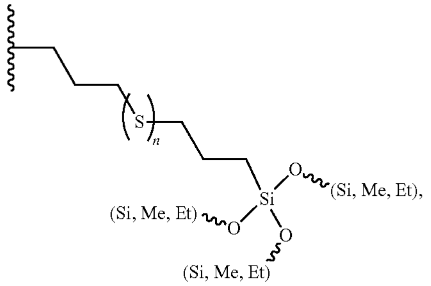

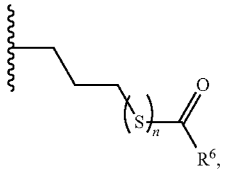

and -L-Z, wherein $R^6$ is selected from the group consisting of methyl, ethyl, n-butyl, and linear or branched $C_5$-14 alkyl residues;

n is an integer selected from the group consisting of 1, 2, 3, 4, and 5;

L is an aliphatic linker selected from the group consisting of —$CH_2$—, —$CH_2CH_2$—, —$CH_2CH_2CH_2$—, —$C_6H_4$—, —$C_6H_4$—$CH_2$—, and —$CH_2$—$CH_2$—$C_6H_4$—$CH_2$—; and Z is a moiety selected from the group consisting of Cl, Br, I, —OH, —SH,

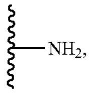

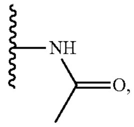

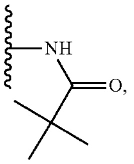

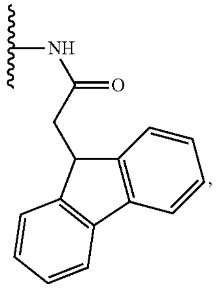

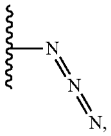

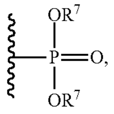

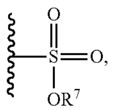

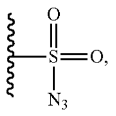

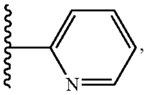

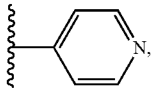

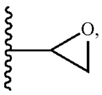

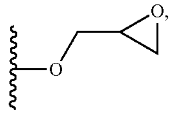

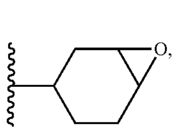

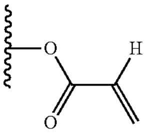

and

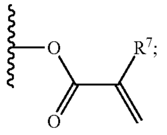

wherein $R^7$ is independently selected from the group consisting of methyl, ethyl, and n-butyl;

$R^{5S}$ is selected from the group consisting of

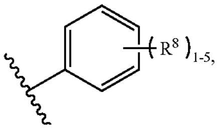

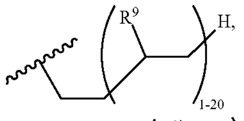

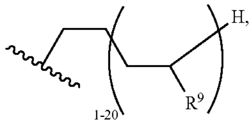

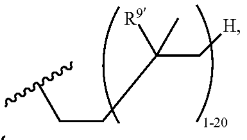

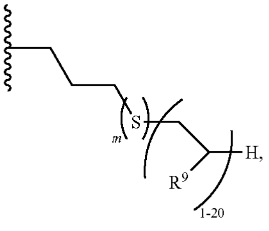

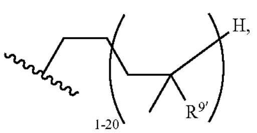

-continued

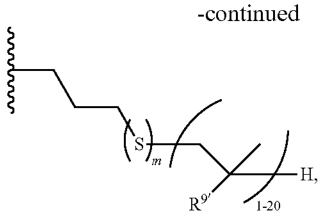

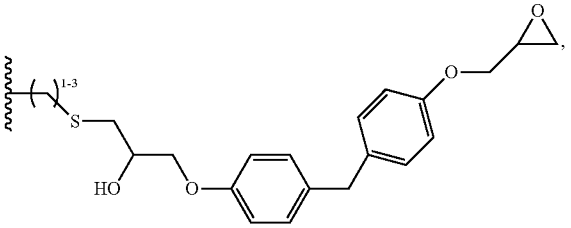

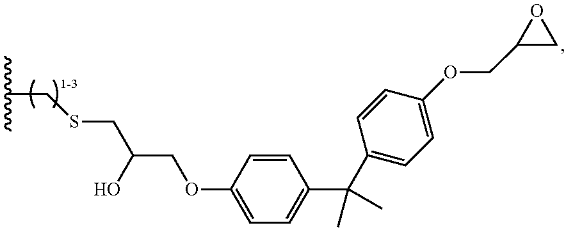

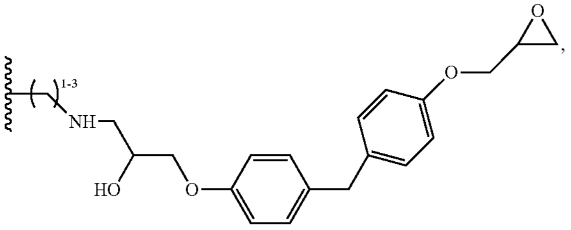

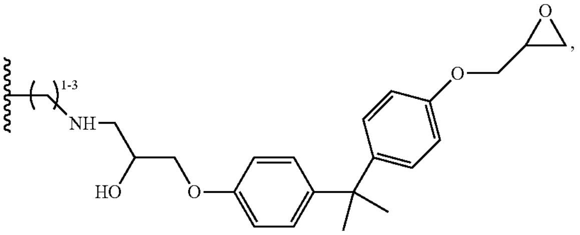

and -L'-Y, wherein m is an integer selected from the group consisting of 1, 2, 3, and 4;

$R^8$ is selected from the group consisting of —Cl, —Br, —I, —F, —CN, —SCN, —$N_3$, —$NO_2$, —OH, —$SO_2OR^{1'}$, and —O—C(═O)$R^{12}$;

$R^9$ is selected from the group consisting of —Cl, —Br, —I, —F, —CN, —COOH, —COOR″, phenyl, o-, m-, and p-vinylphenyl;

$R^{9'}$is selected from the group consisting of —COOH and —$COOR^{1'}$;

L' is an aliphatic linker selected from the group consisting of —$CH_2$—, —$CH_2CH_2$—, and —$CH_2CH_2CH_2$—; and Y is a moiety selected from the group consisting of

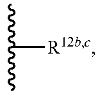

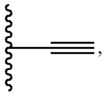

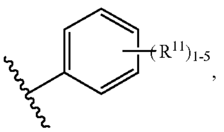

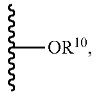

-continued

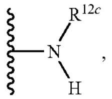

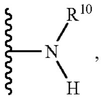

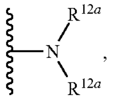

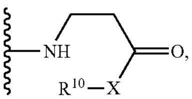

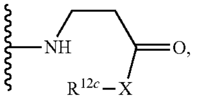

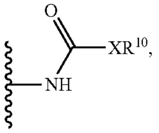

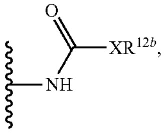

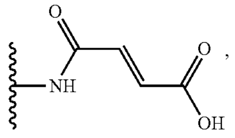

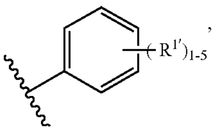

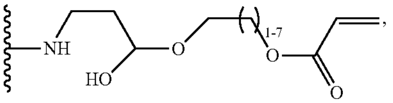

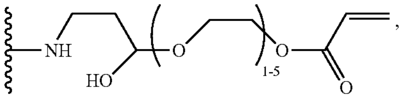

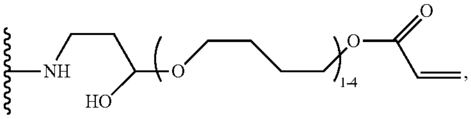

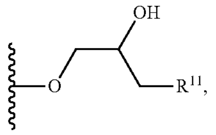

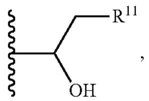

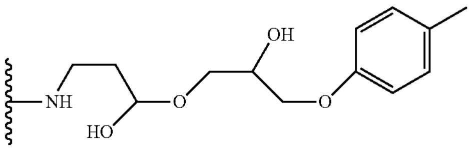

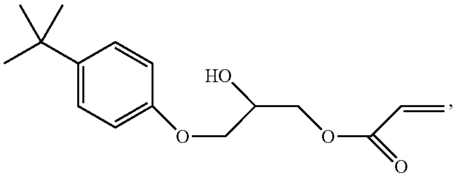

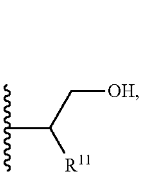

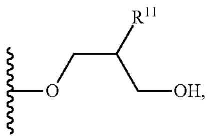

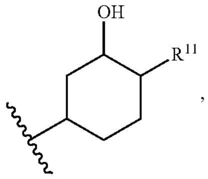

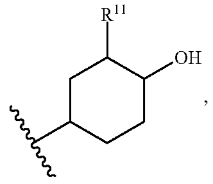

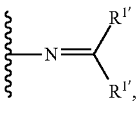

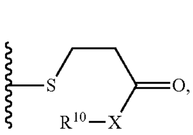

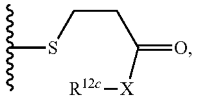

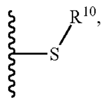

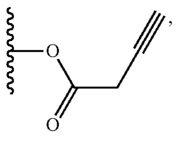

-continued

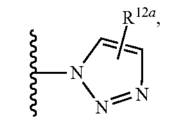

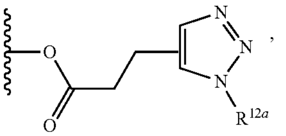

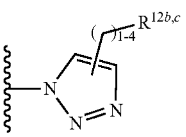

and

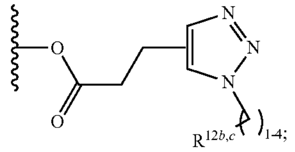

wherein

X is absent, —(NH)—, or —O—;

$R^{10}$ is selected from the group consisting of

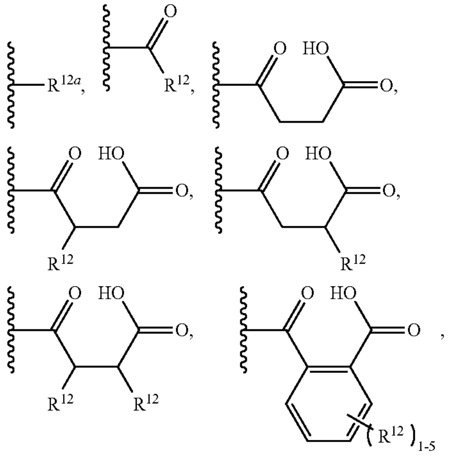

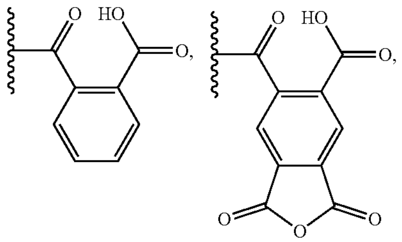

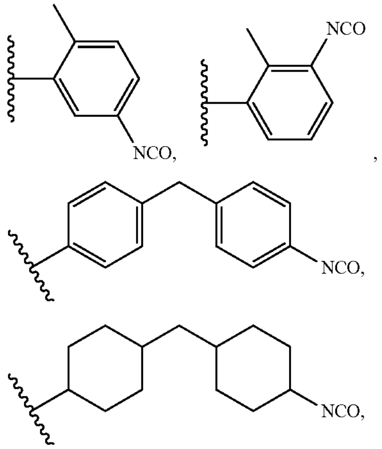

-continued

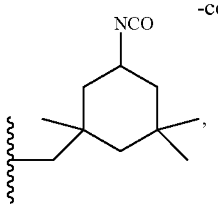

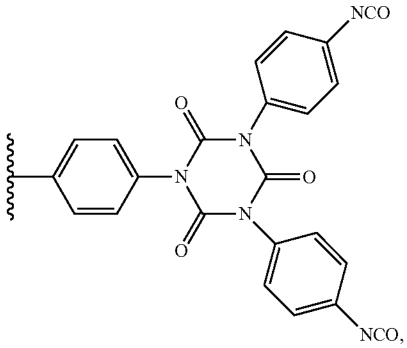

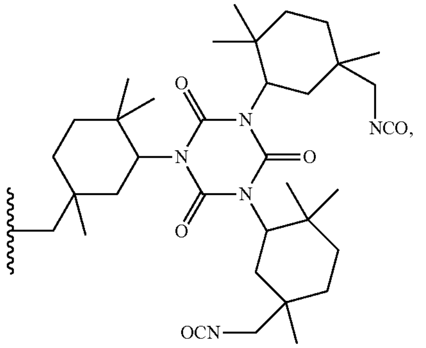

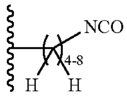

and

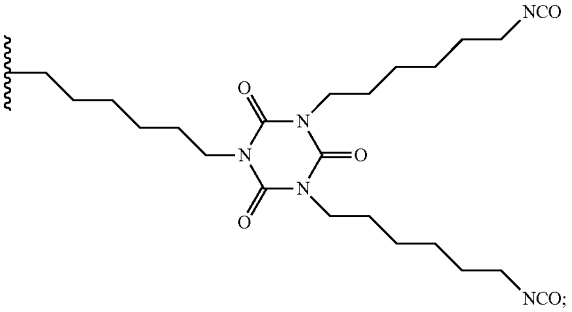

$R^{11}$ is selected from the group consisting of $R^8$, —X—$R^{1'}$, and $R^{12c}$;

$R^{12}$ is selected from the group consisting of $R^{12a}$, $R^{12b}$, and $R^{12c}$, wherein $R^{12a}$ is selected from the group consisting of linear or branched, substituted or non-substituted $C_{1-18}$ alkyl, linear or branched, substituted or non-substituted $C_{2-18}$ alkenyl, and linear or branched, substituted or non-substituted $C_{2-18}$ alkynyl;

$R^{12b}$ is selected from the group consisting of linear or branched, substituted or non-substituted alkyl ether up to a molecular weight of 5000 g/mol, linear or branched, substituted or non-substituted alkenyl ether up to a molecular weight of 5000 g/mol, and linear or branched, substituted or non-substituted alkynyl ether up to a molecular weight of 5000 g/mol;

unsubstituted polydimethylsiloxane and unsubstituted polydivinylsiloxane; and polyaccharides up to a molecular weight of 5000 g/mol, and oligosaccharides up to a molecular weight of 5000 g/mol; and $R^{12c}$ is selected from the group consisting of amino acids, oligo-peptides up to a molecular weight of 5000 g/mol, and poly-peptides up to a molecular weight of 5000 g/mol; and $C_{12-24}$ fatty acids;

with the proviso that $R^{5S}$ is not

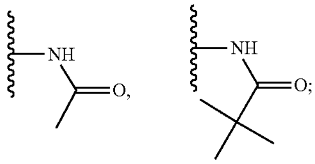

wherein the degree of polymerization of the Q-type siloxane moieties $DP_{Q\text{-}type}$ is in the range of 1.3 to 2.7;

the degree of polymerization of the D-type siloxane moieties $DP_{D\text{-}type}$ is in the range of 1.0 to 1.9;

the degree of polymerization of the T-type siloxane moieties $DP_{T\text{-}type}$ is in the range of 1.1 to 2.7;

the total content of tri-organofunctional M-type siloxane moieties (iii) in the polysiloxane material does not exceed 10 mol-%;

the total content of di-organofunctional D-type siloxane moieties (iii) in the polysiloxane material does not exceed 50 mol-%;

the material has a viscosity in the range of 10 to 100'000 cP, as measured by a cylindrical rotation viscometer according to standard ASTM E2975-15;

the material comprises less than 5 mol-% silanol groups (Si—OH);

the atomic ratio of T- to Q-species in the material is in the range of 0.01:1 to 1:1;

at least 1 mol-% of all $R^5$ moieties in the material are $R^{5S}$ moieties;

wherein the polysiloxane material comprises less than 45 mol-% four-membered combined $Q^{2r}$-type and $Q^{3s,d}$-type siloxane ring species relative to the total Q-type siloxane species; and/or the polysiloxane material comprises less than 70 mol-% four-membered combined $Q^{3s,3d}$-type siloxane ring species relative to all $Q^3$-type siloxane species; and/or the polysiloxane material comprises less than 4.5 mol-% double four-membered $Q^{3d}$-type siloxane ring species relative to the total Q-type siloxane species; and/or the polysiloxane material comprises less than 25 mol-% double four-membered $Q^{3d}$-type siloxane ring species relative to all $Q^3$-type siloxane species.

2. The polymeric liquid polysiloxane material according to claim 1, wherein $R^8$ is selected from the group consisting of —Cl, —Br, —I, —CN, —SCN, —$N_3$, —$NO_2$, —$SO_2OR^{1'}$, and —O—C(═O)$R^{1'}$;

Y is selected from the group consisting of

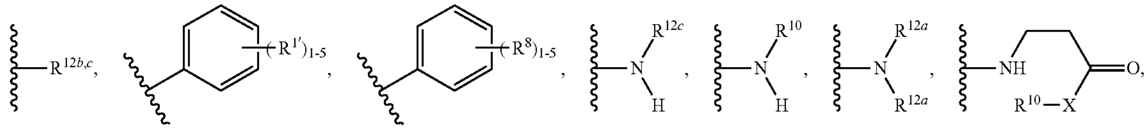

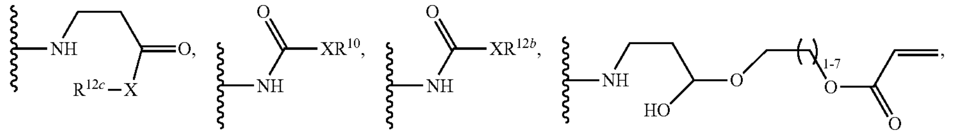

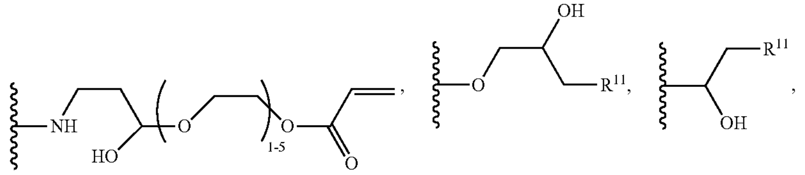

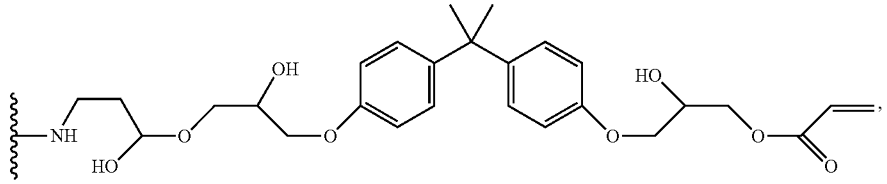

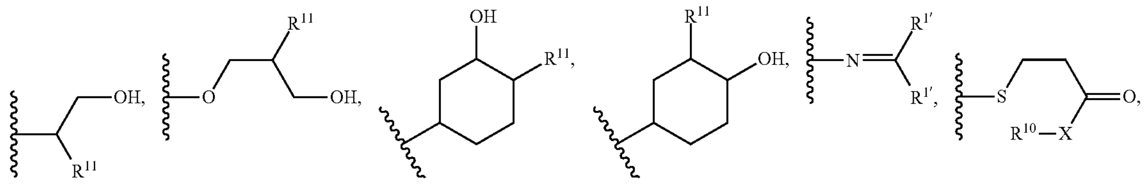

-continued

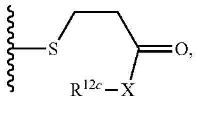
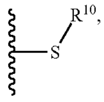
and
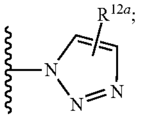

$R^{10}$ is selected from the group consisting of

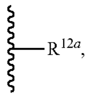
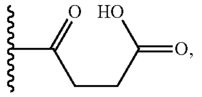
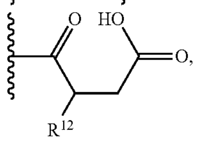
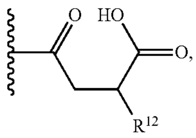
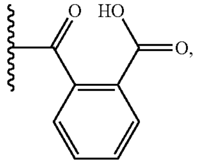
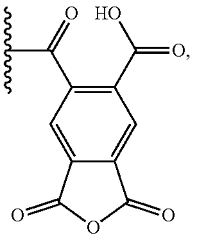
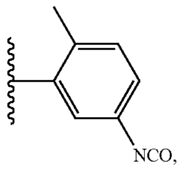
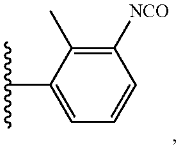
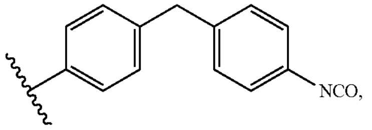
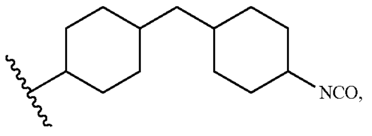
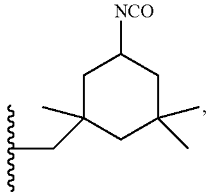
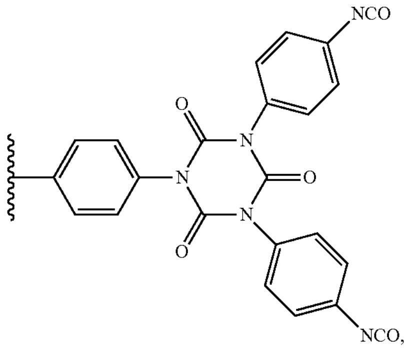

-continued

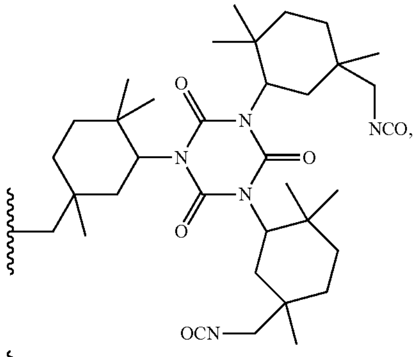
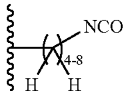
and
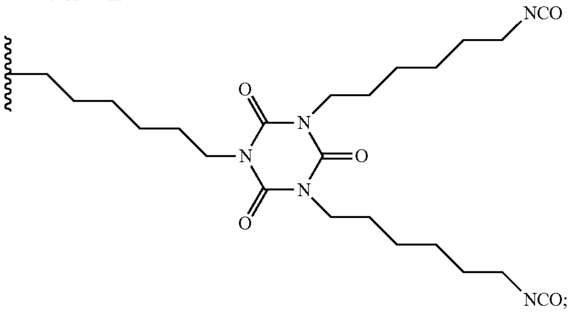

$R^{11}$ is selected from the group consisting of $R^8$ and $R^{12c}$; and $R^{12}$ is selected from the group consisting of $R^{12a}$, $R^{12b}$, and $R^{12c}$, wherein $R^{12a}$ is selected from the group consisting of linear or branched, substituted or non-substituted $C_{1-18}$ alkyl and linear or branched, substituted or non-substituted $C_{2-18}$ alkenyl;

$R^{12b}$ is selected from the group consisting of linear or branched, non-substituted or terminally amino- or thiol-substituted alkyl ethers up to a molecular weight of 3000 g/mol, and linear or branched, non-substituted or terminally amino- or thiol-substituted alkenyl ethers up to a molecular weight of 3000 g/mol;

poly-saccharides up to a molecular weight of 3000 g/mol, and oligosaccharides up to a molecular weight of 3000 g/mol; and unsubstituted polydimethylsiloxane and polydivinylsiloxane; and $R^{12c}$ is selected from the group consisting of amino acids, oligo-peptides up to a molecular weight of 3000 g/mol, and poly-peptides up to a molecular weight of 3000 g/mol.

3. The polymeric liquid polysiloxane material according to claim 1, wherein $R^8$ is selected from the group consisting of —Cl, —Br, —I, —CN, —SCN, —$N_3$, —$NO_2$, —$SO_2OR^{1'}$, and —O—C(=O)$R^{1'}$;

Y is selected from the group consisting of

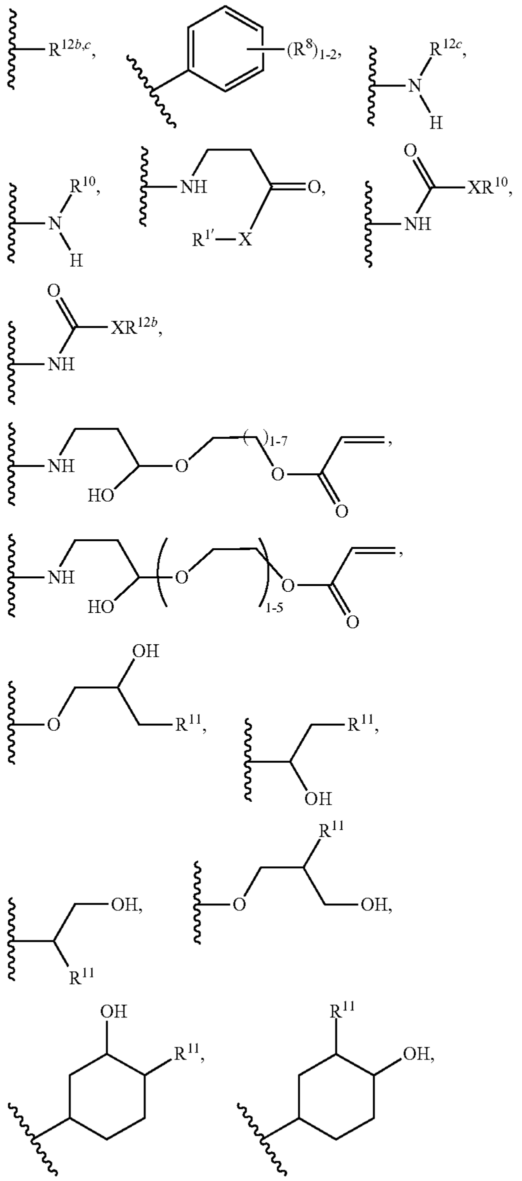

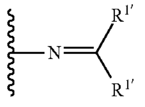

and

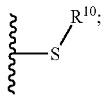

$R^{10}$ is selected from the group consisting of

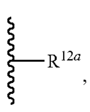

,

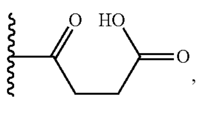

,

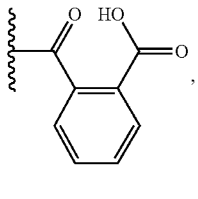

,

-continued

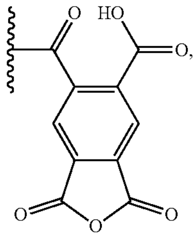

,

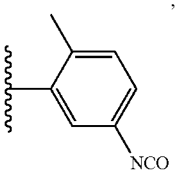

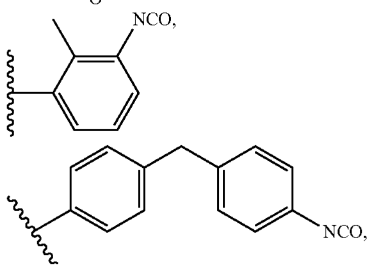

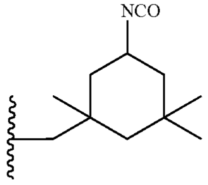

and

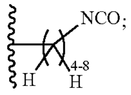

$R^{11}$ is selected from the group consisting of $R^8$ and $R^{12c}$; and $R^{12}$ is selected from the group consisting of $R^{12a}$, $R^{12b}$, and $R^{12c}$, wherein $R^{12a}$ is selected from the group consisting of linear or branched, substituted or non-substituted $C_{1-12}$ alkyl and linear or branched, substituted or non-substituted $C_{2-12}$ alkenyl;

$R^{12b}$ is selected from the group consisting of linear, non-substituted or terminally amino-substituted alkyl ethers up to a molecular weight of 2000 g/mol; and poly-saccarides up to a molecular weight of 2000 g/mol, and oligosaccharides up to a molecular weight of 2000 g/mol; and $R^{12c}$ is selected from the group consisting of amino acids, oligo-peptide up to a molecular weight of 2000 g/mol made of naturally occuring amino acids, and poly-peptides up to a molecular weight of 2000 g/made of naturally occurring amino acids;

castor oil, soybean oil, sunflower oil triglycerides; and naturally occurring $C_{12-24}$ fatty acids.

4. The polymeric liquid polysiloxane material according to claim 1, wherein the material comprises (i) at least two non-identically $R^5$-substituted mono-organofunctional T-type alkoxy-terminated siloxane populations, each population making up at least 3 mol-% of all mono-organofunctional T-type siloxane moieties in the material; and/or (ii) chiral mono-organofunctional $T^1$-type siloxane moieties in an amount of at least 3 mol-% relative to all mono-organofunctional T-type siloxane moieties in the material.

5. The polymeric liquid polysiloxane material according to claim 1, wherein (i) the degree of polymerization of the Q-type siloxane moieties $DP_{Q\text{-}type}$ is in the range of 1.5 to 2.5;

(ii) the degree of polymerization of the D-type siloxane moieties $DP_{D\text{-}type}$ is in the range of 1.25 to 1.75; and/or (ii) the degree of polymerization of the T-type siloxane moieties $DP_{T\text{-}type}$ is in the range of 1.3 to 2.2.

6. The polymeric liquid polysiloxane material according to claim 1, wherein the total content of di-organofunctional D-type siloxane and/or the total content tri-organofunctional M-type siloxane moieties is zero.

7. The polymeric liquid polysiloxane material according to claim 1, wherein the relative atomic ratio of T- to Q-species is in the range of 0.02:1 to 0.75:1.

8. A hydrolysis product obtained by reacting at least one polymeric liquid material according to claim 1, with a predetermined amount of water or with a predetermined amount of a water-solvent mixture.

9. An emulsion obtained by emulsifying a polymeric liquid material according to claim 1, with a predetermined amount of water.

10. A method for preparing a polymeric liquid material according to claim 1, the method comprising the following steps:

providing the polymeric liquid material, wherein at least 1 mol-% of all $R^5$ moieties in the material are $R^{5U}$ moieties;

functionalizing the $R^{5U}$ residues of the polymeric liquid material to obtain at least 1 mol-% $R^{5S}$ residues relative to all $R^5$ residues;

retrieving, the polymeric liquid material.

11. A method for preparing a polymeric liquid material according to claim 1, the method comprising the following steps:

(a) providing a Q-type polymethoxy, polyethoxy, polypropoxy or mixed poly(methoxy/ethoxy/propoxy) polysiloxane precursor, optionally comprising (a1) di-organofunctional D-type siloxane moieties; and/or (a2) mono-organofunctional T-type siloxane moieties, wherein $R^5$ is selected from the group consisting of $R^{5U}$ and $R^{5S}$;

optionally further comprising a rearrangement catalyst;

wherein the precursor comprises at least 28 mol-% four-membered combined $Q^{2r}$-type and $Q^{3s,d}$-type siloxane ring species relative to the total Q-type siloxane species; and/or wherein the precursor comprises at least 60% four-membered combined $Q^{3s,3d}$-type siloxane ring species relative to all $Q^3$-type siloxane species; and wherein degree of polymerization of the Q-type polysiloxane $DP_{Q\text{-}type}$ is in the range of 1.5 to 2.7;

(b) adding at least one of a (b1) tri-organofunctional M-type silane $Si(OR^1)(R^2)(R^3)(R^4)$ in mono- or oligomeric form;

(b2) di-organofunctional D-type silane $Si(OR^1)_2(R^2)(R^3)$ in mono- or oligomeric form; and/or (b3) mono-organofunctional T-type silane $Si(OR^1)_3(R^5)$ in mono- or oligomeric form, wherein $R^5$ is selected from the group consisting of $R^{5U}$ and $R^{5S}$;

to the polysiloxane of (a);

(c) optionally adding a rearrangement catalyst to the mixture of step (b);

(d) heating the mixture of (c) in the absence of water:

(e) optionally repeating steps (b) to (d) at least once;

(f) optionally functionalizing the $R^{5U}$ residues of the polymeric liquid material to obtain at least 1 mol-% $R^{5S}$ resides relative to all $R^5$ residues;

(g) retrieving, the polymeric liquid material;

with the proviso that at least one of steps (a) providing a Q-type polymethoxy, polyethoxy, polypropoxy or mixed poly (methoxy/ethoxy/propoxy) polysiloxane precursor comprising mono-organofunctional T-type siloxane moieties, wherein $R^5$ is selected from $R^{5U}$ and $R^{5S}$ or (b) adding mono-organofunctional T-type silane $Si(OR^1)_3(R^5)$ in mono-or oligomeric form, wherein $R^5$ is selected from $R^{5U}$ and $R^{5S}$ is carried out, and with the proviso that a rearrangement catalyst is present in at least one of steps (a) or (c).

12. The method according to claim 11, wherein in step (a), the $R^5$ of the T-type siloxane moiety is $R^{5U}$;

in step (b), the $R^5$ of the T-type silane is $R^{5U}$; and the method comprises the step (f) of functionalizing the $R^{5U}$ residues of the polymeric liquid material to obtain at least 1 mol-% $R^{5S}$ residues relative to all $R^5$ residues.

13. The method according to claim 11, wherein in step (a), the $R^5$ of the T-type siloxane moiety is $R^{5U}$;

in step (b), the $R^5$ of at least one T-type silane is $R^{5S}$;

wherein in optional step (e) the $R^5$ of the T-type silane is selected from the group consisting of $R^{5U}$ and $R^{5S}$, and the method comprises or does not comprise the step (f).

14. The method according to claim 11, wherein after step (d) or (e), the method further comprises the step of adding a tri-organofunctional M-type silane) $Si(OR^1)(R^2)(R^3)(R^4)$, or M-type siloxane $(R^2)(R^3)(R^4)Si—O—Si(R^2)(R^3)(R^4)$ and optionally a di-organofunctional D-type silane $Si(OR^1)_2(R^2)(R^3)$ in mono- or oligomeric form in the presence of water and a suitable co-solvent and an acid catalyst, followed by heating the mixture.

15. The method according to claim 11, wherein the reaction temperature for steps (c) through (e) is in the range from 30 to 170° C., and the pressure during steps (c) through (e) is in the range of 0.1 bar to 2 bar.

16. The method according to claim 11, wherein the rearrangement catalyst is selected from the group consisting of $Ti(IV)(OR^{13})_4$ and $Zr(IV)(OR^{13})_4$;

$Ti(IV)X_4$ and $Zr(IV)X_4$;

$O{=}Ti(IV)X_2$ and $O{=}Zr(IV)X_2$);

$Ti(IV)X_2(OR^{13})_2$ and $Zr(IV)X_2(OR^{13})_2$;

$Ti(IV)X_2(OCOCH_3COCH_3)_2$ and $Zr(IV)X_2(OCOCH_3COCH)_2$;

$Ti(IV)(OSi(CH_3)_3)_4$ and $Zr(IV)(OSi(CH_3)_3)_4$;

$(R^{13}O)_2Ti(IV)(OCOCH_3COCH_3)_2$ and $(R^{13}O)_2Zr(IV)(OCOCH_2COCH_3)_2$;

$O{=}Ti(IV)(OCOCH_3COCH_3)_2$ and $O{=}Zr(IV)(OCOCH_3COCH_3)_2$;

$Ti(IV)(OCOCH_3)_4$ and $Zr(IV)(OCOCH_3)_4$;

$Ti(IV)(OCOCH_3)_2(OR^{13})_2$ and $Zr(IV)(OCOCH_3)_2(OR^{13})_2$; and $O{=}Ti(IV)(OCOCH_3)_2$ and $O{=}Zr(IV)(OCOCH_3)_2$;

wherein $R^{13}$ is selected from the group consisting of $—CH_3$, $—CH_2CH_3$, $—CH(CH_3)_2$, $—CH_2CH_2CH_3$, $—C(CH_3)_3$, $—CH_2CH_2CH_2CH_3$, and $CH_2CH_2CH(CH_3)_2$, and wherein X is a halide, a pseudohalide, nitrate, chlorate, or perchlorate anion.

17. The polymeric liquid material according to claim 1, comprising at least one population of mono-organofunctional T-type siloxane moieties with $R^5$ selected from the group consisting of vinyl, methacrylate, butacrylate, acrylate,

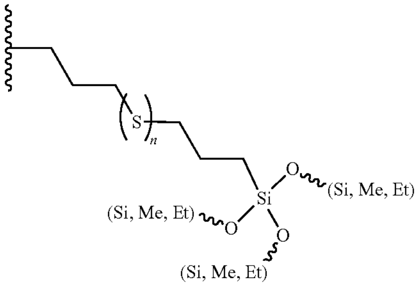

and

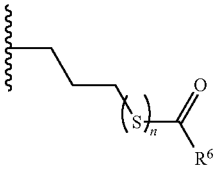

as a crosslinker within a formulation, with a content of the polymeric liquid material in the range of 0.2% to 25% by weight with respect to the formulation.

18. The polymeric liquid material according to claim 1 comprising at least one population of mono-organofunctional T-type siloxane moieties with $R^5$ selected from the group consisting of methyl, ethyl, vinyl, methacrylate, n-propyl, isopropyl, n-butyl, t-butyl, hexyl, octyl, dodecyl, hexadecyl, (3,3,3-trifluoro)propyl, (1H,1H,2H,2H-perfluoro)octyl, (1H,1H,2H,2H-perfluoro)dodecyl, and (1H,1H,2H,2H-perfluoro)hexadecyl, in a hydrophobic formulation, wherein the loading of the polymeric liquid in the formulation is 0.5% to 25% by weight.

19. The method according to claim 10, further comprising isolating the polymeric liquid material, purifying the polymeric liquid material, or isolating and purifying the polymeric liquid material.

20. The method according to claim 11, wherein at least one of:

the Q-type polymethoxy, polyethoxy, polypropoxy or mixed poly (methoxy/ethoxy/propoxy) polysiloxane precursor, comprises less than 12 mol-% of (a1) and (a2) combined relative to the total amount of all Q-type species;

the method further comprises isolating the polymeric liquid material, purifying the polymeric liquid material, or isolating and purifying the polymeric liquid material; or a combination thereof.

21. The method according to claim 16, wherein the catalyst amount in each of steps (a) or (c) is between 0.01 and 5 mol-% based on the total molar silicon content present in said step.

* * * * *